United States Patent
Itoh et al.

(10) Patent No.: US 9,130,745 B2
(45) Date of Patent: Sep. 8, 2015

(54) ENCRYPTION PROCESSING DEVICE AND METHOD

(71) Applicant: FUJITSU LIMITED, Kawasaki-shi, Kanagawa (JP)

(72) Inventors: Kouichi Itoh, Kawasaki (JP); Dai Yamamoto, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 13/927,634

(22) Filed: Jun. 26, 2013

(65) Prior Publication Data

US 2013/0287209 A1 Oct. 31, 2013

Related U.S. Application Data

(63) Continuation of application No. PCT/JP2010/073636, filed on Dec. 27, 2010.

(51) Int. Cl.
*H04L 29/06* (2006.01)
*H04L 9/08* (2006.01)
*H04L 9/00* (2006.01)
*H04L 9/30* (2006.01)

(52) U.S. Cl.
CPC ............. *H04L 9/0869* (2013.01); *H04L 9/003* (2013.01); *H04L 9/3066* (2013.01)

(58) Field of Classification Search
CPC ............................. H04L 9/003; H04L 9/3066
See application file for complete search history.

(56) References Cited

U.S. PATENT DOCUMENTS

| | | | | |
|---|---|---|---|---|
| 5,675,653 A | * | 10/1997 | Nelson, Jr. | 380/28 |
| 5,982,900 A | * | 11/1999 | Ebihara et al. | 380/30 |
| 6,839,847 B1 | * | 1/2005 | Ohki et al. | 713/194 |
| 7,065,788 B2 | * | 6/2006 | Yajima et al. | 726/23 |
| 8,265,266 B2 | * | 9/2012 | Ciet et al. | 380/28 |

(Continued)

FOREIGN PATENT DOCUMENTS

| | | | |
|---|---|---|---|
| CA | 2292817 A1 | * | 6/2000 |
| EP | 1262037 B1 | | 2/2008 |

(Continued)

OTHER PUBLICATIONS

Messerges, T. S. Dabbish, E. A. Sloan, R. H. "Power Analysis Attacks of Modular Exponentiation in Smartcards." CHES'99. pp. 144-157, 1999.*

(Continued)

*Primary Examiner* — Mohammad L Rahman
(74) *Attorney, Agent, or Firm* — Staas & Halsey LLP

(57) ABSTRACT

A constant multiplier inputs a base and a modulo n, performs modular exponentiation modulo n with a prescribed constant as the exponent and with base a, and outputs the result of this calculation as base b. A personal key converter inputs a personal key d and calculates a personal key d' as the quotient when d is divided by the prescribed constant. A correction key generator generates a correction key d" as the remainder of the aforementioned division. A first modular exponentiation unit performs modular exponentiation base b with d' as the exponent. A second modular exponentiation unit performs modular exponentiation base a with d" as the exponent, and outputs a correction value. A correction calculation unit multiplies the outputs of the first and second modular exponentiation units and outputs the result as the encryption processing result.

10 Claims, 51 Drawing Sheets

(56) References Cited

U.S. PATENT DOCUMENTS

| | | | |
|---|---|---|---|
| 2002/0126838 A1* | 9/2002 | Shimbo et al. | 380/28 |
| 2002/0166057 A1* | 11/2002 | Kaminaga et al. | 713/194 |
| 2003/0061498 A1 | 3/2003 | Drexler et al. | |
| 2005/0185791 A1* | 8/2005 | Chen et al. | 380/30 |
| 2008/0019508 A1* | 1/2008 | Lipson | 380/30 |
| 2008/0144811 A1* | 6/2008 | Gopal et al. | 380/30 |
| 2009/0028323 A1* | 1/2009 | Aciicmez et al. | 380/28 |
| 2010/0232603 A1* | 9/2010 | Itoh | 380/30 |
| 2011/0007894 A1 | 1/2011 | Takenaka et al. | |
| 2011/0013770 A1 | 1/2011 | Itoh | |

FOREIGN PATENT DOCUMENTS

| | | | |
|---|---|---|---|
| JP | 2000-132096 | | 5/2000 |
| JP | 2003-233307 | | 8/2003 |
| WO | 2009/118795 | A1 | 10/2009 |
| WO | 2009/122461 | A1 | 10/2009 |

OTHER PUBLICATIONS

Coron, JS. "Resistance against Differential Power Analysis for Elliptic Curve Cryptosystems." CHES'99. pp. 292-302, 1999.*

Japanese Office Action mailed Mar. 4, 2014 in corresponding Japanese Application No. 2012-550616.

IEEE, "Standard Specifications for Public Key Cryptography", IEEE P1363/D13 (Draft Version 13), Nov. 12, 1999, pp. 1-73, http://grouper.ieee.org/groups/1363/P1363/draft.html.

Paul Kocher et al., "Differential Power Analysis", Crypto'99, LNCS 1666, 1999, pp. 388-397.

Jean-Sébastien Coron et al., "Resistance Against Differential Power Analysis for Elliptic Curve Cryptosystems", Cryptographic Hardware and Embedded Systems (CHES'99), LNCS 1717, 1999, pp. 292-302.

PCT International Search Report mailed Feb. 1, 2011 in corresponding International Application No. PCT/JP2010/073636.

PCT International Preliminary Report on Patentability mailed Jul. 11, 2013 in corresponding International Application No. PCT/JP2010/073636.

Kouichi Itoh et al., "Power Attack on Exponent Randomization Countermeasure with Chosen Message Pair", The Symposium on Cryptography and Information Security (SCIS 2010), Jan. 19-22, 2010, pp. 1-6.

* cited by examiner

| RSA | ECC |
|---|---|
| MODULAR EXPONENTIATION COMPUTATION : $a^d \pmod{n}$ | SCALAR MULTIPLICATION OF POINT : $dA$ |
| MULTIPLICATION : $a \times b \pmod{n}$ | ADDITION OF POINT : $A+B$ |
| DIVISION : $a \times b^{-1} \pmod{n}$ | SUBTRACTION OF POINT : $A-B$ |
| SQUARING : $a^2 \pmod{n}$ | DOUBLING OF POINT : $2A$ |
| 1 | INFINITE POINT $O$ |
| $1 \times a = a \times 1 = a$ | $O + A = A + O = A$ |
| $1^2 = 1$ | $2O = O$ |

F I G. 1

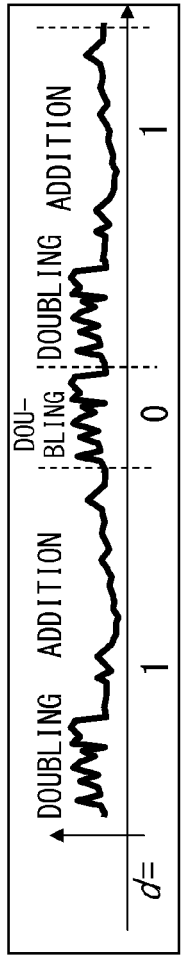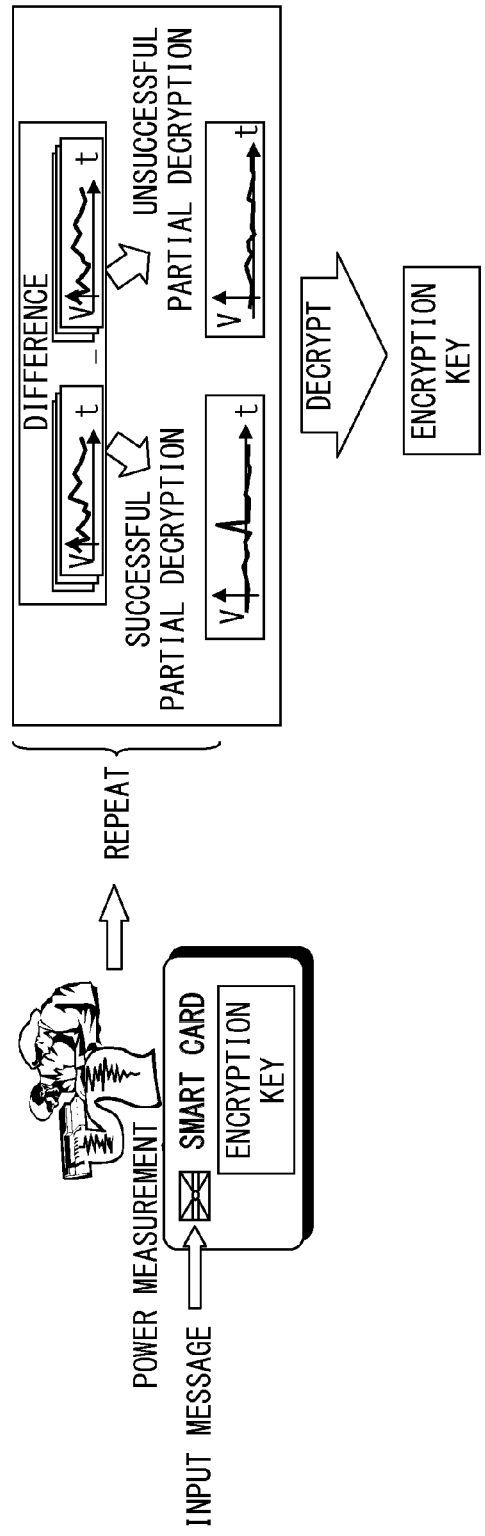
F I G. 3

```
<INPUT VALUES>
d: SECRET KEY, DENOTED AS d=d[u-1]||...||d[1]||d[0]
                d[i] IS iTH BIT VALUE OF d
u: BIT LENGTH OF d
a: CIPHER TEXT
n: MODULUS
<OUTPUT VALUES>
v=a^d (mod n)

401 v:=1;
402 for(i:=u - 1; i 0; i:=i - 1) {
        /* PERFORM SQUARING */
403    v := v×v (mod n);
        /* PERFORM MULTIPLICATION IF /*d[i]=1
404    if (d[i] ==1) v := v×a (mod n);
405 }
406 return v;
```

FIG. 4

```
<INPUT VALUES>
d: SCALAR VALUE
u: BIT LENGTH OF d
A: POINT ON ELLIPTIC CURVE
<OUTPUT VALUES>
V=Da: POINT OBTAINED BY MULTIPLYING A BY d

701  V:=0;  /* INITIAL VALUE IS INFINITE POINT */
702  for(i:=u· ·; i 0; i:=i·1) {
         /* PERFORM DOUBLING OF POINT */
703      V:= ECDBL(V)
         /* PERFORM ADDITION OF POINT IF d[i]=1 */
704      if (d [i] ==1) V := ECADD(V, A);
705  }
706  return V;
```

FIG. 7

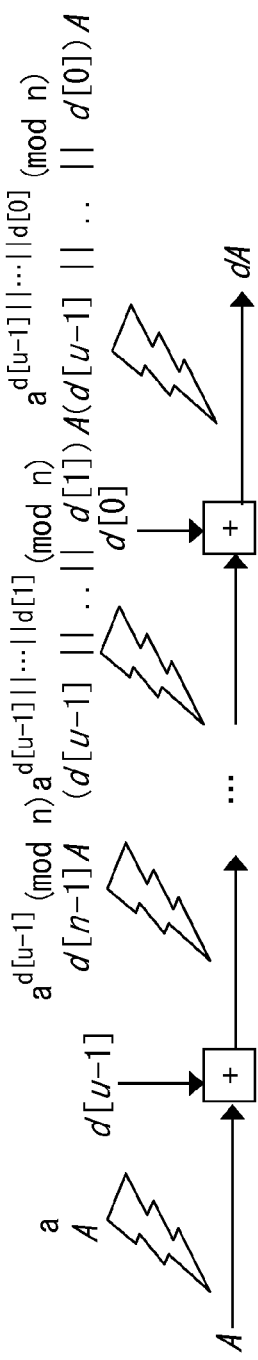

FIG. 12

```
ModExp_ADalways(a, d, n)
<INPUT VALUES>
d: SECRET KEY, DENOTED AS d=d[u - 1]||...||d[1]||d[0]
   d[i] IS iTH BIT VALUE OF d
u: BIT LENGTH OF d
a: BASE
n: MODULUS
<OUTPUT VALUES>
v=a^d (mod n)
<BUFFER>
t[0], t[1]

1201 t[0]:=1;
1202 for(i:=u - 1; i 0; i:=i - 1) {
        /* PERFORM SQUARING. STORE COMPUTATION RESULT IN CASE OF d[i]=0 IN t[0] */
1203    t[0] := t[0] × t[0] (mod n);
        /* PERFORM MULTIPLICATION. STORE COMPUTATION RESULT IN CASE OF d[i]=1 IN t[1] */
1204    t[1] := t[0] × a (mod n);
        /* COPY CORRECT COMPUTATION RESULT TO t[0] ACCORDING TO VALUE OF d[i] */
1205    t[0] = t[d[i] ];
1206 }
1207 return t[0] as v;
```

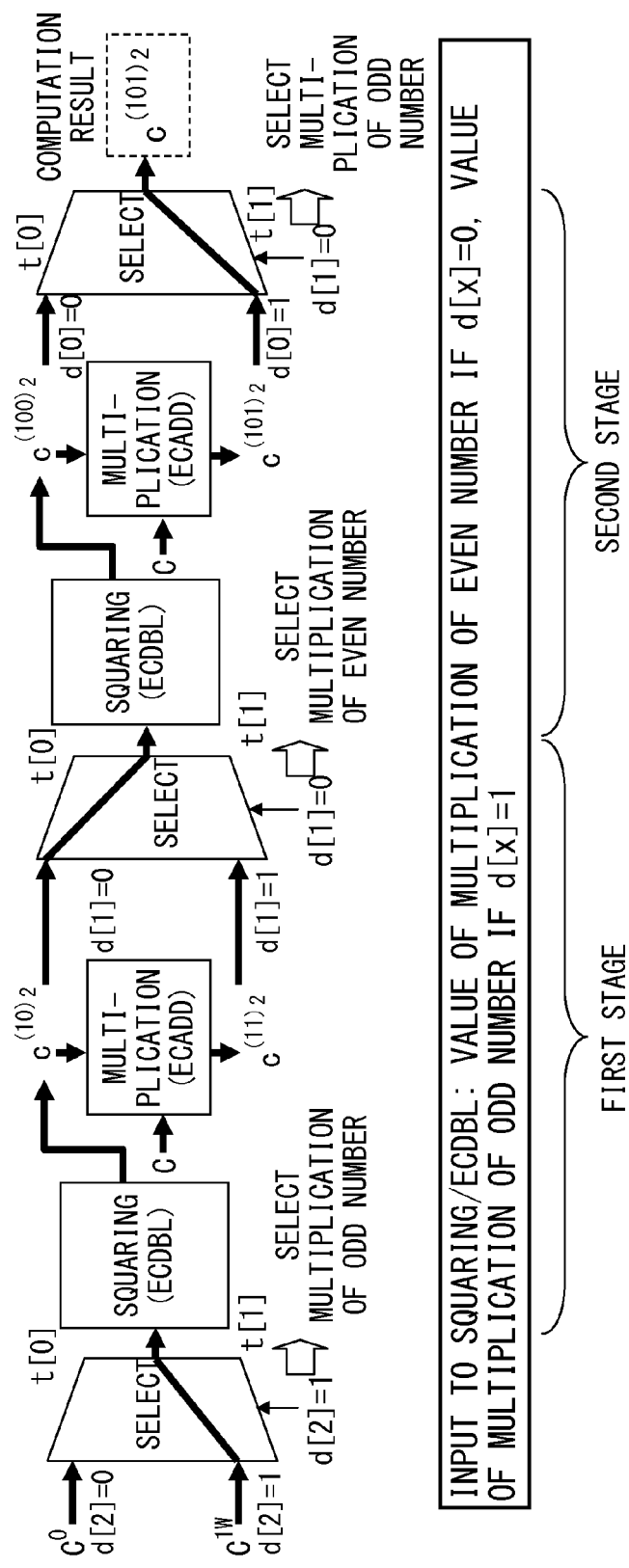

```
PointMul_ADalways(d, A)
<INPUT VALUES>
d: SECRET KEY, DENOTED AS d=d[u - 1]||···||d[1]||d[0]
   d[i] IS iTH BIT VALUE
u: BIT LENGTH OF d
A: POINT ON ELLIPTIC CURVE
<OUTPUT VALUES>
V=dA
<BUFFER>
T[0], T[1]

1501 V:=0;   /* INFINITE POINT */
1502 for (i:=u - 1 .; i 0; i:=i - 1) {
     /* PERFORM DOUBLING OF POINT (STORE COMPUTATION RESULT IN CASE OF d[i]=0 IN T[0] */
1503     T[0] :=ECDBL(T[0]);

/* PERFORM ADDITION OF POINT (STORE COMPUTATION RESULT IN CASE OF d[i]=1 IN T[1])*/
1504     T[0] :=ECADD(T[0], T[1]);

/* COPY CORRECTION COMPUTATION RESULT TO T[0] ACCORDING TO VALUE OF d[i] */
1505     T[0] := T[d[i]];
1506 }
1507 return T[0] as V;
```

F I G. 1 5

```
ModExp_RMUL_and_ADalways(a, d, n, #E)
<INPUT VALUES>
d : d: SECRET KEY. DENOTED AS d=d[u - 1]||···||d[1]||d[0]
    d[i] IS iTH BIT VALUE OF d
u: BIT LENGTH OF d
a: BASE
n: MODULUS
#E: ORDER
<OUTPUT VALUES>
v=a^d (mod n)

1601 rj := (20-BIT RANDOM NUMBER);
1602 dj' := d + #Erj
            /* MODULAR EXPONENTIATION COMPUTATION USING A&D-always METHOD */
1603 v := ModExp_ADalways(a, dj', n);
1604 return v;
```

FIG. 16

```
ModExp_RDIV_and_ADalways(a, d, n)
<INPUT VALUES>
d: SECRET KEY. DENOTED AS d=d[u - 1]||···||d[1]||d[0]
      d[i] IS  iTH BIT VALUE OF d
u: BIT LENGTH OF d
a: BASE
n: MODULUS
#E: ORDER
<OUTPUT VALUES>
v=a^d (mod n)

1701 rj  := (20-BIT RANDOM NUMBER);
1702 dj' := d /rj;
1703 ej' := d (mod rj);
        /* MODULAR EXPONENTIATION USING A&D-always METHOD */
1704 a'  := ModExp_ADalways(a, rj, n);
        /* MODULAR EXPONENTIATION USING A&D-always METHOD */
1705 t := ModExp_ADalways(a' , dj' , n);
        /* MODULAR EXPONENTIATION USING A&D-always METHOD */
1706 u := ModExp_ADalways(a, ej' , n);
1707 v := tu (mod n)
1708 return v;
```

F I G. 1 7

```
PointMul_RMUL_and_ADalways(a, d, n, #E)
<INPUT VALUES>
d: SECRET KEY. DENOTED AS d=d[u - 1]||...||d[1]||d[0]
       d[i] IS  iTH BIT VALUE OF d
u: BIT LENGTH OF d
A: POINT ON ELLIPTIC CURVE
#E: ORDER
<OUTPUT VALUES>
V= dA 1801 rj := (20-BIT RANDOM NUMBER);
1802 dj' := d + #Erj
        /* SCALAR MULTIPLICATION USING A&D-always METHOD*/
1803 V := PointMul_ADalways(A, dj');
1804 return V;
```

FIG. 18

```
PointMul_RDIV_and_ADalways(a, d, n)
<INPUT VALUES>
d: SECRET KEY. DENOTED AS d=d[u - 1]||···||d[1]||d[0]
    d[i] IS  iTH BIT VALUE OF d
u: BIT LENGTH OF d
A: POINT ON ELLIPTIC CURVE
#E: ORDER
<OUTPUT VALUES>
V= dA 1901 rj := (20-BIT RANDOM NUMBER);
1902 dj' := d /rj;
1903 ej' := d (mod rj);
     /* SCALAR MULTIPLICATION USING A&D-always METHOD */
1904 A'  := PointMul_ADalways(A, rj);
     /* SCALAR MULTIPLICATION USING A&D-always METHOD */
1905 T := PointMul_ADalways(A' , dj' );
     /* SCALAR MULTIPLICATION USING A&D-always METHOD */
1906 U := PointMul_ADalways(A, ej' );
1907 V := T+U;
1908 return V;
```

FIG. 19

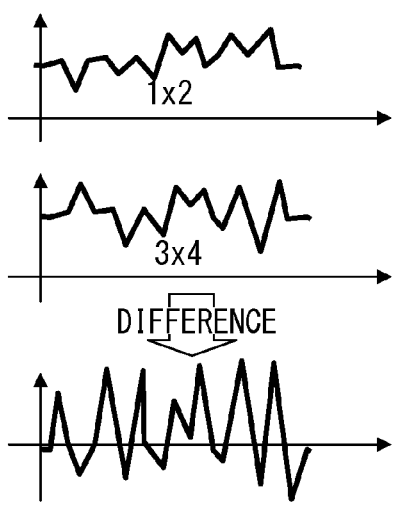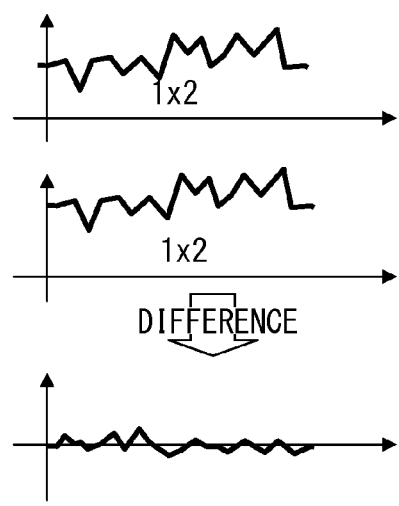
F I G. 2 0 A   F I G. 2 0 B

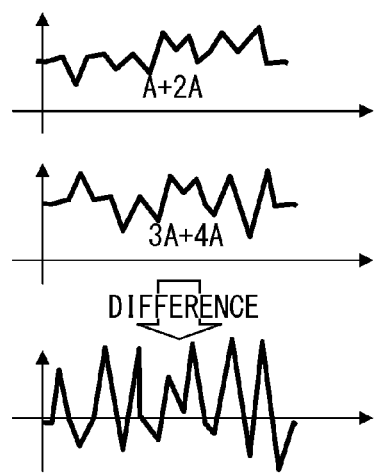
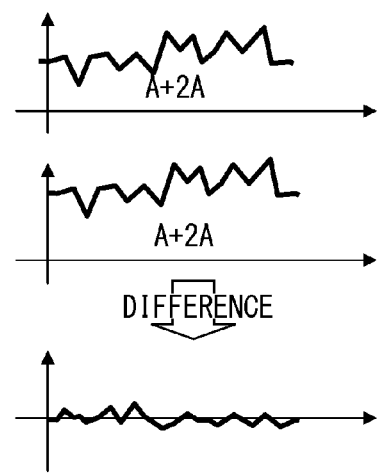
F I G. 2 1 A
F I G. 2 1 B

| VALUE OF $d[u-1]//\cdots//d[u-i+1]$ | VALUE OF $d[u-i]$ | VALUE OF $d[u-1]//\cdots//d[u-i+1]//d[u-i]$ |
|---|---|---|
| MULTIPLE OF 3 ($3k$) | 0 | MULTIPLE OF 3 ($6k$) |
|  | 1 | NON-MULTIPLE OF 3 ($6k+1$) |
| NON-MULTIPLE OF 3 ($3k+1$) | 0 | NON-MULTIPLE OF 3 ($6k+2$) |
|  | 1 | MULTIPLE OF 3 ($6k+3$) |
| NON-MULTIPLE OF 3 ($3k+2$) | 0 | NON-MULTIPLE OF 3 ($6k+4$) |
|  | 1 | NON-MULTIPLE OF 3 ($6k+5$) |

FIG. 24

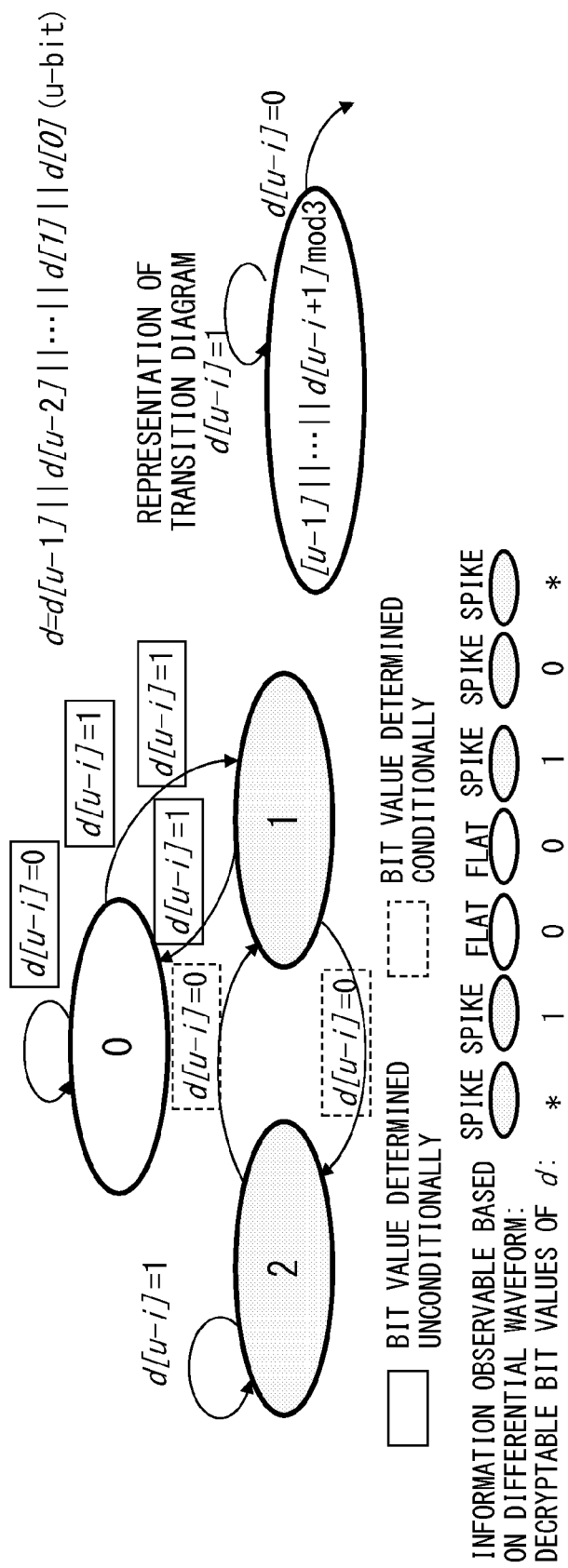
F I G. 25

| VALUE OF $d[u-1]//\cdots//d[u-i+1]$ | VALUE OF $d[u-i]$ | VALUE OF $d[u-1]//\cdots//d[u-i+1]//d[u-i]$ |
|---|---|---|
| MULTIPLE OF $\alpha$ ($\alpha k$) | 0 | MULTIPLE OF $\alpha$ ($2\alpha k$) |
|  | 1 | NON-MULTIPLE OF $\alpha$ ($2\alpha k+1$) |
| : | : | : |
| NON-MULTIPLE OF $\alpha$ ($\alpha k+(\alpha-1)/2$) | 0 | NON-MULTIPLE OF $\alpha$ ($\alpha k+\alpha-1$) |
|  | 1 | MULTIPLE OF $\alpha$ ($\alpha k+\alpha$) |
| : | : | : |
| NON-MULTIPLE OF $\alpha$ ($\alpha k+\alpha-1$) | 0 | NON-MULTIPLE OF $\alpha$ ($\alpha k+2\alpha-2$) |
|  | 1 | NON-MULTIPLE OF $\alpha$ ($\alpha k+2\alpha-1$) |

F I G. 3 1

| VALUE OF $\alpha$ | RATIO OF PRIVATE KEY BITS LEAKED |
|---|---|
| 3 | 2/3 |
| PRIME NUMBER EQUAL TO OR LARGER THAN 5 | $3/(2\alpha)$ |

FIG. 32

FIG. 35A  IF RANDOMIZED PRIVATE KEYS ARE EQUAL 1024-bit (MODULAR EXPONENTIATION) /160-bit (SCALAR MULTIPLICATION OF POINT) OR MORE

ALL BITS MATCH $d_1'$ = 10111001010010010100100100100111000010010101000011000001...

$d_2'$ = 10111001010010010100100100100111000010010101000011000001...

DIFFERENTIAL WAVEFORM CORRESPONDING TO ALL BITS BECOMES FLAT ACCORDING TO BIT VALUES OF THE KEY

FIG. 35B  IF RANDOMIZED PRIVATE KEYS DIFFER 1024-bit (MODULAR EXPONENTIATION) /160-bit (SCALAR MULTIPLICATION OF POINT) OR MORE $d_1'$ = 1010100101001001010010010010011100001001010100001 1000001.....

ONLY STARTING 4 BITS MATCH $d_2'$ = 1010011111010111101101100101010101010101101011101001010101010.....

DIFFERENTIAL WAVEFORM AT AND AFTER TIME POINT WHEN KEY BITS MISMATCH ALWAYS HAS PEAK
(ONLY STARTING 20 BITS MATCH IN CASE OF 2-BIT RANDOM NUMBER)

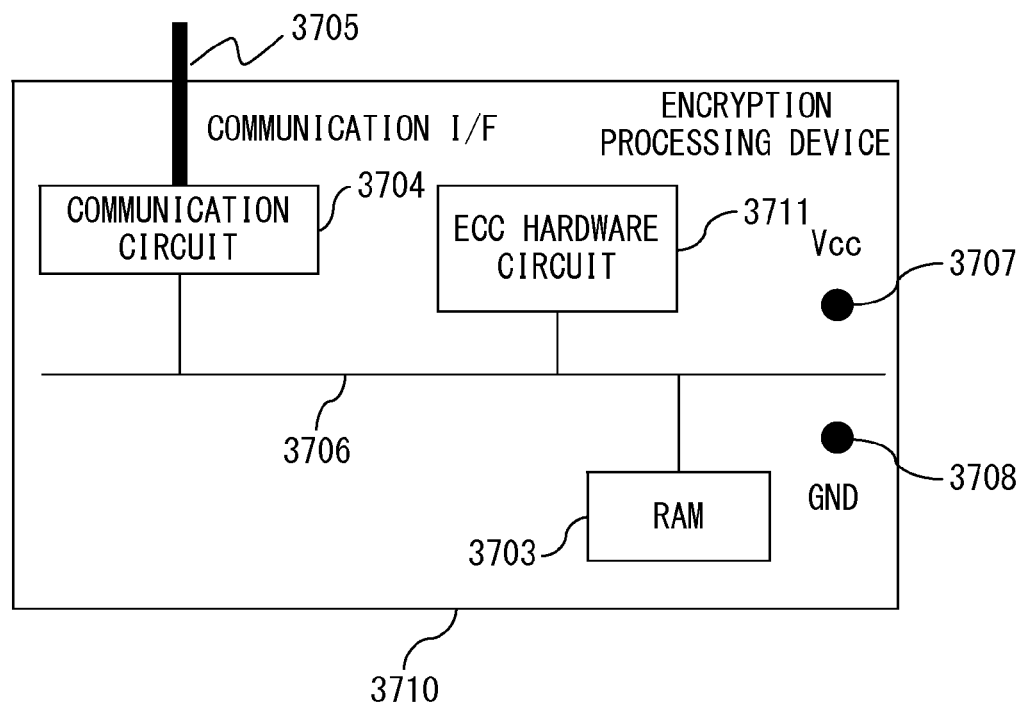
F I G. 38

- 4300: INPUTTING U-BIT EXPONENT d=d[u-1] || ⋯ || d[0] (d[i]:1- BIT VALUE) BASE a, AND MODULUS n
- 4301: t[0] ← 1
- 4302: i ← u - 1
- 4303: t[0] ← t[0] ×t[0] (mod n)
- 4304: t[1] ← t[0] ×a (mod n)
- 4305: t[0] ← t[d[i]]
- 4306: i ← i - 1
- 4307: i≥0? yes/no
- 4308: v ← t[0]
- 4309: OUTPUTTING v, AND ENDING PROCESS

FIG. 43

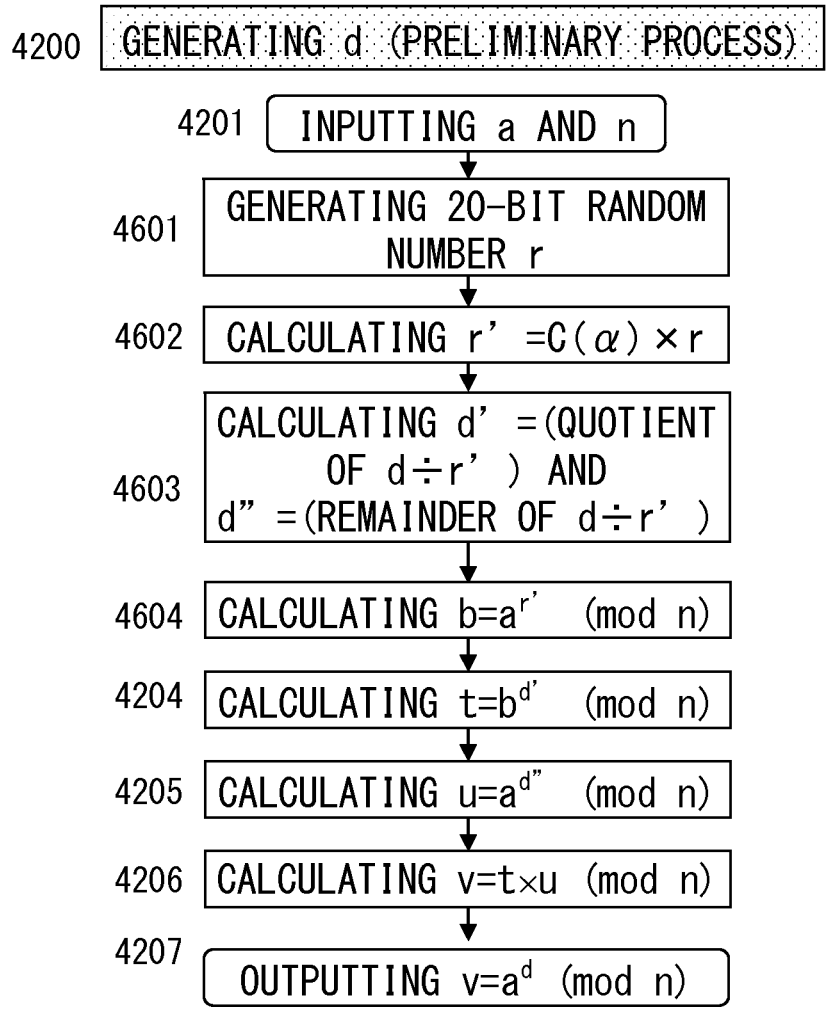
F I G. 4 6

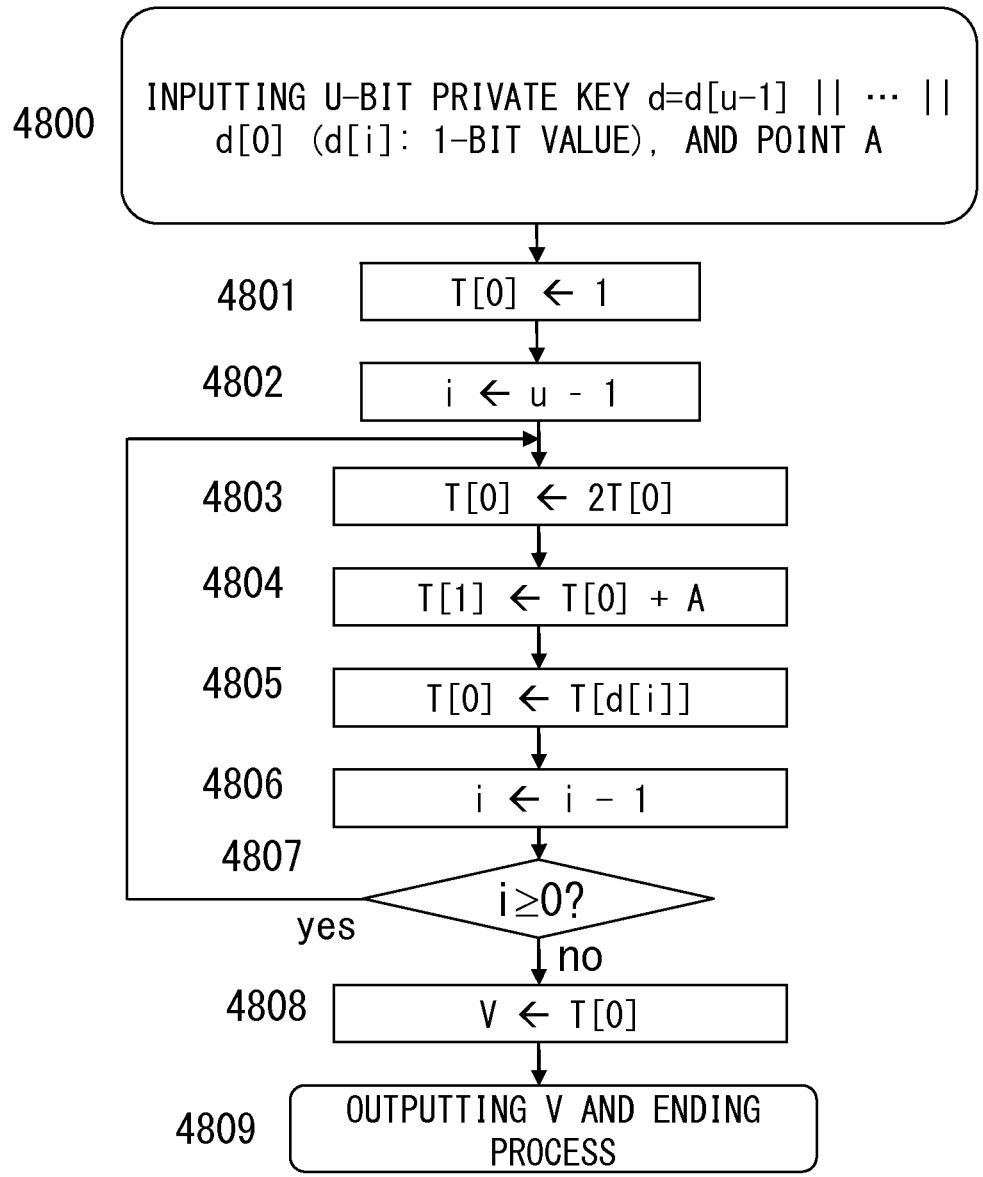
F I G. 4 8

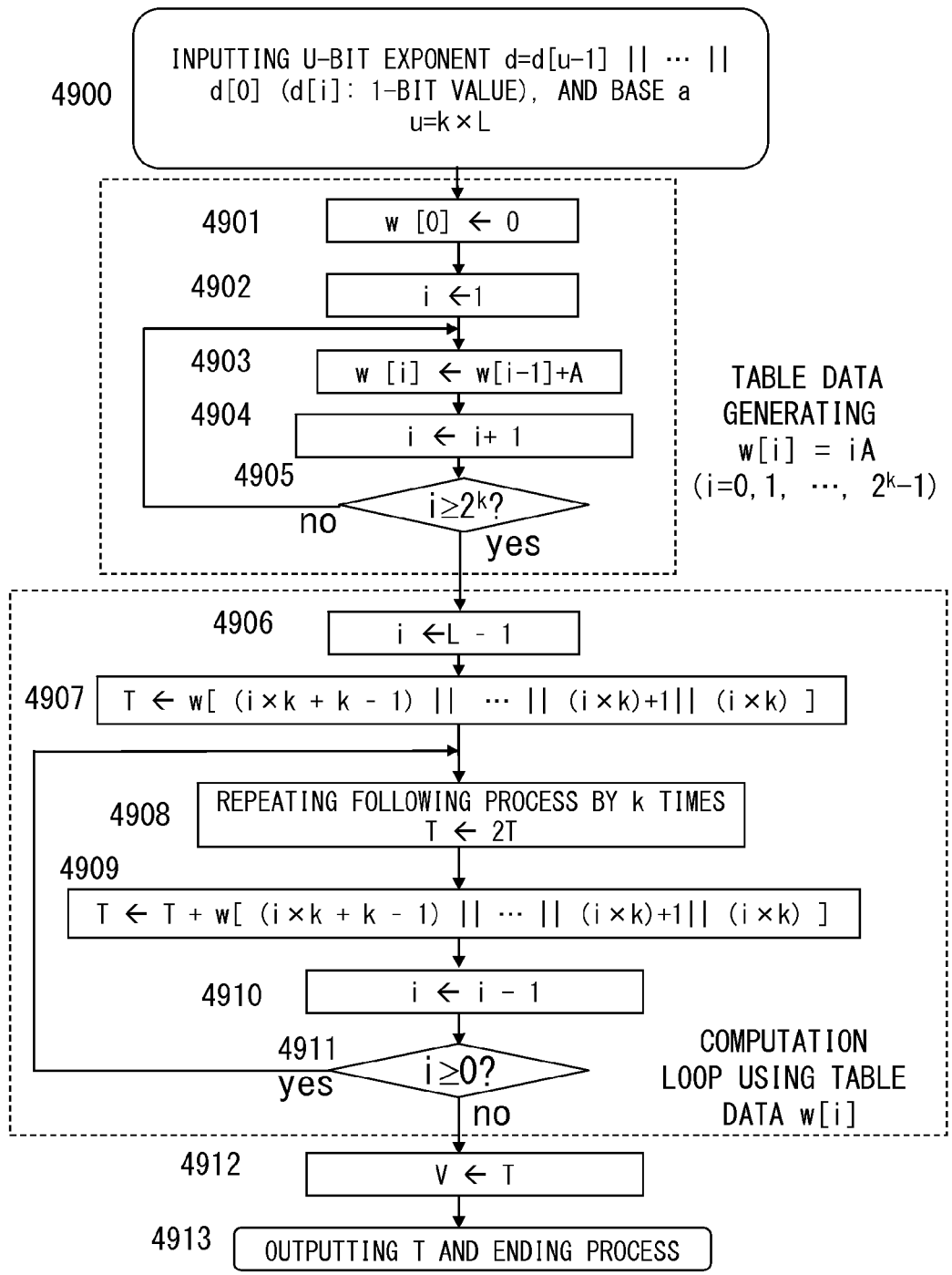
F I G. 49

ENCRYPTION PROCESSING DEVICE AND METHOD

CROSS-REFERENCE TO RELATED APPLICATIONS

This application is a continuation application of International Application PCT/JP2010/073636 filed on Dec. 27, 2010 and designated the U.S., the entire contents of which are incorporated herein by reference.

FIELD

The embodiments discussed herein are related to an encryption processing device and method, which improve tamper-proofness in an encryption process.

BACKGROUND

In recent years, the importance of information security technologies has been increasing. Moreover, public-key cryptography has been actively studied as one of fundamental techniques of information security.

Public-key cryptography includes several types. Algorithms such as Rivest, Shamir, Adleman (RSA), and Diffie-Hellman (DH), which use a modular exponentiation computation, elliptical curve cryptography (ECC) using a scalar multiplication of a point on an elliptic curve, and the like are known.

In use of public-key cryptography, it is important to keep a private key secret in order to retain security. In recent years, however, several attack methods for decrypting (or breaking) a private key have been known. Accordingly, for tamper-proofness of a device for executing a process using public-key cryptography, the device needs to take at least measures against known attack methods.

For example, an attack method called a power analysis (PA) attack is known as one type of side-channel attacks. Moreover, PAs include two types such as a simple power analysis (SPA) and a differential power analysis (DPA).

Accordingly, for a device that executes a process using public-key cryptography, safety from SPA attacks and safety from DPA attacks are demanded. For example, an A&D-always method is one of measures against SPA attacks, whereas a method for randomizing data is one type of measures against DPA attacks.

Conventionally, it was considered that devices were safe from both of SPAs and DPAs by combining an SPA measure implemented with the A&D-always method and a DPA measure implemented with the randomizing method, thereby making it possible to completely prevent power analyses.

However, the inventor devised an attack method that can decrypt a value of a private key d by using a power waveform even if these measures are taken. This attack is referred to as a "special PA" in this application.

Initially, the inventor found out that the following attack can be conducted as a special PA when the private key d is not randomized. Namely, it was proved that an attacker can decrypt two-thirds of all bit values of the private key d with a special PA using a selected message pair of P and Q that satisfy $P^3=Q^3$ (mod n) and $P \neq Q$ for a device having a modular exponentiation function. Also for a device having a scalar multiplication function of a point, it was proved that an attacker can decrypt two-thirds of all the bit values of the private key d by conducting a similar attack with a special PA using a selected message pair of P and Q that satisfy $3P=3Q$ and $P \neq Q$. Moreover, it was proved that this attack can be expanded to a special PA using a selected message pair of P and Q that satisfy $P^\alpha = Q^\alpha \pmod{n}$ and $P \neq Q$ (or $\alpha P = \alpha Q$ and $P \neq Q$) for a prime number $\alpha$ equal to or larger than 3.

Next, the inventor found out that the following attack can be conducted as a special PA used when a private key d is randomized. Namely, randomized exponents are made to match so that randomized private keys become identical in a case where P is input and in a case where Q is input, whereby an attack method similar to that in the case where the private key is not randomized can be applied. The simplest way to implement this is to repeat a power measurement when Q is given by a plurality of times until a randomized key in a case where P is given and that in a case where Q is given match. Although the length of time needed for this power measurement is not short at all, it was proved that the power measurement needed to successfully conduct the attack can be completed within a sufficiently realistic time frame. For the power measurement, the length of time in units of seconds proportional to the number of times that the power measurement is made is demanded due to a computation process and a communication time of a low-speed device such as a smart card or the like. However, once the power measurement has been completed and data of the power measurement has been transferred to a PC, the high-performance PC can analyze the data at high speed.

PRIOR ART DOCUMENTS

Patent Documents

[Patent Document 1] Japanese Laid-open Patent Publication No. 2000-132096

[Patent Document 2] Japanese Laid-open Patent Publication No. 2003-233307

[Patent Document 3] International Publication Pamphlet WO2009/122461

Non-Patent Documents

[Non-patent document 1] [IEEE P1363] IEEE P1363/D13 (Draft Version 13, Nov. 12, 1999) main document, Standard Specifications for Public Key Cryptography, http://grouper.ieee.org/groups/1363/P1363/draft.html

[Non-patent Document 2] [Kocher99] P. Kocher, J, Jaffe and B. Jun "Differential Power Analysis", Crypto'99, LNCS 1666, pp. 388-397, Springer-Verlag, 1999.

[Non-patent Document 3] Jean-Sebastein Coron, "Resistance against Differential Power Analysis for Elliptic Curve Cryposystems", Cryptographic Hardware and Embedded Systems (CHES'99), LNCS 1717, pp. 144-157, Springer-Verlag, 1999.

[Non-patent Document 4] "Portable Data Carrier Provided with Access Protection by Dividing up Codes", European Patent No. EP1262037.

SUMMARY

According to an aspect of the embodiments, an encryption processing device, comprising: a constant multiplier, to which a first base a and a modulus n are input, configured to perform a modular exponentiation computation for the modulus n by using a specified constant as an exponent for the first base a, and to output a computation result as a second base b; a private key converter, to which a first private key d is input, configured to compute a second private key d' as a quotient obtained by dividing the first private key d by the specified constant; a correction key generator configured to generate a correction key d″ as a remainder obtained by dividing the first private key d by the specified constant; a first modular exponentiation computing unit configured to perform a modular exponentiation computation for the modulus n by using the second private key d′ as an exponent for the second base b, and to output a computation result; a second modular exponentiation computing unit configured to perform a modular exponentiation computation for the modulus n by using the correction key d″ as an exponent for the first base b, and to output a computation result as a correction value; and a correction computing unit, to which the computation result output by the first modular exponentiation computing unit and the correction value output by the second modular exponentiation computing unit are input, configured to perform a correction computation, which is a multiplication process based on the modulus n, and to output a computation result of the correction computation as an encryption process result obtained when the modular exponentiation computation for the modulus n is executed by using the first private key d as an exponent for the first base a.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 1 illustrates Table 1 that represents associations between RSA and ECC computations;

FIG. 3 is an explanatory diagram of a simple power analysis (SPA) and a differential power analysis (DPA);

FIG. 4 illustrates an algorithm of a modular exponentiation computation process using a binary method;

FIG. 7 illustrates an algorithm of a scalar multiplication process of a point using the binary method;

FIGS. 11A and 11B are an explanatory diagram of a DPA measure using data randomization;

FIG. 12 illustrates an algorithm of a modular exponentiation computation (function ModExp_ADalways) using an A&D-always method;

FIG. 13 is an explanatory diagram of the A&D-always method;

FIG. 15 illustrates an algorithm of a scalar multiplication (function PointMul_ADalways) of a point using the A&D-always method;

FIG. 16 illustrates an algorithm of a modular exponentiation computation (function ModExp_RMUL_and_Adalways) performed by a combination of an SPA measure implemented with the A&D-always method and a DPA measure referred to as a conventional method 1;

FIG. 17 illustrates an algorithm of a modular exponentiation computation (ModExp_RDIV_and_Adalways function) by a combination of the SPA measure implemented with the A&D-always method and a DPA measure referred to as a conventional method 2;

FIG. 18 illustrates an algorithm of a scalar multiplication (function PointMul_RMUL_and_ADalways) of a point by a combination of the SPA measure implemented with the A&D-always method and the DPA measure referred to as the conventional method 1;

FIG. 19 illustrates an algorithm of a scalar multiplication (function PointMul_RDIV_and_ADalways) of a point by a combination of the SPA measure implemented with the A&D-always method and the DPA measure referred to as the conventional method 2;

FIGS. 20A and 20B illustrate correlations between a data value and consumed power in a multiplication;

FIGS. 21A and 21B illustrate correlations between an addition data value of a point and consumed power;

FIG. 24 illustrates Table 2 that represents associations between a value d[u−i] of an exponent incremented by 1 bit when the A&D-always method is executed and a determination of whether or not values of the exponent before and after being incremented by 1 bit are a multiple of 3;

FIG. 25 is a diagram of state transitions that represent the associations of Table of FIG. 24;

FIG. 31 illustrates Table 3 that represents associations between a value d[u−i] of an exponent incremented by 1 bit when the A&D-always method is executed and a determination of whether or not values of the exponent before and after being incremented by 1 bit are a multiple of a prime number a;

FIG. 32 illustrates Table 4 that represents a decryption capability of a special PA using $P^\alpha=Q^\alpha$ (mod n) and $P \ne Q$ (or $\alpha P=\alpha Q$ and $P \ne Q$);

FIGS. 35A and 35B illustrate a differential waveform (upper portion) and that (lower portion) when randomized private keys match;

FIG. 38 illustrates an example of a second hardware configuration of the encryption processing devices according to the first to the third embodiments;

FIG. 43 is a flowchart illustrating details (No. 1) of a modular exponentiation computation process in the first to the third embodiments;

FIG. 46 is a flowchart illustrating a control process of the third embodiment;

FIG. 48 is a flowchart illustrating details (No. 1) of a scalar multiplication process of a point in the fourth to the sixth embodiments;

FIG. 49 is a flowchart illustrating details (No. 2) of the scalar multiplication process of a point in the fourth to the sixth embodiments;

DESCRIPTION OF EMBODIMENTS

Figure 2:
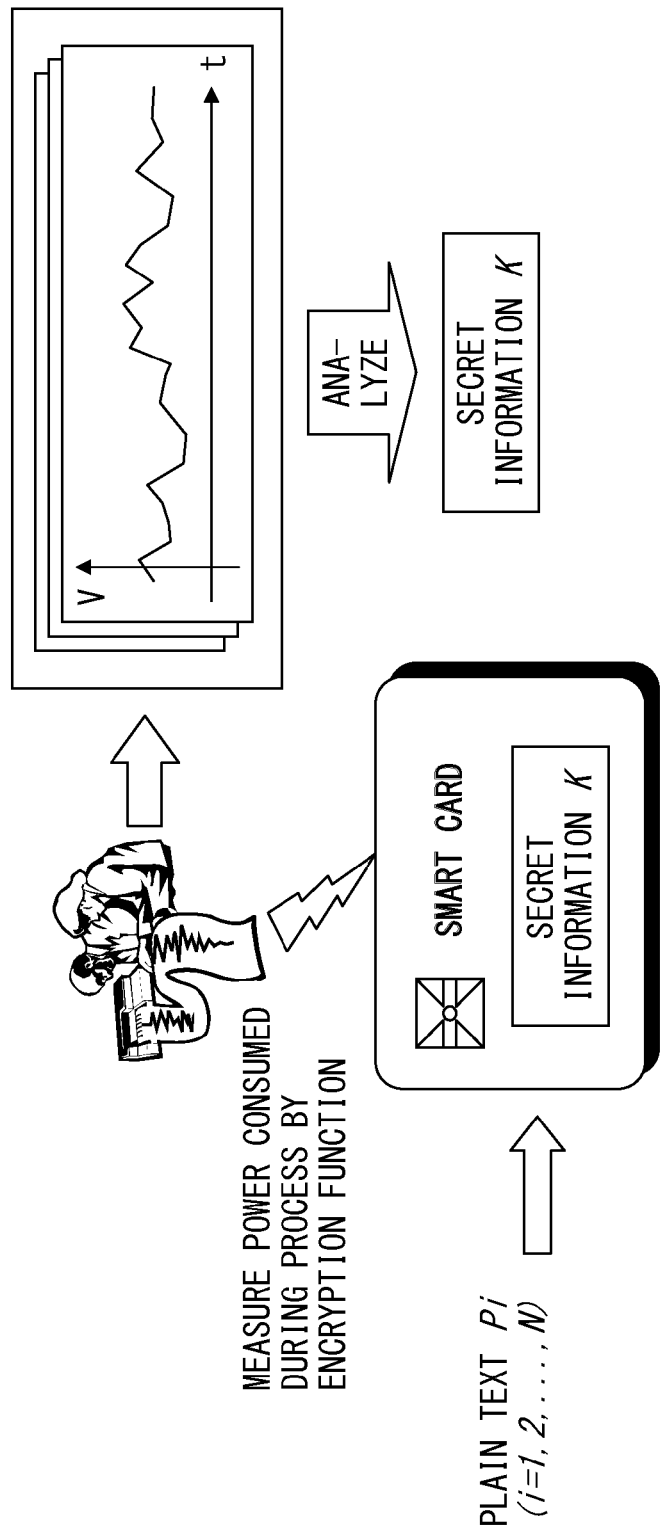
FIG. 2 is an explanatory diagram of an outline of a power analysis.

Preferred embodiments of the present invention will be explained below with reference to accompanying drawings. An order of explanations is as follows.

Encryption processing devices according to first to sixth embodiments to be described later are devices that have an SPA measure function implemented with an A&D-always method and a DPA measure function implemented with a randomization method, further have a measure function against special PAs, and perform a modular exponentiation computation or a scalar multiplication of a point on an elliptic curve. To help understand the first to the sixth embodiments, the modular exponentiation computation and the computation on an elliptic curve are initially described. Also first to third comparison examples are described to help understand the first to the sixth embodiments. Moreover, a special PA method in a case where a private key d is not randomized, and that in a case where the private key d is randomized are described. These special PA methods were found by the present inventor. Thereafter, findings that the inventor obtained from reviews of the comparison examples and the special PAs, and the first to the sixth embodiments developed by the inventor based on the findings are sequentially described.

<Outline of the Modular Exponentiation Computation>

The modular exponentiation computation is initially described. In RSA and DH, a computation using a process called the modular exponentiation computation is performed. The modular exponentiation computation is a computation for calculating an expression (0.1) based on a base a, an exponent x, and a modulus n.

$$z=a^x \pmod{n} \tag{0.1}$$

In RSA and DH, a process for which x is assumed as secret information is executed. For example, in a decryption computation of RSA, a decryption process is executed by calculating m that satisfies an expression (0.2) based on an encrypted text c, a private key d, and a public modulus n.

$$m=c^d \pmod{n} \tag{0.2}$$

For a DH key exchange, the above provided expression (0.2) is calculated based on a public key c, a private key d, and a public modulus n of a communication partner, so that a common key m is obtained. For an electronic signature, an electronic signature m is obtained by calculating the above expression (0.2) based on signature target data c, a private key d, and a modulus n.

In the following explanation, an expression (0.3) is used as a general expression.

$$v=a^d \pmod{n} \tag{0.3}$$

In any of the processes, it is difficult for a third party who does not know a value of the private key d to calculate m, which is a correction result of a decryption process, a common key, or a result of the electronic signature process, even if he or she knows the values of c and n.

<Outline of ECC Computation>

A computation on an elliptic curve is described next. Main curves among elliptic curves used in ECC are an elliptic curve of an expression (1.1) defined in a prime field GF(p), and an elliptic curve of an expression (1.2) defined in an extension field GF($2^m$) of 2 (GF is an abbreviation of Galois field, and p is a prime number).

$$y^2=X^3+a\,x+b \pmod{p} \tag{1.1}$$

where p is a prime number, a and b are elliptic curve parameters (0≤a, b<p), and a,b,x,y∈GF(p).

$$y^2+xy=x^3+ax^2+b \pmod{f(x)} \tag{1.2}$$

where f (x) is a polynomial of GF($2^m$), a and b are elliptic curve parameters (0≤a, b<p), and a,b,x,y∈GF($2^m$).

As described above, a and b are called elliptic curve parameters, which are intended to uniquely decide an elliptic curve.

A point A on an elliptic curve represented by the expression (1.1) is represented as A=(x,y) with a combination of x and y that satisfy the expression (1.1). Similarly, a point A on an elliptic curve represented by the expression (1.2) is represented as A=(x, y) with a combination of x and y that satisfy the expression (1.2).

Moreover, an infinite point (point at infinity) and a base point are defined as special points on an elliptic curve. Hereinafter, the infinite point and the base point are denoted as "O" and "G", respectively. The base point G is one of points on an elliptic curve, and shared by users of elliptic curve encryption. The base point G is used in various types of functions, such as generation of a pair of public and private keys, using elliptic curve encryption.

The following discussion in this specification is satisfied for both of the elliptic curve represented by the expression (1.1) and that represented by the expression (1.2). Accordingly, expressions such as "elliptic curve", "point A", "point (x,y)", "x coordinate", "y coordinate", "elliptic curve parameters a and b", and the like are hereinafter used without making a distinction between the expressions (1.1) and (1.2) in some cases.

When a certain calculation (hereinafter referred to as an addition, and denoted as "+") is defined for points on an elliptic curve, it is known that a set of points on the elliptic curve forms a commutative group. The infinite point O corresponds to a zero element (namely, an identity element in the addition). Moreover, an expression (1.3) is satisfied for an arbitrary point A (the point A may be the infinite point O) on the elliptic curve.

$$A+O=O+A=A \qquad (1.3)$$

Hereinafter, an inverse element of the point A is denoted as "−A". x and y coordinates of the point −A can be calculated with an addition or a subtraction in a field GF(p) or GF($2^m$) in which an elliptic curve is defined. Specifically, the point −A, which is the inverse element of the point A=(x, y), is represented by an expression (1.4) when an elliptic curve is defined by the expression (1.1), or the point −A is represented by an expression (1.5) when an elliptic curve is defined by the expression (1.2).

$$-A=(x,-y) \qquad (1.4)$$

$$-A=(x,x+y) \qquad (1.5)$$

Also x and y coordinates of a point $A_3$ represented as $A_3=A_1+A_2$ based on certain points $A_1$ and $A_2$ can be calculated with an addition, a subtraction, a multiplication or a division in the field GF(p) or GF($2_m$) by using x and y coordinates of the points $A_1$ and $A_2$. Here, if $A_2=A_1$, $A_3=A_1+A_2$ is also represented as $2A_1$, and a calculation for obtaining the point $A_3=2A_1$ from the point $A_1$ is referred to as doubling. Also doubling is implemented with an addition, a subtraction, a multiplication or a division in the field GF(p) or GF($2^m$).

Additionally, a subtraction is defined as an addition of an inverse element as represented by an expression (1.6).

$$A_1-A_2=A_1+(-A_2) \qquad (1.6)$$

Furthermore, for the point A on the elliptic curve, a computation called a scalar multiplication is defined by using an integer x called a scalar value. The scalar multiplication of a point is a process for calculating a point V on an elliptic curve, which satisfies $$V=xA \qquad (1.7)$$

from the point A on the elliptic curve, and the integer x called a scalar value.

In ECC, a process for which x is assumed as secret information is executed. Assuming that a point on an elliptic curve, which is a public key of a communication partner, is A and a private key is d in a case of an EDCH key exchange, the point V on the elliptic curve, which satisfies $$V=dA \qquad (1.8)$$

is calculated, so that a safe key agreement is implemented. It is difficult for a third party who does not know the value of the private key d to calculate a correct value of the common key.

In the expression (1.8), d is a private key, which is a value that is not be leaked to illegal third parties such as an attacker or the like. Namely, in ECC, protection of the value of d is an important tamper-proof function.

Mathematically, obtaining the value of d is known as a discrete logarithm problem such that the amount of computation for calculating d is too large to obtain d in a realistic time frame even if values other than d are known in the expression (1.8). More specifically, it is known that there is a difficulty in obtaining the value of d even if the values of A and V are known when elliptic curve parameters are equal to or larger than 160 bits.

For a public key and a private key in elliptic curve encryption, a public key is given by V that satisfies V=dG based on the above described base point G and scalar value d that represents a private key. Namely, the public key V is a point on an elliptic curve, whereas the private key d is a scalar value. Even if an attacker learns the point G and V, it is very difficult to calculate the private key d from the point G and V. This is because the amount of this calculation is enormous. This is also known as the calculation difficulty of the discrete logarithm problem.

Additionally, ECC is also available for a key agreement using a DH algorithm, a digital signature algorithm (DSA), and the like. For whatever purpose ECC is used, a process using ECC includes a scalar multiplication. The process using ECC is as follows by taking a DH key agreement as an example.

Assume that a private key of a first device is $d_A$ and that of a second device is $d_B$. In this case, a public key $Q_A$ of the first device is calculated as $Q_A=d_AG$ from a base point G, and a public key $Q_B$ of the second device is calculated as $Q_B=d_BG$ from the base point G. In this way, a scalar multiplication is performed to generate a public key.

Additionally, the first device transmits the public key $Q_A$ of the local device to the second device, which then transmits the public key $Q_B$ of the local device to the first device. Then, the first device calculates $d_AQ_B$ with a scalar multiplication, and also the second device calculates $d_BQ_A$ with a scalar multiplication. As a result, the first device and the second device can share the same key K as represented by an expression (1.9).

$$K=d_AQ_B=d_A(dBG)=d_B(dAG)=d_BQ_A \qquad (1.9)$$

If ECC is used for a purpose other than the above described DH key agreement, a scalar multiplication is also performed.

<Power Analysis (PA)>

As described above, it is known that a private key d difficult to be mathematically obtained can be easily decrypted by using a power analysis (PA). A fundamental mechanism of PAs is highly associated with a process procedure of a modular exponentiation computation for calculating the expression (0.3), or that of a scalar multiplication of a point for calculating the expression (1.8). PAs against a modular exponentiation computation and a scalar multiplication of a point are explained after computation procedures of the modular exponentiation computation and the scalar multiplication of a point are described.

Intuitively, since there are associations represented by Table 1 of FIG. 1, it becomes easy to simultaneously understand RSA and ECC computations based on these associations. In FIG. 1, a modular exponentiation computation "$a^d$ (mod n)" in RSA makes an association with a scalar multiplication of a point "dA" in ECC. A multiplication "a×d (mod n)" in RSA makes an association with an addition of a point "A+B" in ECC. A division "a×$d^{-1}$ (mod n)" in RSA makes an association with a subtraction of a point "A-B" in ECC. Squaring "$a^2$ (mod n)" in RSA makes an association with doubling of a point "2A" in ECC. A value "1" in RSA makes an association with an "infinite point O" in ECC. A multiplication of a value "1" "1×a=a×1=a" in RSA makes an association with an addition of the "infinite point O" "0+A=A+0=A" in ECC. Squaring "$1^2$=1" of the value "1" in RSA makes an association with doubling "2O=O" of the infinite point O in ECC.

A PA is an analysis method (Non-patent Document 2) found out in 1998. As illustrated in FIG. 2, this is a method for measuring power consumed by a device such as a smart card or the like that is executing an encryption function (hereinafter referred to as an encryption process), and for estimating and analyzing secret information of a user, which is stored within the device, with the use of the measured data (FIG. 2).

<PA Types: simple power analysis (SPA) and differential power analysis (DPA)>

PAs include two types such as a simple power analysis (SPA) and a differential power analysis (DPA) (FIG. 3). Both of the attacks are those for breaking a private key by observing an internal state of an encryption processing device with a power waveform.

An SPA is an attack method using a single power waveform. As illustrated in FIG. 3(a), a private key (encryption key, secret key) is broken by directly observing contents of a process executed by an encryption processing device based on a shape of a power waveform with the use of a correlation between the contents of the process and an encryption key.

A DPA is an attack method using a difference among a plurality of power waveforms. As illustrated in FIG. 3B, a private key (encryption key, secret key) is broken by indirectly observing a data value processed within an encryption processing device based on a difference among a plurality of power waveforms with the use of a correlation between contents of a process and an encryption key.

As described above, a PA attack is one type of non-invasive attacks, which attempts to decrypt a scalar value d used as a private key by measuring power consumed by a device that is performing a scalar multiplication. Accordingly, for whatever purpose RSA, DH, or ECC is used, it is effective to take a measure that does not make a waveform of power consumed by a device that is performing a modular exponentiation computation or a scalar multiplication exhibit a feature of a private key d as a measure to prevent the private key d from being leaked. If no measures are taken against a PA attack, a private key d can be possibly decrypted based on a feature of a waveform of power consumed by a device that is performing a modular exponentiation computation or a scalar multiplication. Since an SPA and a DPA are attack methods of different types, measures need to be taken against both of an SPA and a DPA.

Encryption processing devices according to the first to the sixth embodiments to be described later are designed to be safe from a special PA to be described later in addition to both an SPA attack and a DPA attack. Accordingly, to help understand advantages of the first to the sixth embodiments, some comparison examples are described next.

<Binary Method (First Comparison Example)>

A "binary method" is initially described as a first comparison example. This method is hereinafter referred to as the first comparison example. The binary method is vulnerable to both SPA and DPA attacks.

The binary method in a modular exponentiation computation is firstly described.

When a modular exponentiation represented by the expression (0.3) is simply calculated if all of n, a, and d in the expression (0.3) have a length equal to or longer than 1,024 bits, a multiplication using (mod n) needs to be performed by d times. Since this needs the amount of calculation equal to or larger than $2^{1024}$, it is not realistic. As a technique for reducing this amount of calculation to $\log_2 d$, a computation called the binary method is known.

Figure 5:
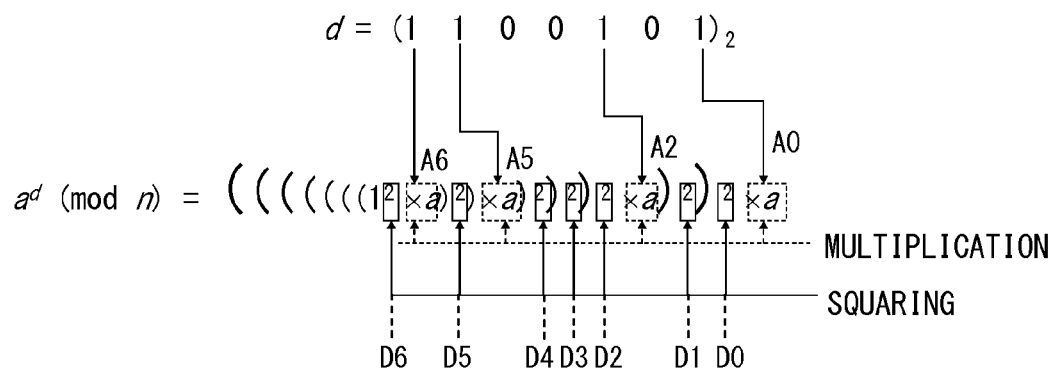
FIG. 5 is an explanatory diagram of the modular exponentiation computation process using the binary method.

FIG. 4 illustrates an algorithm of the binary method in the modular exponentiation computation, and FIG. 5 illustrates an outline of the process.

Here, for convenience of an explanation, a bit length of a private key d is assumed to be u. Moreover, an ith bit of the private key d is denoted as d[i] ($0 \le i \le u-1$). d[0] is the least significant bit (LSB), and d[u−1] is the most significant bit (MSB). Then, the private key d of u bits is as represented by an expression (2.1).

$$d = d[u-1] \| \ldots \| d[1] \| d[0] \quad (2.1)$$

where "||" indicates a concatenation of bit strings having a length equal to or longer than 1 bit.

Then, an expression (2.2) is obtained based on the expressions (0.3) and (2.1).

$$a^d (\bmod n) = a ** (2^{u-1} d[u-1] + 1 + \ldots + 2^1 d[1] + 2^0 d[0]) (\bmod n) \quad (2.2)$$
$$= a  (2^{u-1} d[u-1]) (\bmod n) \times \ldots a  (2^1 d[1])$$
$$(\bmod n) \times a ** (2^0 d[0]) (\bmod n)$$

where "**" indicates a modular exponentiation computation.

The binary method is a calculation procedure using the expression (2.2). In the expression (2.2), the bit value d[i] of d is scanned sequentially from the high-order bit to the low-order bit (namely, from i=u−1 to 0), and the following expression (2.3) is computed according to the bit value d[i] of d.

If d[i]=1: perform a multiplication (v: =v×a(mod n)) after squaring (v: =v×v(mod n)).

$$\text{If } d[i]=0: \text{ perform only squaring } (v: v \times v = (\bmod n)). \quad (2.3)$$

For example, a case where the private key d is $(1100101)_2$ is specifically described. The binary method is a method for implementing a modular exponentiation computation based on an expression (2.4).

$$a^d (\bmod n) = ((((((1^2 \times a)^2) \times a)^2)^2) \times a)^2)^2 \times a (\bmod n) \quad (2.4)$$

Namely, if a result of a scalar multiplication is represented with a variable v, the variable v is firstly initialized with a value 1 in the binary method as represented by an expression (2.5) (line 401 of FIG. 4).

$$v = 0 \quad (2.5)$$

Thereafter, the expression (2.3) is executed sequentially from the MSB to the LSB (a loop process from line 402 line to line 405 of FIG. 4). Namely, a process for obtaining v×v (mod n) with squaring, for thereafter performing a multiplication if d[i]=1, and for assigning an obtained result to the variable v (line 404 of FIG. 4) is repeated. Then, an obtained value is finally output to the variable v (line 406 of FIG. 4).

Specifically, d[6]=1. Therefore, squaring and a multiplication are performed for the 6th bit as represented by an expression (2.6) (D6 and A6 of FIG. 5).

$$v = 1^2 \times a (\bmod n) \quad (2.6)$$

Additionally, d[5]=1. Therefore, squaring and a multiplication are performed for the 5th bit as represented by an expression (2.7) (D5 and A5 of FIG. 5).

$$v = (1^2 \times a)^2 \times a (\bmod n) \quad (2.7)$$

Furthermore, d[4]=0. Therefore, only squaring is performed and an addition is not performed for the 4th bit as represented by an expression (2.8) (D4 of FIG. 5).

$$v = ((1^2 \times a)^2 \times a)^2 (\bmod n) \quad (2.8)$$

Similarly, since d[3]=0, only squaring is performed and addition is not performed for the 3rd bit as represented by an expression (2.9) (D3 of FIG. 5).

$$v = (((1^2 \times a)^2 \times a)^2)^2 (\bmod n) \quad (2.9)$$

For the second bit, d[2]=1. Therefore, squaring and a multiplication are performed as represented by an expression (2.10) (D2 and A2 of FIG. 5).

$$v=((((1^2 \times a)^2 \times a)^2)^2 \times a \pmod{n} \tag{2.10}$$

Still further, for the first bit, d[1]=0. Therefore, only squaring is performed and a multiplication is not performed as represented by an expression (2.11) (D1 of FIG. 5).

$$v=(((((1^2 \times a)^2 \times a)^2)^2 \times a)^2 \pmod{n} \tag{2.11}$$

Lastly, for the 0th bit, d[0]=1. Therefore, squaring and a multiplication are performed as represented by an expression (2.12) (D0 and A0 of FIG. 5).

$$v=(((((1^2 \times a)^2 \times a)^2)^2 \times a)^2)^2 \times a \pmod{n} \tag{2.12}$$

An exponent of the point a, which is multiplied according to the ith bit (d[i]=1) as described above, is $2^i$ as understood from the expression (2.12). Accordingly, with the procedures described with the above provided expressions (2.5) to (2.12), $v=a^d \pmod n$ can be surely obtained based on the expression (2.4).

As is evident from the above described example, with the binary method, the number of times that squaring is performed is equal to the bit length u of the private key d, and the number of times that a multiplication is performed is equal to a Hamming weight of the private key d. Accordingly, the amount of calculation of the modular exponentiation computation with the binary method is not the order of $2^u$ but reduced to the order of u.

Figure 6:
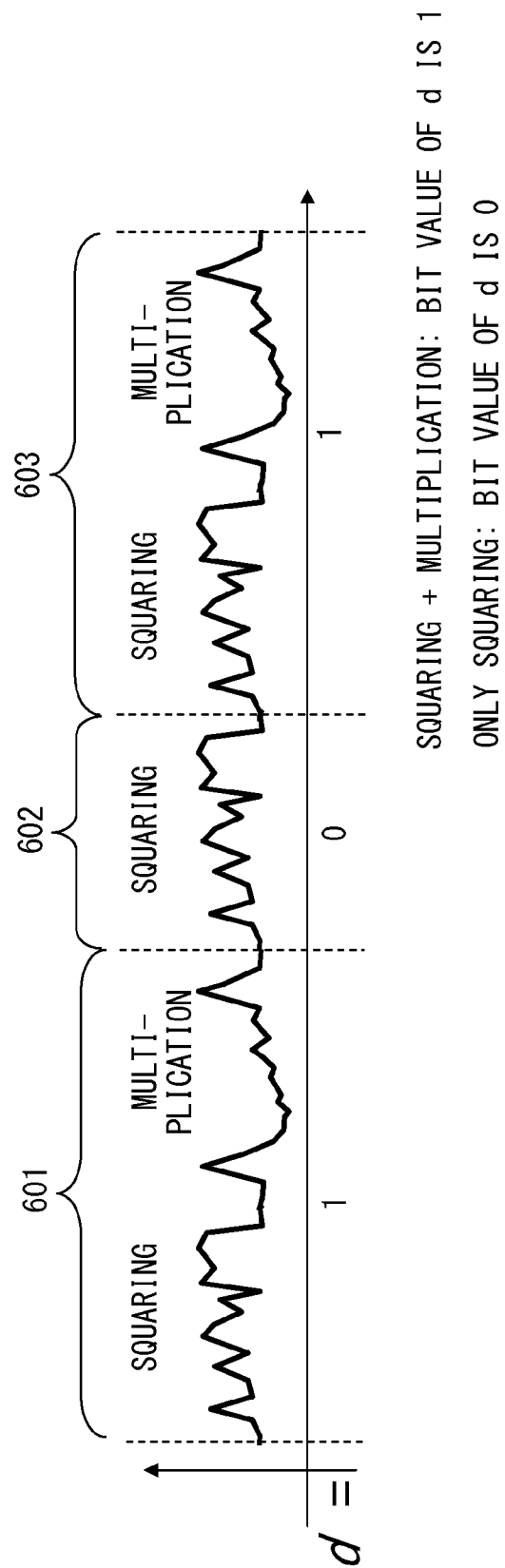
FIG. 6 illustrates an example of a power waveform when an SPA is used against the binary method of FIG. 5.

Here, in the binary method, a computation sequence of squaring and a multiplication is linked to the bit value of d unchanged, and an SPA breaks d by using this nature. Namely, as represented by an example of a power waveform illustrated in FIG. 6, the following decryption can be performed in an environment where a distinction between processes of a multiplication and squaring can be made by using a power waveform. Namely, if a multiplication is performed after squaring, the bit value of the exponent d can be decrypted to be 1 (601 or 603 of FIG. 6). In contrast, if only squaring is performed, the bit value of the exponent d can be decrypted to be 0 (602 of FIG. 2). This decryption is performed for all bits of d, so that an SPA is successfully conducted.

As a measure against SPAs, a method for making a computation pattern of a multiplication and squaring regular regardless of the bit value of d is known. Also an A&D-always method to be described later is a method for implementing this measure.

A binary method for a scalar multiplication of a point is described next.

For example, if the private key d is 160 bits, d can possibly be a very large number (such as a number close to $2^{160}$). Accordingly, since performing a scalar multiplication as defined by the expression (1.8) needs a very large number of times that an addition of a point is performed, this is unrealistic. Similarly to the case of the modulus exponentiation computation, the binary method is a method for reducing the order of the amount of calculation of a scalar multiplication to that of the number of bits of the private key d.

Figure 8:
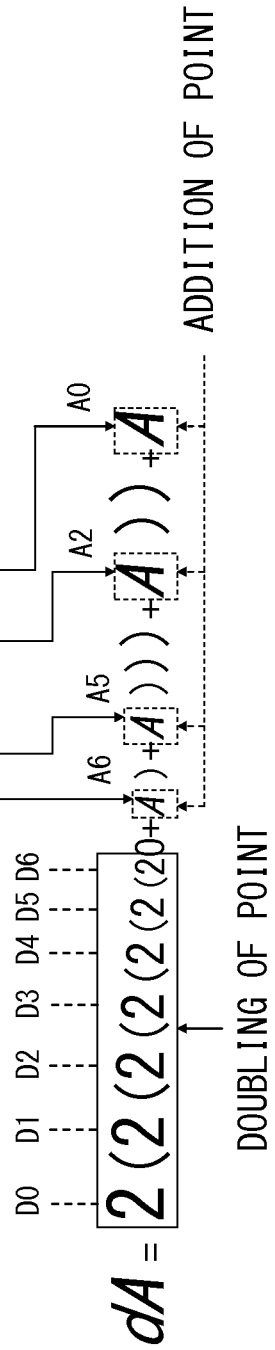
FIG. 8 is an explanatory diagram of the scalar multiplication process of the point using the binary method.

FIG. 7 illustrates an algorithm of the binary method in the scalar multiplication of a point, and FIG. 8 illustrates an outline of the process.

For convenience of an explanation, the bit length of the private key d is assumed to be u similarly to the case of the modular exponentiation computation. Moreover, the ith bit of the private key d is denoted as d[i] (0u−1). d[0] is the least significant bit (LSB), whereas d[u−1] is the most significant bit (MSB). As a result, the private key d of u bits is as represented by the above described expression (2.1) similarly to the case of the modular exponentiation computation.

Then, an expression (3.1) is obtained based on the expressions (1.8) and (2.1).

$$dA=2^{u-1}d[u-1]A+\ldots+2^1 d[1]A+2^0 d[0]A \tag{3.1}$$

The binary method is a calculation procedure using the expression (3.1). In the expression (3.1), the bit value d[i] of d is scanned sequentially from the high-order bit to the low-order bit (namely, i=u−1 to 0), and a computation of the following expression (3.2) is performed according to the bit value d[i] of d.

If d[i]=1: perform an addition (v: =v+A) after doubling (v: =2×v).

If d[i]=0: perform only doubling (v: =2×v). (3.2)

A relationship between the expression (3.2) in the scalar multiplication of a point and the expression (2.3) in the modular exponentiation computation can be understood based on the above described associations of FIG. 1.

For example, a case where the private key d is $(1100101)_2$ is specifically described. The binary method is a method for implementing a scalar multiplication based on an expression (3.3).

$$dA=2(2(2(2(2(2O+A)+A)))+A))+A=2^6A+2^5A+2^2A+A \tag{3.3}$$

Namely, if a result of the scalar multiplication is represented with a variable V, the variable V is firstly initialized to the infinite point O in the binary method as represented by an expression (3.4) (line 701 of FIG. 7).

$$V=0 \tag{3.4}$$

Thereafter, the expression (3.2) is executed sequentially from the MSB to the LSB (a loop process from line 702 to line 705 of FIG. 7). Namely, a process for obtaining 2V with doubling (line 703 of FIG. 7), for performing an addition of a point A if d[i]=1, and for assigning an obtained result to the variable V (line 704 of FIG. 7) is repeated. Then, an obtained value is finally output to the variable V (line 706 of FIG. 7). Here, "ECDBL(V)" in line 703 of FIG. 7 indicates a function process for performing doubling 2V for the value of the variable V. Moreover, "ECADD(V,A)" in line 704 of FIG. 7 indicates a function process for adding the value of the variable A to the value of the variable V.

Specifically, d[6]=1. Therefore, doubling and an addition are performed for the 6th bit as represented by an expression (3.5) (D6 and A6 of FIG. 8).

$$V=2O+A \tag{3.5}$$

Additionally, since d[5]=1, doubling and an addition are performed for the 5th bit as represented by an expression (3.6) (D5 and A5 of FIG. 8).

$$V=2(2O+A)+A \tag{3.6}$$

Furthermore, since d[4]=0, only doubling is performed for the 4th bit as represented by an expression (3.7) (D4 of FIG. 8).

$$V=2(2(2O+A)+A) \tag{3.7}$$

Similarly, since d[3]=0, only doubling is performed and an addition is not performed also for the 3rd bit as represented by an expression (3.8) (D3 of FIG. 8).

$$V=2(2(2(2O+A)+A)) \tag{3.8}$$

For the second bit, d[2]=1. Therefore, doubling and an addition are performed as represented by an expression (3.9) (D2 and A2 of FIG. 8).

$$V=2(2(2(2+A)+A)))+A \quad (3.9)$$

For the first bit, d[1]=0. Therefore, only doubling is performed and an addition is not performed as represented by an expression (3.10) (D1 of FIG. 8).

$$V=2(2(2(2(2O+A)+A)))+A) \quad (3.10)$$

Lastly, for the 0th bit, d[0]=1. Therefore, doubling and an addition are performed as represented by an expression (3.11) (D0 and A0 of FIG. 8).

$$V=2(2(2(2(2(2O+A)+A)))+A))+A \quad (3.11)$$

A coefficient of the point A, which is added according to the ith bit (d[i]=1) as described above, is $2^1$ as understood from the expression (3.11). Therefore, with the procedures described with the above provided expressions (3.4) to (3.11), V-dA can be surely obtained based on the expression (3.3).

As is evident from the above described example, with the binary method, the number of times that doubling is performed is equal to the bit length u of the private key d, and the number of times that an addition is performed is equal to the Hamming weight of the private key d. Accordingly, the amount of calculation of a scalar multiplication performed with the binary method is not the order of $2^u$ but reduced to the order of u similarly to the case of the modular exponentiation computation.

Figure 9:
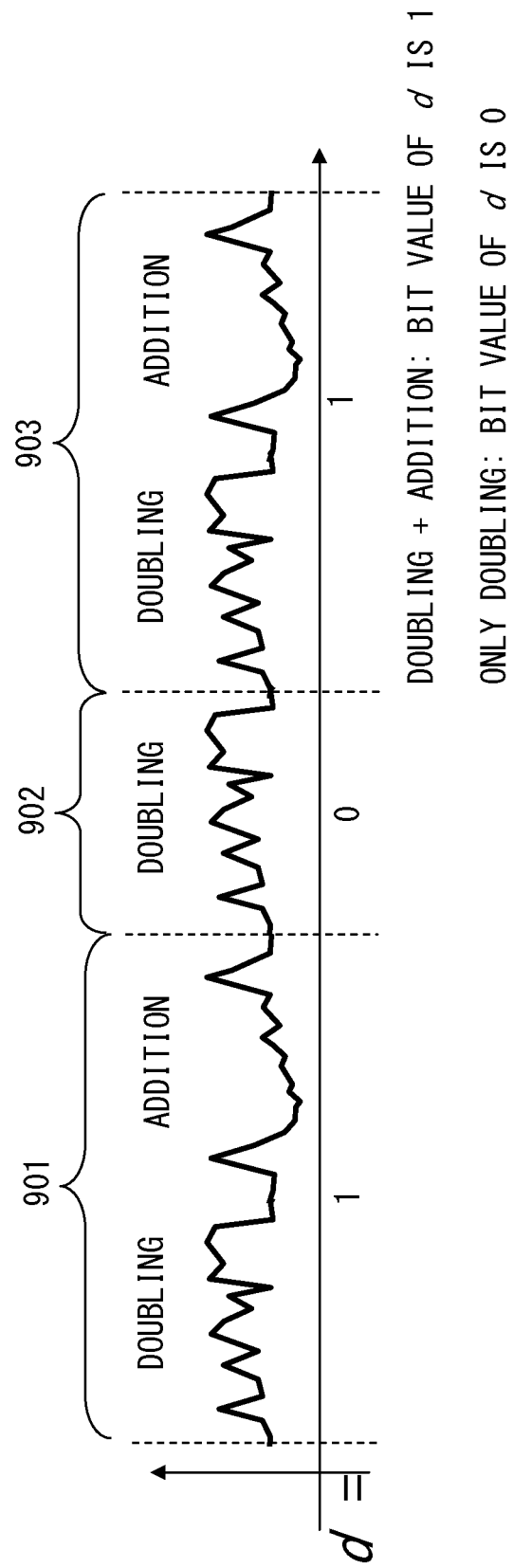
FIG. 9 illustrates an example of a power waveform when an SPA is used against the binary method of FIG. 7.

Here, in the binary method of the scalar multiplication of a point, a computation sequence of doubling and an addition is linked to the bit value of d unchanged, and an SPA breaks d by using this nature. Namely, as represented by an example of a power waveform illustrated in FIG. 9, the following decryption can be performed in an environment where a distinction can be made between processes of an addition and doubling of a point by using a power waveform. Namely, if an addition is performed after doubling, the bit value of the exponent d can be decrypted to be 1 (901 or 903 of FIG. 9). In contrast, if only doubling is performed, the bit value of the exponent d can be decrypted to be 0 (902 of FIG. 9). This decryption is performed for all bits of d, so that an SPA can be successfully conducted.

Similarly to the case of the modular exponentiation computation, a method for making a computation pattern of an addition and doubling regular regardless of the bit value of d is known as a measure against SPAs in a scalar multiplication of a point. The A&D-always method to be described later is a method for implementing this measure.

The above described binary method in the modular exponentiation computation or the scalar multiplication of a point is vulnerable not only to SPA attacks but to DPA attacks. To help understand an explanation of safety from DPA attacks, a basic idea in a case where an attack is conducted with a DPA is described.

With the binary method, $a^d$(mod n) (case of a modular exponentiation computation) or dA (case of a scalar multiplication of a point) is finally calculated while incrementing a bit of a scalar value or an exponent (d) sequentially from the high-order bit by 1 as follows $$a^{d[u-1]}(\bmod n) \to a^{d[u-1]\|d[u-2]}(\bmod n) \to a^{d[u-1]\|d[u-2]\|d[u-3]}(\bmod n) \to \ldots$$

or $$d[u-1]A \to (d[u-1]\|d[u-2])A \to (d[u-1]\|d[u-2]\|d[u-3])A \to \ldots \text{ in order to calculate } a^d(\bmod n) \text{ or } dA$$
$$\text{for } d=d[u-1]\|\ldots\|d[1]\|d[0] \quad \text{(expression (2.1))}.$$

Each time the loop process, illustrated in FIG. 4 or 7 (402 to 405 of FIG. 4 or 702 to 705 of FIG. 7), for the variable is executed, a result obtained by incrementing the exponent by 1 bit is stored in the variable v or V.

For example, if $d=(1101)_2$, the calculation is sequentially performed as follows.

$$C^{(1)2}(\bmod n) \to C^{(11)2}(\bmod n) \to C^{(110)2}(\bmod n) \to C^{(1101)2}(\bmod n)$$

or $$(1)_2 A \to (11)_2 A \to (110)_2 A \to (1101)_2 A$$

An attacker who conducts a DPA repeatedly determines whether or not a predicted bit of d is correct based on a power waveform while predicting the bits of d one by one with the use of the nature of the binary method, such that the calculation is performed while incrementing the bit value of an exponent or a scalar value by 1. For an attack conducted with a general round-robin method, the amount of labor proportional to $2^d$ (case of a modular exponentiation computation) or d (case of a scalar multiplication of a point) is needed to decrypt the private key. In the meantime, by using a DPA, the private key can be decrypted with the amount of labor proportional to d (case of the modular exponentiation computation) or $\log_2 d$ (case of the scalar multiplication of a point).

For example, if the most significant bit of d is 0, a data value represented by $a^0$ (mod n) (case of the modular exponentiation computation) or 0A (mod n) (a case of the scalar multiplication of a point) is calculated within an encryption processing device, and the calculated value is loaded and stored in an internal memory. In contrast, if the most significant bit of d is 1, a data value represented by $a^1$ (mod n) (case of the modular exponentiation computation) or 1A (mod n) (case of the scalar multiplication of a point) is calculated within the encryption processing device, and the calculated value is loaded and stored in the internal memory.

For general hardware including an encryption processing device, a nature such that power proportional to the Hamming weight ("1") of a loaded and stored data value is consumed is known. By using this nature, a DPA can determine whether a loaded and stored data value is either $a^0$ (mod n) or $a^1$(mod n) (case of the modular exponentiation computation), or whether the loaded and stored data value is either 1A or 0A (case of the scalar multiplication of a point). As a result, for example, the following determination is made with a similar procedure in order to decrypt the value of the subsequent low-order bit after the most significant bit of d is proved to be, 1. Namely, whether the loaded and stored data value is either $a^{(10)2}$ (mod n) or $a^{(11)2}$ (mod n) (case of the modular exponentiation computation), or whether the loaded and stored data value is either $(10)_2 A$ or $(11)_2 A$ (case of the scalar multiplication of a point) is determined.

A specific procedure of the DPA is represented by the following (DPA-1) to (DPA-6).

(DPA-1) Measure power $Pow_j(t)$ (j=1, 2, . . . , L) consumed when $V=M_j$(j=1, 2, . . . , L) is input as an encrypted text V. t is time information.

(DPA-2) Initialize to i:u−1;

(DPA-3) An attacker predicts a bit value of d[i].

(DPA-4) The attacker calculates a value of $G_j$(d[u−1]|| . . . ||d[i])$M_j$ respectively for j=1, 2, . . . , L based on known $M_j$, d[u−1]|| . . . ||d[i+1] and the predicted d[i]. According to results of this calculation, L pieces of consumed power data $Pow_j$(t) are classified into 2 groups according to the following criteria.

Group 1: a set of $Pow_j$(t) where the least significant bit of x coordinate (or y coordinate) of $G_j$ is 1 for $M_j$ Group 2: a set of $Pow_j$ (t) where the least significant bit of x coordinate (or y coordinate) of $G_j$ is 0 for $M_j$ (DPA-5) Generate a differential waveform Diff(t) represented by (average of $Pow_j$ (t) belonging to Group 1)−(average of $pow_j$ (t) belonging to Group 0) for the consumed power data classified into 2 groups as described above.

Figure 10:
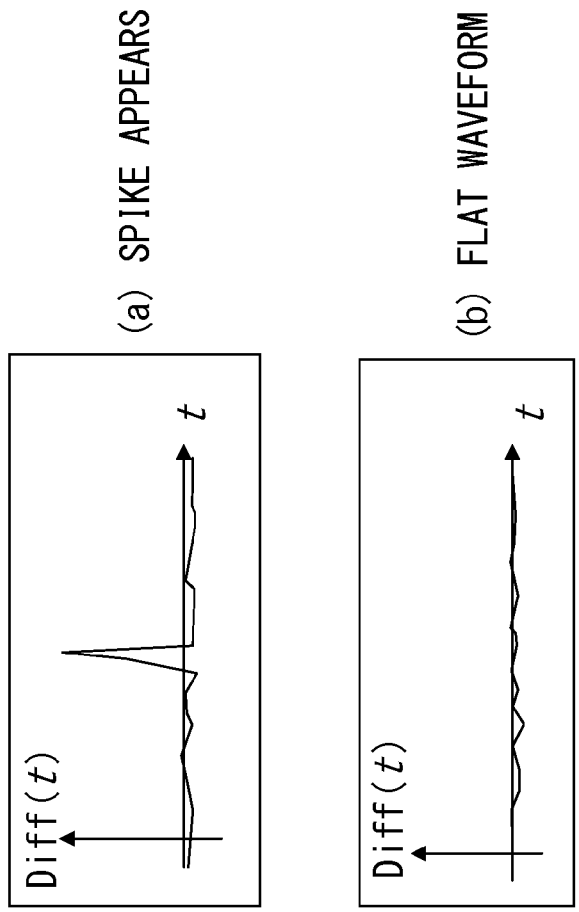
FIG. 10 is an explanatory diagram of a determination operation of private key bits based on a differential waveform in a DPA.

As a result, if a spike illustrated in FIG. 10A appears in the differential waveform, it is determined that the predicted d[i] is correct.

If the differential waveform is a flat waveform illustrated in FIG. 10(b), it is determined that the predicted d[i] is incorrect. (DPA-6) If i≥0 as a result of the calculation i:i−1, a bit yet to be decrypted is left. Therefore, the procedure returns to (DPA-3). If i<0, all bit values of d have been decrypted. Therefore, the procedure is ended.

In DPA-5, if d[i] is correctly predicted, Group 0 of consumed power, in which all of least significant bits of x coordinate (y coordinate) are "0", is subtracted from Group 1 of consumed power, which is represented by $G_j$ and in which all of the least significant bits of x coordinate (y coordinate) of a data value are "1". Therefore, a difference between outputs "0" and "1" of consumed power appears as a spike (FIG. 10(a)). If d[i] is incorrectly predicted, "0" and "1" coexist as the least significant bits of the x coordinate (y coordinate) of $G_j$ in both of Groups 0 and 1. Therefore, a difference between the consumer powers does not occur, leading to a flat waveform (FIG. 10(b)).

As a measure against a DPA, the method called data randomization illustrated in FIGS. 11A and 11B is known. If no measures are taken against DPAs, an operation illustrated in FIG. 11A is performed. Namely, a sequence of calculation data values $a^{d[u-1]}(\mod n) \to a^{d[u-1]\|d[u-2]}(\mod n) \to a^{d[u-1]\|d[u-2]}(\mod n) \to a^{d[u-1]\|d[u-2]\|d[u-3]}(\mod n) \to \ldots$ (case of a modular exponentiation computation) or $d[u-1]A \to (d[u-1]\|d[u-2])A \to (d[u-1]\|d[u-2]\|d[u-3])A \to \ldots$ (case of a scalar multiplication of a point) is uniquely decided based on the value of the private key d[i]. In contrast, these calculation data values are disturbed by using a random number as illustrated in FIG. 11B, so that the sequence values of the calculation data are randomized. Accordingly, a correlation between consumed power and a private key can be concealed, and a process safe from DPAs can be implemented. At the end of the computation, a normalization process for correcting randomized data values is executed, so that a modular exponentiation computation value $a^d(\mod n)$ or a scalar multiplication value dA is finally obtained. With a method (third comparison example) called "randomizing A&D-always method" to be described later, a DPA measure is simultaneously implemented by using data randomization while implementing an SPA measure based on the A&D-always method.

<PA Measure Implemented with the A&D-Always Method (Second Comparison Example)>

As one of measures taken against SPAs, a method called the A&D-always method is known. This method is hereinafter referred to as a second comparison example. The A&D-always method is an abbreviation of Add-and-Double-always method. This method is characterized in that squaring and a multiplication (case of a modular exponentiation computation) or doubling and an addition of a point (case of a scalar multiplication of a point) are always performed in the same pattern regardless of the bit value of the private key d.

FIG. 12 illustrates an algorithm of the modular exponentiation computation using the A&D-always method. FIG. 13 illustrates an outline of the A&D-always method.

Assume that the bit length of the private key d is u. Moreover, the ith bit of the private key d is denoted as d[i] (0≤i≤u−1). d[0] is the least significant bit (LSB), whereas d[u−1] is the most significant bit (MSB). As a result, the private key of u bits d is represented by the above described expression (2.1). Moreover, a base and a modulus in the modular exponentiation computation are respectively assumed as a and n. An output value $v = a^d(\mod n)$.

Basically, a computation result (output of each squaring of FIG. 13) in a case of d[i]=0 is calculated for a buffer t[0] (lines 1201 and 1203 of FIG. 12), and a computation result (output of each multiplication of FIG. 13) in the case of d[i]=1 is calculated for a buffers t[1] (line 1204 of FIG. 12). Then, a correct value (output of "select" of FIG. 13) is copied to the buffer t[0] according to the bit value of d[i] (line 1205 of FIG. 12). The above described computation is repeated for all the bits of d (the loop process from line 1202 to line 1206 of FIG. 12).

As illustrated as first and second stages of FIG. 13, squaring and a multiplication are always repeated to respectively perform squaring and a multiplication for the calculations for t [0] and t [1] in each of the computation stages regardless of the bit value of d. Accordingly, a power waveform results in that illustrated in FIG. 14, and bit values of d are difficult to be obtained from the waveform, whereby an encryption processing device is safe from an SPA.

For ease of an explanation using the randomization method to be described later, a process for executing the A&D-always method for the modular exponentiation computation with the algorithm of FIG. 12 based on a base a, a secret key d, and a modulus n is represented as a function ModExp_ADalways (a,d,n).

The A&D-always method can be also applied to a scalar multiplication of a point in ECC. FIG. 15 illustrates an algorithm of the scalar multiplication of a point using the A&D-always method. The above described FIG. 12 illustrates an outline of this algorithm.

A representation of the private key d is similar to that in the case of the modular exponentiation computation. A point on an elliptic curve in the scalar multiplication of a point is assumed to be A. An output value v=dA.

Similarly to the case of the modular exponentiation computation, a computation result (output of each ECDBL of FIG. 13) in the case of d[i] is calculated for a buffer T[0] (lines 1501 and 1503 of FIG. 15), and a computation result (output of each "ECADD" of FIG. 13) in the case of d[i]=1 is calculated for a buffer T[1] (line 1504 of FIG. 13). Then, a correct value (output of "select" of FIG. 13) is copied to the buffer T[0] according to the bit value of d[i] (line 1505 of FIG. 15). The above described computation is repeated for all the bits of d (loop process from line 1502 to line 1506 of FIG. 15). Here, "ECDBL(T[01])" in line 1503 of FIG. 15 indicates a function process for performing doubling 2T[0] for the value of the buffer T[0]. Moreover, "ECADD (T[0], T[1])" in line 1504 of FIG. 15 indicates a function process for adding the value of the buffer T[1] to the value of the buffer T[0].

As illustrated in the first and the second stages of FIG. 13, doubling and an addition are always repeated regardless of a bit value of d in order to perform doubling ("ECDBL") and an addition of a point (ECADD") for the calculations of t[0] and t[1] that respectively correspond to T[0] and T[1] in each of the computation stages. Accordingly, a power waveform results in that illustrated in FIG. 14, and bit values of d are difficult to be obtained from the waveform. Therefore, this method is safe from SPAs similarly to the case of the modular exponentiation computation.

Figure 14:
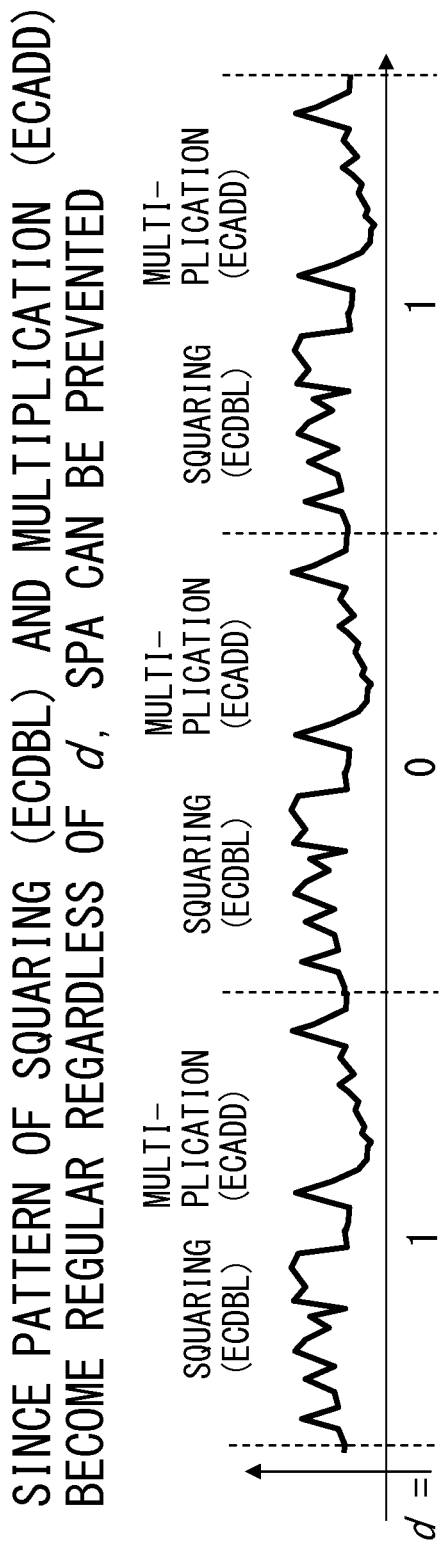
FIG. 14 illustrates a power waveform when an SPA is used against the A&D-always method.

For ease of an explanation using the randomization method to be described later, a process for executing the A&D-always method for a scalar multiplication of a point with the algorithm of FIG. 14 for a secret key d and a point A on an elliptic curve is represented as a function PointMul_ADalways (d, A).

<DPA Measure Using the Randomizing A&D-Always Method (Third Comparison Example)> using the A&D-always method can prevent SPAs, but it is difficult to prevent DPAs. As a measure against DPAs, Non-patent Document 3 discloses a method for randomizing a private key d as a measure against DPAs. This method is hereinafter referred to as a conventional method 1.

With the conventional method 1, a modular exponentiation or a scalar multiplication, which uses $d_j'$ that satisfies $$d_j'=d+r_j\#E \ (r_u: \text{20-bit random number}) \quad (4.1)$$

is performed instead of a modular exponentiation or a scalar multiplication, which uses d. $r_j$ is a random number that varies each time a computation is performed, #E is a parameter called an order. In the conventional method 1, a 20-bit random number $r_j$ is recommended in consideration of a tradeoff between security and a processing speed. The order #E is a value that represents a period in a modular exponentiation or a scalar multiplication of a point. It is known that, for an arbitrary a or A, an equation $$a^{\#E}=1(\bmod n) \quad (4.2)$$

is satisfied in a case of a modular exponentiation computation, or an equation $$\#EA=O \quad (4.3)$$

is satisfied in a case of a scalar multiplication of a point. By using the conventional method 1, all bits of $d_j'$ are randomized with the random number $r_j$. Therefore, an encryption processing device is made safe from DPAs. Moreover, if the periodicity of #E is taken into account, $$a^{d_j'}(\bmod n)=a^{d+r_j\#E}=a^d\times(a^{\#E})^{r_j}=a^d\times 1=a^d(\bmod n) \text{ and}$$

$$d_j'A=dA+r_j(\#EA)=dA+O=dA,$$

therefore, computation results match those obtained for the private key d.

The conventional method 1 is a DPA measure for randomizing an exponent with a multiplication using a random number. In contrast, Non-Patent Document 4 discloses a method for randomizing an exponent with a division using a random number. This method is hereinafter referred to as a conventional method 2.

With the conventional method 2, new exponents $d_j', e_j$ are calculated from the exponent d and the random number $r_j$ based on the following expressions (4.4) and (4.5).

$$d_j'=\lfloor d/r_j \rfloor \quad (4.4)$$

$$e_j'=d(\bmod r_j) \quad (4.5)$$

Note that $\lfloor x \rfloor$ is a symbol that represents an integral part of x. For example, $\lfloor 3.3 \rfloor=3$, $\lfloor 7.8 \rfloor=7$, and $\lfloor 6 \rfloor=6$. The random number $r_j$ is a 20-bit random number that varies each time the compautation is performed, similarly to the conventional method 1. $d_j'$ and $e_j'$, which are represented by the expressions (4.4) and (4.5), are generated, so that values of a quotient and a remainder obtained when d is divided by $r_j$ can be respectively given to $d_j'$ and $e_j'$. With the conventional method 2, a modular exponentiation computation represented by $$(a^{r_j})^{d_j'}\times a^{e_j'}(\bmod n) \quad (4.6)$$

or a scalar multiplication of a point represented by $$d_j'(r_jA)+e_j'A \quad (4.7)$$

is performed by using the generated values. Since all bit values of $r_j$, $d_j'$, and $e_j'$ are randomized, a process safe from DPAs can be implemented. Moreover, since $d_j'$ and $e_j'$ are the values of the quotient and the remainder obtained when d is divided by $r_j$, $$d=d_j'\times r_j+e_j \quad (4.8)$$

is satisfied. Namely, based on the expression (4.8), the expressions (4.6) and (4.7) can be modified to $$(a^{r_j})^{d_j'}\times a^{e_j'}(\bmod n)=a^{d_j'r_j+e_j'}(\bmod n)=a^d(\bmod n)$$

$$d_j'(r_jA)+e_j'A=(d_j'\times r_j+e_j)A=dA.$$

The results match those for the private key d.

To take measures against power analyses, not either but both of SPAs and DPAs need to be simultaneously prevented. This is because an attacker can obtain the value of a private key d whichever attack is conducted successfully. To take SPA and DPA measures, a method implemented by combining both SPA and DPA measures is general (FIG. 15). By combining these measures, both of the attacks can be prevented.

To take measures against power analyses, not either but both of SPAs and DPAs need to be simultaneously prevented. This is because an attacker can obtain the value of a private key d whichever attack is conducted successfully. To take SPA and DPA measures, a method implemented by combining both SPA and DPA measures is general. By combining these measures, both of the attacks can be prevented.

Namely, by combining the SPA measure implemented with the A&D-always method and either of the DPA measure referred to as the conventional method 1 and the DPA measure referred to as the conventional method 2, both of SPA and DPA attacks can be prevented.

FIG. 16 illustrates an algorithm of a modular exponentiation computation implemented by combining the SPA measure implemented with the A&D-always method and the DPA measure referred to as the conventional method 1, and FIG. 17 illustrates an algorithm of a modular exponentiation computation implemented by combining the SPA measure implemented with the A&D-always method and the DPA measure referred to as the conventional method 2.

The algorithm illustrated in FIG. 16 is very simple. Initially, a 20-bit random number r is generated (line 1601). Next, a private key represented by the expression (4.1) is randomized by using the random number $r_j$, a secret key d, which is an input value, and an order #E (line 1602). Then, by using a resultant key $d_j'=d+\#Er_j$ as an exponent, a base a, and a modulus n as input values, the function ModExp_Adalways of the modular exponentiation computation using the A&D-always method of FIG. 12 is executed (line 1603). Namely, the A&D-always method is executed by using the randomized private key $d_j'$ as a replacement for the private key d, which is an input value, and v is output as a result (line 1604). With this modular exponentiation computation, the SPA measure implemented with the A&D-always method is taken.

In FIG. 17, the 20-bit random number $r_j$ is generated in line 1701, and the randomized private keys $d_j'$ and $r_j'$, which are represented by the expressions (4.4) and (4.5), are thereafter generated in lines 1702 and 1703. Then, the function ModExp_Adalways of the modular exponentiation computation using the A&D-always method illustrated in FIG. 12 is executed by using $r_j$ as the exponent, the base a, and the modulus n as input values in line 1704. As a result, $a'=a^{r_j}$ (mod n) is calculated. Next, in line 1705, the function ModExp_Adalways of the modular exponentiation computation using the A&D-always method is executed with the use of $d_j'$ as the exponent, the base a, and the modulus n as input values in line 1705. In this way, $t=(a')^{d_j'}$ (mod n) is calculated. Moreover, the function ModExp_Adalways of the modular exponentiation computation using the A&D-always method is executed with the use of $e_j'$ as the exponent, the base a, and the modulus n as input values in line 1706. In this way, $u=a^{e_j'}$ (mod n) is calculated. Lastly, the multiplication process v:t×u (mod n) is calculated in line 1707. With the calculations in lines 1704, 1705, 1706 and 1707, the expression (4.6) is computed, and a final result $v=a^d$ (mod n) is obtained. With the modular exponentiation computation represented by lines 1704, 1705, 1706 and 1707, an SPA measure implemented with the A&D-always method is taken.

The algorithms illustrated in FIGS. 16 and 17 can be easily expanded also to a scalar multiplication of a point. FIG. 18 illustrates the algorithm of the scalar multiplication of a point implemented by combining the SPA measure implemented with the A&D-always method and the DPA measure referred to as the conventional method 1, whereas FIG. 19 illustrates the algorithm of the scalar multiplication of a point implemented by combining the SPA measure implemented with the A&D-always method and the DPA measure referred to as the conventional method 2.

In FIG. 18, the same processes as those in lines 1601 and 1602 of FIG. 16 are executed in lines 1801 and 1802. In line 1803, the function PointMul_ADalways of the scalar multiplication of a point using the A&D-always method is executed with the use of a point A on an elliptic curve as an input instead of the function ModExp_Adalways of the modular exponentiation computation using the A&D-always method in line 1603 of FIG. 16. As a result, a final result V=dA is obtained and output (line 1804).

In FIG. 19, the same processes as those in lines 1701, 1702 and 1703 of FIG. 17 are executed in lines 1901, 1902 and 1903. In lines 1904, 1905 and 1906, the function PointMul_ADalways of the scalar multiplication of a point using the A&D-always method is executed with the use of the point A on the elliptical curve instead of the function ModExp_Adalways of the modular exponentiation computation using the A&D-always method in lines 1704, 1705 and 1706 of FIG. 17. As a result, A', T and U are respectively obtained. Then, in line 1907, an addition of a point V:T+U is calculated in stead of the multiplication process in line 1707 of FIG. 17. With these calculations in lines 1904, 1905, 1906 and 1907, the expression (4.7) is calculated, so that a final result V=dA is obtained and output (line 1908).

<Attack Method Using a Special PA>

As referred to in the above described third comparison example, it was considered that an encryption processing device was safe from both SPAs and DPAs by combining the SPA measure implemented with the A&D-always method and the DPA measure referred to as the conventional method 1 or 2, and power analyses can be completely prevented.

However, as a result of analyses unique to the inventor, an attack method that can decrypt the value of a private key d by using a power waveform even if these measures are taken was found out. This attack is referred to as a "special PA" in this specification.

If a measure is not taken against a special PA even when SPA and DPA measures are taken, information of a private key d leaks to an attacker. Therefore, a measure against this attack is considered to be an important challenge.

An attack method using a special PA, which is a challenge to be solved by the present invention, is described below.

A power waveform when a computation process of a multiplication (t×u(mod n)) performed in a modular exponentiation or that of an addition of a point (T+U) performed in a scalar multiplication process is executed depends on a data value. FIGS. 20A and 20B illustrate a simple case that represents differences in data values and consumed powers. For example, if a difference between a waveform of consumed power of 1×2 (mod n) and that of consumed power of 3×4 (mod n) is generated, these two consumed powers differ due to a difference between data values in a multiplication. Therefore, a spike occurs in a differential waveform (FIG. 20A). In contrast, if a difference between waveforms of consumed power of 1×2 (mod n) is taken, a differential waveform becomes flat (FIG. 20B). This is because the consumer powers are equal. A similar property is satisfied also for an addition of a point (FIGS. 21A and 21B). Namely, for example, if a difference between waveforms of consumed powers of A+2A and 3A+4A, these two consumed powers differ due to a difference between data values in a multiplication. Therefore, a spike occurs in a differential waveform (FIG. 21A). In contrast, if a difference between waveforms of consumed powers of A+2A, a differential waveform becomes flat (FIG. 21B). This is because the consumed powers are equal. Although the property illustrated in FIGS. 20A and 20B and FIGS. 21A and 21B is generally known, a special PA applies this property to an attack.

<Special PA in a Case where a Private Key d is not Randomized>

A special PA attack against a modular exponentiation computation and a scalar multiplication of a point is described. Here, a device that takes an SPA measure implemented with the A&D-always method and does not randomize a private key d is assumed to be an attack target. An attack against a device that randomizes a private key d will be described next.

Figure 22:
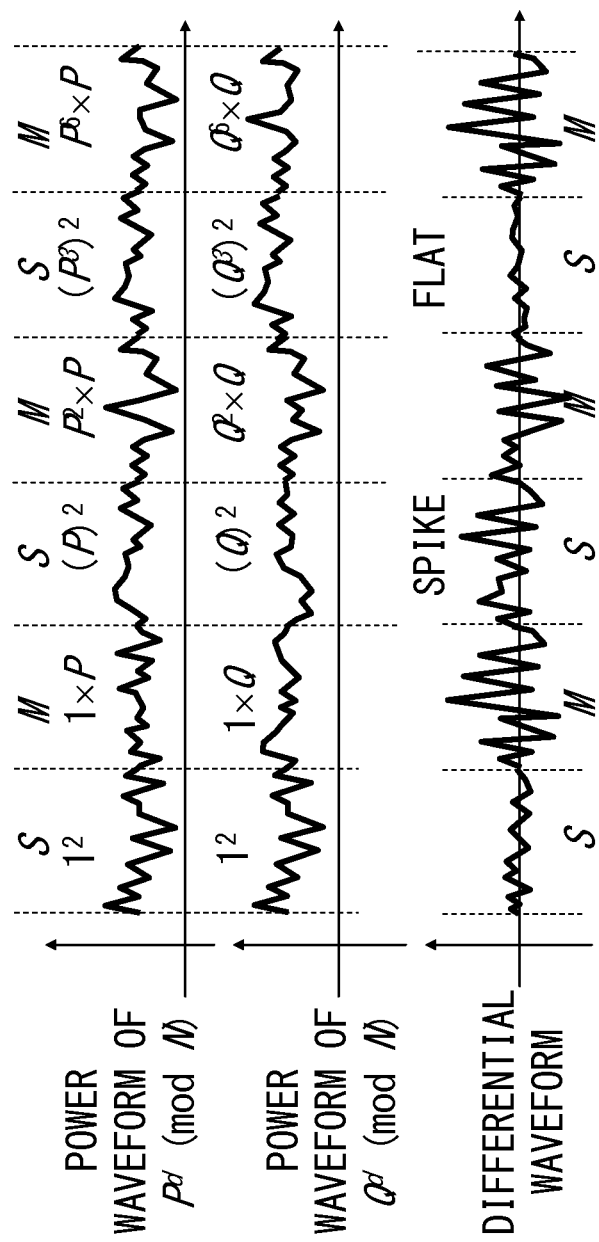
FIG. 22 illustrates a basic form of a differential waveform (in a case where a private key is not randomized) generated in a special PA.

In a special PA, an attacker measures waveforms of consumed powers when a=P is input (FIG. 22(*a*)) and Q is input (FIG. 22(*b*)) as a base of the modular exponentiation, and generates a difference between the waveforms (FIG. 22(*c*)). At this time, a peak portion and a flat portion are identified in a differential waveform of squaring (S), and the private key d is decrypted based on pattern information of the peak and the flat portions (however, since the initial S is always flat, the attacker ignores it).

Here, a=P and a=Q are values that the attacker intentionally selects, and P and Q are referred to as a selected message pair. As a method for setting these values, a plurality of variations can be considered. With the attack method found out by the present inventor, P and Q that satisfy P≠Q and $P^\alpha = Q^\alpha$ (mod n) are selected in RSA and DH, which use a modular exponentiation computation. Note that α is a prime number equal to or larger than 3. Moreover, in the case of ECC using a scalar multiplication of a point, P and Q that satisfy αP=αQ and P≠Q are selected.

Figure 23:
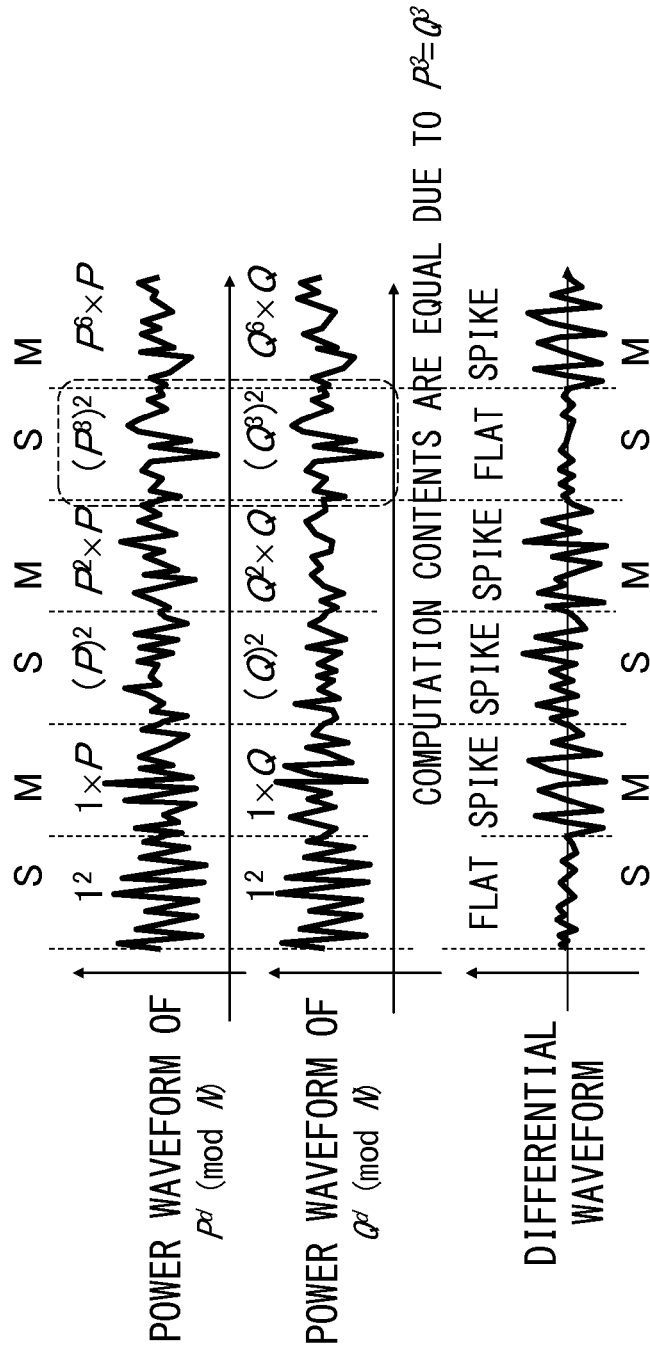
FIG. 23 illustrates a differential waveform of a special PA when $d=(111)_2=7$ and a selected message pair of P and Q ($P^3=Q^3$, $P \ne Q$) are given.

An attack method, which is a basic form of the special PA, in a case of α=3 is initially described. With this attack method, in a case of a modular exponentiation computation, a selected message pair that satisfies P≠Q and $P^\alpha = Q^\alpha$ (mod n) is input, and a differential waveform is generated. As a result, the differential waveform becomes flat if an exponential part of the modular exponentiation computation is a multiple of 3, and the differential waveform exhibits a peak if the exponential part is not a multiple of 3 as illustrated in FIG. 23 that corresponds to FIG. 22.

Namely, the attacker can determine whether or not an (i−1)th bit value d [u−1]||d[u−i+1] from the most significant bit of d is a multiple of 3 by observing whether a difference of an ith S from the left either has a spike or is flat. In the example of FIG. 23, the differential waveform of the second S from the left has a spike, but that of the third S is flat. In fact, in the example of FIG. 23, d[2]=1 being a multiple of 3 for d[2]∥d[1]∥d[0]=(111)$_2$, but d[2]∥d[1]=(11)$_2$=3 being a multiple of 3.

A calculation process of the A&D-always method is a process for repeatedly calculating a d[u−1]∥ . . . ∥d[u−i+1]∥d[u−i](mod n), which is obtained by incrementing an exponent by 1 bit, from the value of a$^{d[u-1]∥ . . . ∥d[u-i+1]}$(mod n) for all bits of d. In consideration of this, an association between a determination of whether or not the value of d[u−1]∥ . . . ∥d[u−i+1] is a multiple of 3 and a determination of whether or not d[u−1]∥ . . . ∥d[u−i+1]∥d[u−i] is a multiple of 3 is decided according to the value of the bit value d[u−i] incremented by 1 bit, and associations between these determination results are as represented by Table 2 of FIG. 24.

In Table 2, portions that are not a multiple of 3 are enclosed with a broken line. For example, in Table 2, if d[u−1]∥ . . . ∥d[u−i+1] is a multiple of 3=3k of 3, [u−1]∥ . . . ∥d[u−i+1]∥d[u−i]=d[u−1]∥ . . . ∥d[u−i+1]∥0=3k×2=6k, which is a multiple of 3, when d[u−1]=1, or d[u−1]∥d[u−i+1]∥d[u−i]=d[u−1]∥ . . . ∥d[u−i+1]∥×2+1=6k+1, which is not a multiple of 3, when d[u−i]=1. Also for the other cells in Table 2, a similar analysis can be performed, and its results are given as Table 2. Here, considering that an order where white and gray are arranged can be observed by using a special PA, an attacker can perform the following decryption. Namely, if white (multiple of 3) is again observed immediately after white (multiple of 3), the attacker can decrypt d[u−1]=0. In contrast, if gray(non-multiple of 3) is observed immediately after white (multiple of 3), the attacker can decrypt d[u−1]=1.

That is, the attacker can successfully decrypt a bit value of d based on a pattern of white and gray. Moreover, if attention is focused on a pattern such that d[u−1]∥ . . . ∥d[u−i+1] is a non-multiple of 3 (3k+1) in Table 2, it is proved that a pattern, which is a multiple of 3 subsequently to the focused pattern, is limited to d[u−i]=1. Namely, it is proved that a pattern where white is observed immediately after gray is limited to d[u−i]=1.

Decryption of a bit value of d with such an observation is successful also for other combinations of white and gray. To explain this, FIG. 25 illustrates the associations of Table 2 as state transitions.

FIG. 25 illustrates the value of d[u−1]∥ . . . ∥d[u−i+1](mod 3) (=0, 1, or 2) in the current state, and also illustrates the state transitions to a new state d[u−1]∥ . . . ∥d[u−i+1]∥d[u−i] (mod 3) (=0, 1 or 2) by using a bit value of d[u−i] as a transition condition. A white state represents a multiple of 3, whereas a gray state represents a non-multiple of 3. Since two values are present as the value of d[u−i], which is the transition condition, respectively for the three states in this state transition diagram, d[u−i] can take 2×3=6 values.

The following 3 patterns among the 6 state transition conditions according to the value of d[u−i] are patterns with which the value of d[u−i] can be decrypted as stated earlier.

Transition from state 0 (white)→state 0 (white), d[u−i]=0 (5.1)

Transition from state 0 (white)→state 1 (gray), d[u−i]=1 (5.2)

Transition from state 1 (gray)→state 0 (white), d[u−i]=1 (5.3)

Figure 26:
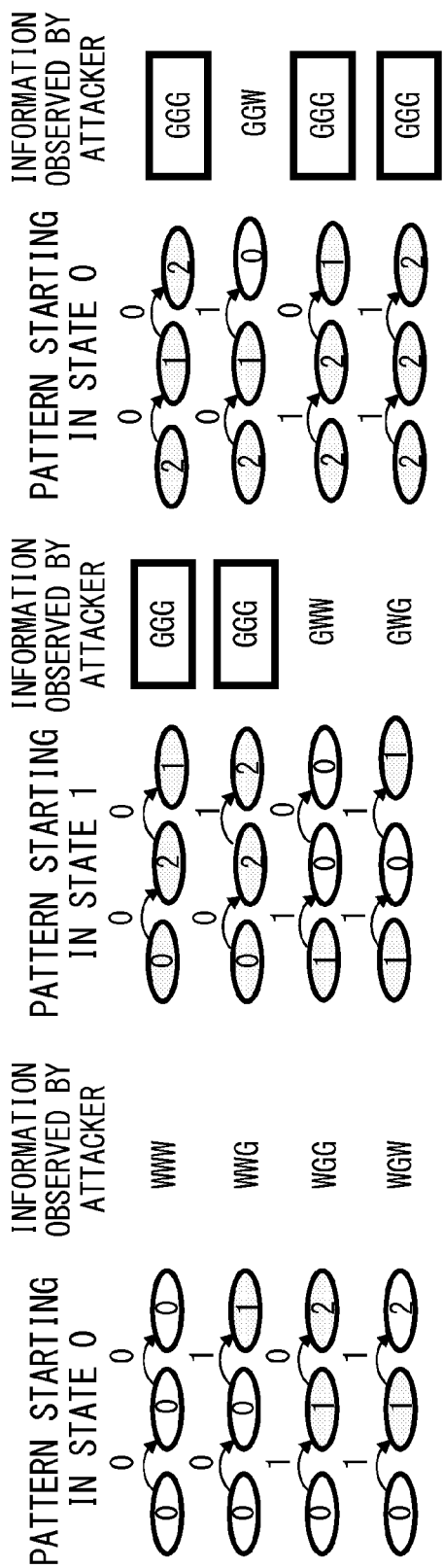
FIG. 26 illustrates all patterns when the state transitions of FIG. 25 are made twice.

Namely, since the 3 patterns among the 6 patterns that can be taken by the value of d[u−i] can be decrypted, one half of all bit values of d can be decrypted. The above described patterns do not include a transition from gray to gray. However, by using the nature of the transition diagram illustrated in FIG. 25, some of bit values of d[u−i] can be decrypted also for the transition from gray to gray. To explain this decryption, FIG. 26 illustrates results that cover all patterns of transitions made twice.

Figure 27:
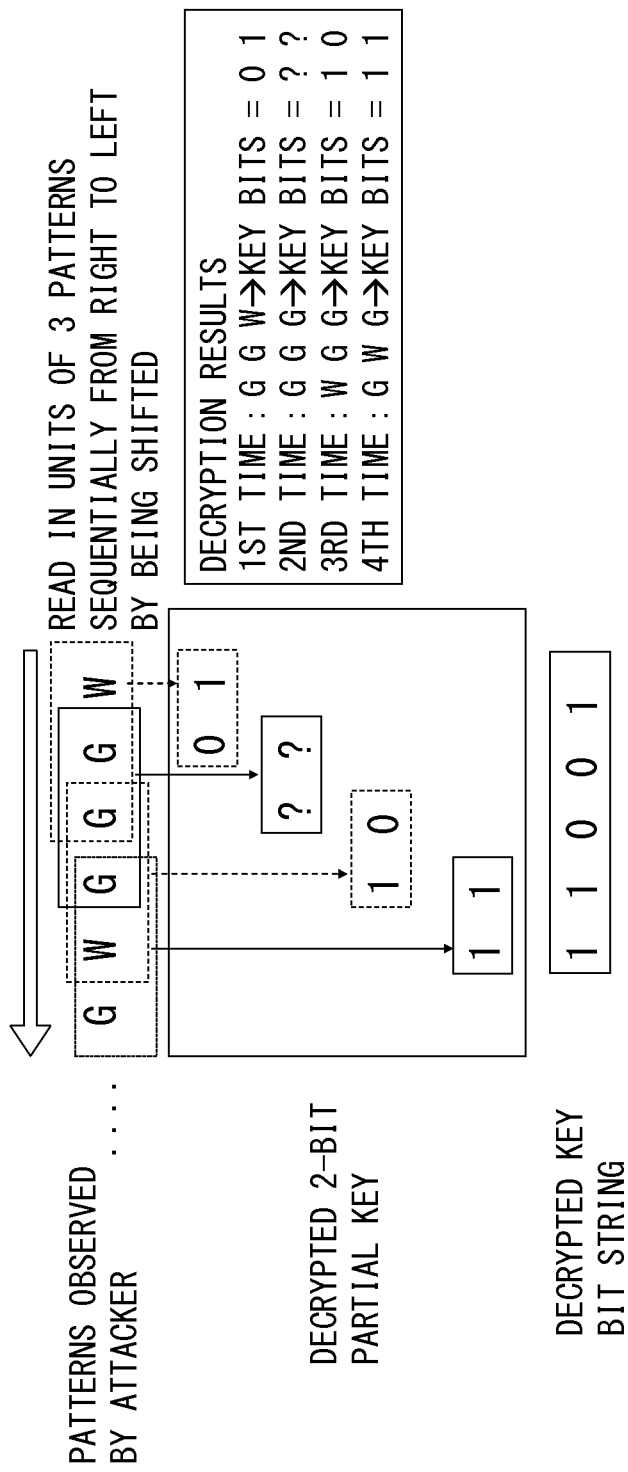
FIG. 27 is an explanatory diagram of an attack method using the state transitions made twice in FIG. 26.

Since patterns starting in a state 0, 1 or 2 are respectively 4 (transitions of 2 bits=2$^2$ patterns), the patterns total to 3×4=12. FIG. 26 respectively illustrates these 12 patterns along with information that can be observed by an attacker. The information that can be observed by the attacker is denoted with symbols. White and gray are denoted with "W" and "G", respectively. Among patterns of 3 straight Ws or Gs illustrated in FIG. 26, 7 patterns other than "GGG" can uniquely identify a bit. Therefore, a key bit can be uniquely decrypted. Namely, the 7 patterns among all the 12 patterns are those with which a key bit can be decrypted. Therefore, at least 7/12 of all the bit values can be decrypted. The reason why an expression "at least" is put is that a decryptable bit length can be further extended by using the nature such that the decryption method using the patterns of FIG. 26 can decrypt 2 straight bits by decryption performed once. FIG. 27 illustrates this idea.

Figure 28:
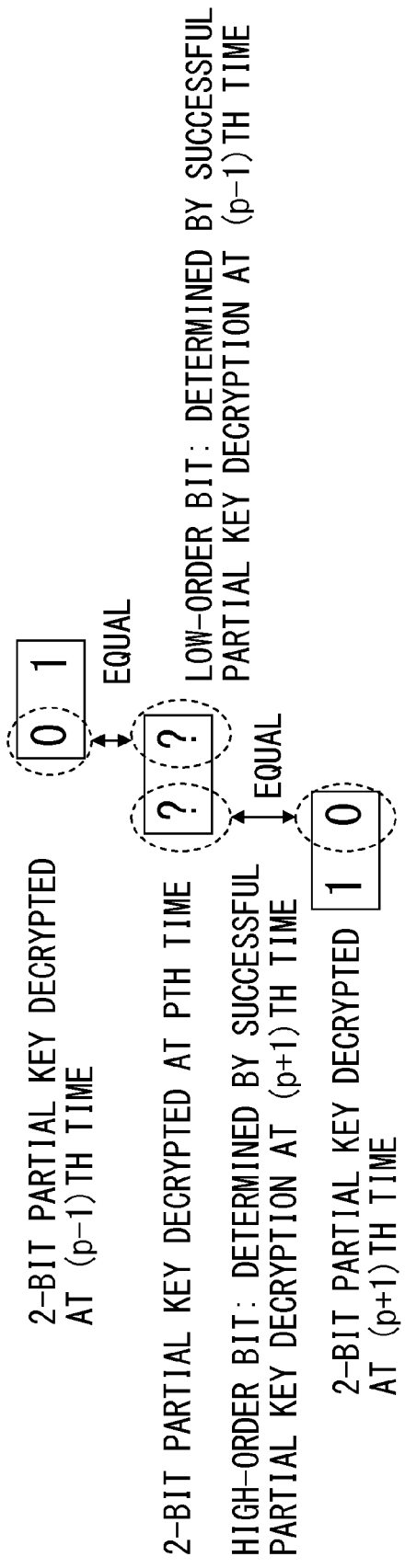
FIG. 28 is an explanatory diagram of a follow decryption operation using 2-bit decryption when a 2-bit partial key is unsuccessfully decrypted.

With the attack method illustrated in FIG. 27, the attacker initially identifies all the patterns of "G" and "W". Thereafter, a process for reading patterns of G or W in units of 3 patterns, and for decrypting a partial key in units of 2 bits by making a matching between the read patterns and the patterns of FIG. 26 is repeated. At this time, the read in units of 3 patterns is repeated by being shifted in a way such that the rightmost three patterns start to be read, next 3 patterns excluding the rightmost "G" or "W" are read, and subsequent 3 patterns excluding the rightmost 2 "G" and/or "W" are read. With the 3 patterns other than "GGG", a 2-bit partial key can be decrypted. Namely, a 2-bit partial key can be decrypted with a probability of 7/12, and is difficult to be decrypted with a probability of 5/12. In the example illustrated in FIG. 27, a data sequence read in units of 3 patterns is the first "GGW", namely, a partial key=01, the second "GGG", namely a partial key=??, the third "WGG", namely, a partial key=10, and the fourth "GWG", namely, a partial key=11. Since the second pattern is "GGG", the partial key is unsuccessfully decrypted. As illustrated in FIG. 27, however, the partial keys are successfully decrypted at the first and the third times. Therefore, the partial key is successfully decrypted at the second time as bit decryption as the whole of the bit decryption. Namely, even if a pattern that is difficult to be decrypted at pth time is encountered with the probability of 5/12, a low-order bit of a 2-bit partial key at the pth time can be successfully decrypted if bits of a partial key is successfully decrypted at a (p−1)th time, and a high-order bit of the 2-bit partial key at the pth time can be successfully decrypted if bits of a partial key are successfully decrypted at the (p+1)th time as illustrated in FIG. 28.

Namely, even when a 2-bit portion is unsuccessfully decrypted at the pth time, either or both of a low-order bit and a high-order bit can be successfully decrypted if a 2-bit partial key is successfully decrypted at the (p−1)th time or the (p+1) th time. Here, terms are defined as follows.

Successful decryption of a low-order bit at the pth time as a result of successful decryption of a partial key at the (p−1)th time even when a 2-bit partial key is unsuccessfully decrypted at the pth time is referred to as low-order bit follow decryption in this specification.

Successful decryption of a high-order bit at the pth time as a result of successful decryption of a partial key at the (p+1)th time even when a 2-bit partial key is unsuccessfully decrypted at the pth time is referred to as high-order bit follow decryption in this specification.

The low-order bit follow decryption and the high-order bit follow decryption are collectively referred to as follow bit decryption.

A probability that the low-order bit follow decryption is successfully performed, and a probability that the high-order bit follow decryption is successfully performed are obtained, so that a probability that a 2-bit value of a partial key even when a key is unsuccessfully decrypted with the probability of $5/12$ can be obtained. The probability that the low-order bit follow decryption is successfully performed is a probability that a pattern observed at the (p−1)th time is a decryptable pattern when the pattern GGG is observed at the pth time. The probability that the high-order bit follow decryption is successfully performed is a probability that a pattern observed at the (p+1)th time is a decryptable pattern when the pattern "GGG" is observed at the pth time. These probabilities can be easily obtained based on patterns covered in FIGS. 29 and 30, and both of the probabilities that the low-order bit follow decryption and the high-order bit follow decryption are successfully performed result in $1/5$. Accordingly, $5/12 \times 1/5 = 1/12$ of bit values can be additionally decrypted with the follow decryptions in addition to $7/12$ of the bit values that can be uniquely decrypted based on units of 3 patterns. As a whole, bit values of $7/12 + 1/12 = 8/12 = 2/3$ can be decrypted.

As described above, for a device having a function of a modular exponentiation computation, an attacker can decrypt $2/3$ of all bit values of a private key d with a special PA using a selected message pair of P and Q that satisfy $P^3 = Q^3 \pmod{n}$ and $P \neq Q$. Also for a device having a function of a scalar multiplication of a point, an attacker can decrypt $2/3$ of all bit values of the private key d by conducting a similar attack with a special PA using a selected message pair of P and Q that satisfy $3P = 3Q$ and $P \neq Q$.

Moreover, this attack can be expanded to a special PA using a selected message pair of P and Q that satisfy $P^\alpha = Q^\alpha \pmod{n}$ and $P \neq Q$ (or $\alpha P = \alpha Q$ and $P \neq Q$) for a prime number $\alpha$ equal to or larger than 3. A fundamental idea of this expansion is based on a point such that Table 2 of FIG. 24 given for $\alpha = 3$ is expanded to that for an arbitrary prime number $\alpha$ equal or larger than 5. Results of this expansion are given as Table 3 of FIG. 31.

In Table 3, portions where the value of $d[u−1] \| \ldots \| d[u−i+1]$ or $d[u−1] \| \ldots \| d[u−i+1] \| d[u−i]$ is not a multiple of $\alpha$ are enclosed with a broken line similarly to Table 2. Among these transitions according to the value of $d[u−i]$, the following 3 types are information that can be observed by a attacker, and transitions with which the value of $d[u−i]$ can be uniquely decided.

Transition from multiple of $\alpha$ (white)→multiple of $\alpha$, $d[u−i]=0$ (5.4)

Transition from multiple of $\alpha$ (white)→non-multiple of $\alpha$ (within a broken line), $d[u−i]=1$ (5.5)

Transition from non-multiple of $\alpha$ (gray)→multiple of $\alpha$, $d[u−i]=1$ (5.6)

The reason is that all the transitions other than (5.4), (5.5) and (5.6) are those made from within a broken line frame to within a broken line frame. Since 3 patterns among all the transition patterns $2\alpha$ are transitions with which a key can be uniquely identified. Therefore, the attacker can decrypt $3/(2\alpha)$ among all the key bits.

A summary of the above described decryption method with a special PA using $P^\alpha = Q^\alpha \pmod{n}$ and $P \neq Q$ (or $\alpha P = \alpha Q$ and $P \neq Q$) is represented by Table 4 of FIG. 32. Namely, it is proved that a ratio of private key bits to be leaked is $2/3$ if the value of $\alpha$ is 3, or a ratio of private key bits to be leaked is $3/(2\alpha)$ if the value of $\alpha$ is equal to or larger than 5.

<Special PA in a Case where a Private Key d is Randomized>

The above described PA is a special PA against the SPA measure implemented with the A&D-always method. A case where a private key d as an attack target is not randomized has been assumed above. A special PA in a case where the private key d is randomized is described below. Compared with the case where the private key is not randomized, cost of an attacker increases. However, the cost increase can fall within a realistic time frame, and the same effects as those in the case where the private key d is not randomized can be produced.

Figure 33:
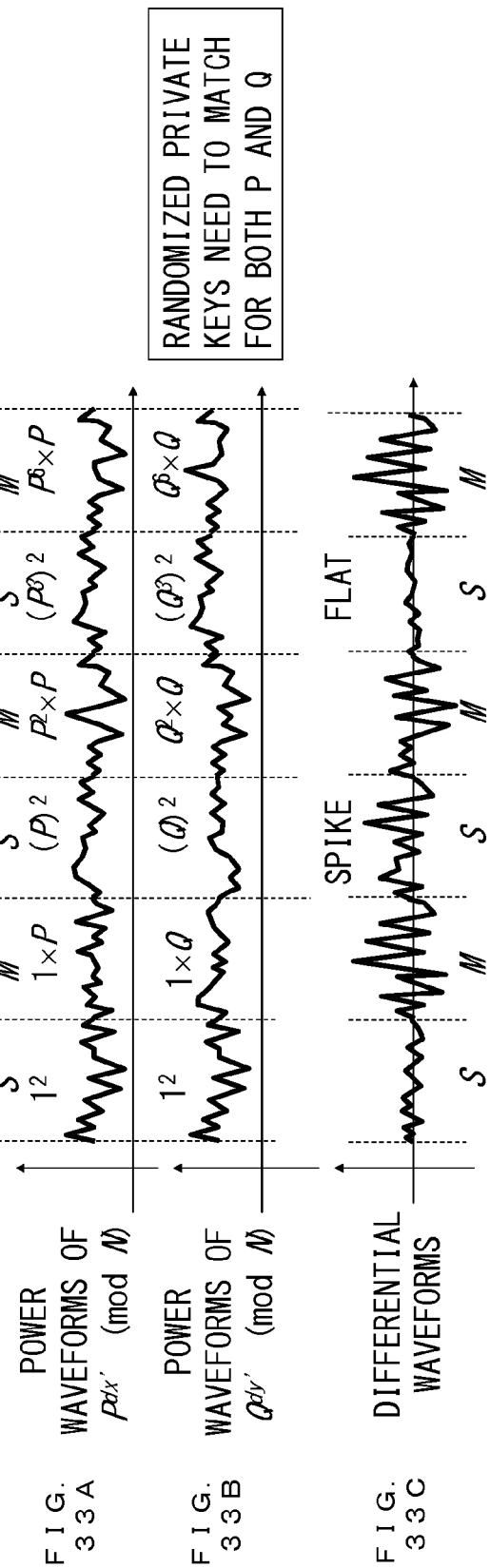
FIGS. 33A, 33B, and 33C illustrate a basic form of a differential waveform (in a case where a private key is randomized) generated in a special PA.

An attack method against a combination of the SPA measure implemented with the A&D-always method and the DPA measure implemented with the conventional method 1 is initially described. With the DPA measure implemented with the conventional method 1, $dj' = d + r_j \# E$ represented by the expression (4.1) is used as a replacement for the private key d. FIGS. 33A, 33B, and 33C illustrate a method for generating a differential waveform of the special PA in the case where the private key is randomized. Similarly to FIG. 22, power consumed when the selected message pair of P and Q that satisfy $P^\alpha = Q^\alpha \pmod{n}$ and $P \neq Q$ (or $\alpha P = \alpha Q$ and $P \neq Q$) is given is measured, and a power difference for generating a differential waveform is generated. A difference from FIG. 22 is that an attacker needs to devise randomized private keys to be identical in the cases where P and Q are respectively input.

Figure 34:
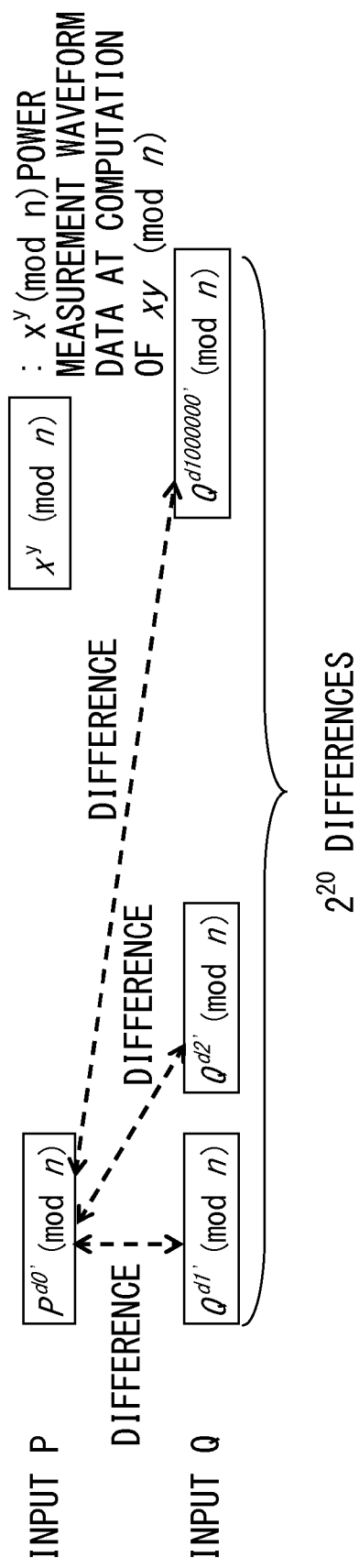
FIG. 34 is an explanatory diagram of a differential waveform generation method (No. 1) using a special PA when private keys P and Q are randomized.
Figure 36:
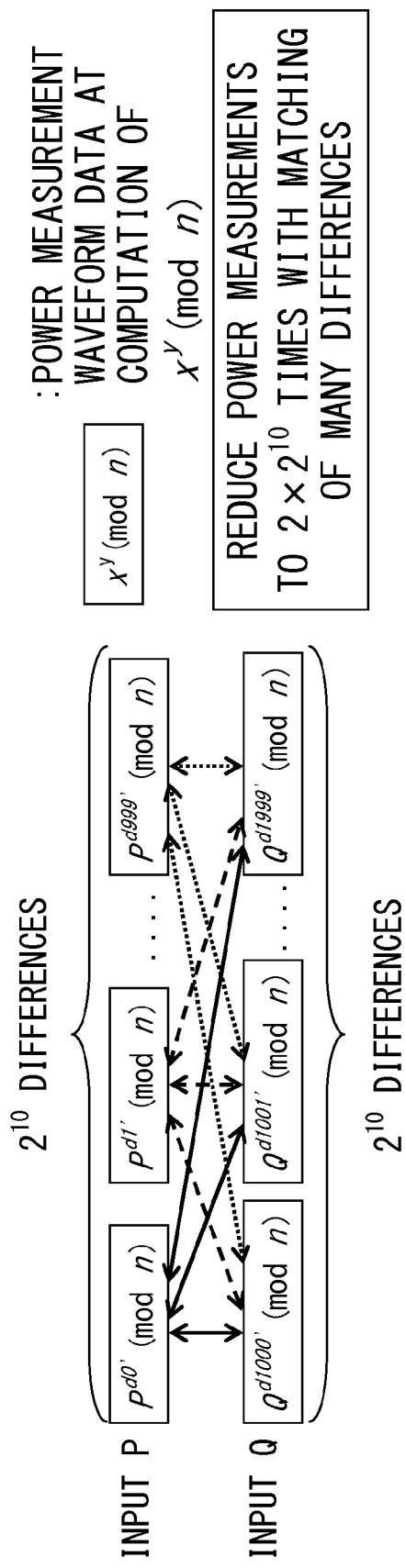
FIG. 36 is an explanatory diagram of a differential waveform generation method (No. 2) using a special PA when the private keys P and Q are randomized.

As illustrated in FIG. 34, the easiest way to make randomized exponents match for both P and Q is to repeat, by a plurality of times, a measurement of power consumed when Q is given until a randomized private key in the case where P is given and that in the case where Q is given match.

Considering that the private key is randomized with a 20-bit random number, the power measurement in the case where Q is given is repeated by $2^{20}$ times, so that the randomized private keys are expected to match. Since $2^{20}$ times is approximately 1,000,000 times, 1,000,000 seconds = 1,000,000/86,400 = 11.6 days are needed for the power measurements if each power measurement is performed for each second. Although this power measurement time is not short at all, the power measurement needed to be repeated for a successful attack can be completed within a sufficiently realistic time frame. For the power measurement, time in units of seconds, which is proportional to the number of times that the power measurement is made, is demanded due to a computation process and a communication time of a low-speed device such as a smart card or the like. Once the power measurement has been completed and data of the power measurement has been transferred to a PC, the high-performance PC can analyze the data at high-speed. Namely, the above calculated time (11.6 days) needed to complete the power measurement is cost in terms of time unchanged for the attacker.

In the process for taking differences by the above described $2^{20}$ times, randomized exponents sometimes match or mismatch for both P and Q. However, whether or not the exponents match can be easily determined based on a difference between power waveforms. This is because a flat waveform can possibly appear in all differential waveforms by 1024 times (case of a modular exponentiation computation) or by 160 times (case of a scalar multiplication of a point) if randomized private keys match as illustrated in FIG. 35A. In contrast, if the randomized private keys mismatch, only starting 20 bits of the bit values of the private keys match as illustrated in FIG. 35B. Therefore, a peak appears in differential waveforms subsequent to waveforms of the starting 20 times. Since a distinction can be easily made between these two types of phenomena, the attacker can obtain a differential waveform in the case where the randomized private keys match.

If the attacker can successfully obtain a differential waveform when the randomized private keys are the same for both P and Q, her or she can obtain $2/3$ ($\alpha = 3$) or $3/(2\alpha)$ of all bit values of by using a method similar to that in the case where the private key is not randomized. Considering that a result of the modular exponentiation process using the private key $d_j'$ or that of the scalar multiplication of a point using the private key $d_j'$ matches a computation result in the case where the private key d is used, $d_j'$ is a key that is substantially equivalent to the private key d. Namely, by using the special PA, ⅔ ($\alpha$=3) or 3/(2$\alpha$) of all the bit values of the private key can be obtained by using the special PA even when a DPA is used.

The above described method needs the power measurement repeated by 1,000,000 times in order to successfully conduct the attack. However, by devising the power measurement method, the number of times that the power measurement is repeated can be reduced to 2,000 times. This is implemented by repeating, by a plurality of times, a power measurement in the case where P is given and in the case where Q is given, and by generating many differences between powers for P and Q. By repeating the power measurement by 1,000 times respectively for P and Q (2,000 times in total), the number of possible pairs of power differences is 1,000×1,000=1,000,000. Therefore, pairs having a matching 20-bit random number are expected to be included. In this case, the number of times that the power measurement is repeated is 2,000 times, and the attack is expected to be completed within one day.

The above described method is the attack method using the special PA against the combination of the SPA measure implemented with the A&D-always method and the DPA measure implemented with the conventional method 1, and effects of this method are as represented by Table 4 of FIG. 32.

An attack method using a special PA against a combination of the SPA measure implemented with the A&D-always method and the DPA measure implemented with the conventional method 2 is described next. Basically, this method is the same as that implemented by combining the A&D-always method and the conventional method 1. Namely, a differential curve is generated if randomized exponents match, and key bits are analyzed based on flat and peak patterns. As is proved from 1704, 1705 and 1706 of FIGS. 17, and 1904, 1905 and 1906 of FIG. 19, randomized exponents in the conventional method 2 are three types such as $r_j$, $d_j'$, and $e_j'$, which satisfy the relationships represented by the expressions (4.4), (4.5) and (4.8) for the private key d. By using a method similar to the attack method referred to in the combination of the A&D-always method and the conventional method 1, ⅔ ($\alpha$=3) or 3/(2$\alpha$) ($\alpha$ is a prime number equal to or larger than 5) of all bit values of the three types of values such as $r_j$, $d_j'$ and $e_j'$, which are used in the modular exponentiation computations or the scalar multiplications of a point, which are written in 1704, 1705 and 1706 of FIGS. 17 and 1904, 1905 and 1906 of FIG. 19, can be obtained. Since $$d = d_j' \times r_j + e_j$$

based on the expression (4.8), ⅔ ($\alpha$=3) or 3/(2$\alpha$) ($\alpha$ is a prime number equal to or larger than 5) of all the bit values of d can be obtained.

As described above, by using a special PA, key bit values at each of the ratios represented by Table 4 of FIG. 32 can be obtained for all of the SPA measure implemented with the A&D-always method, the combination of the SPA measure implemented with the A&D-always method and the DPA measure implemented with the conventional method 1, and the combination of the SPA measure implemented with the A&D-always method and the DPA measure implemented with the conventional method 2.

Thus, it became evident that the conventional SPA and DPA measures are not sufficiently tamper-proof due to the special PA attack.

Accordingly, the first to the sixth embodiments described below respectively provide an encryption processing device and method, which are tamper-resistant also to special PAs in addition to SPAs and DPAs.

Figure 37:
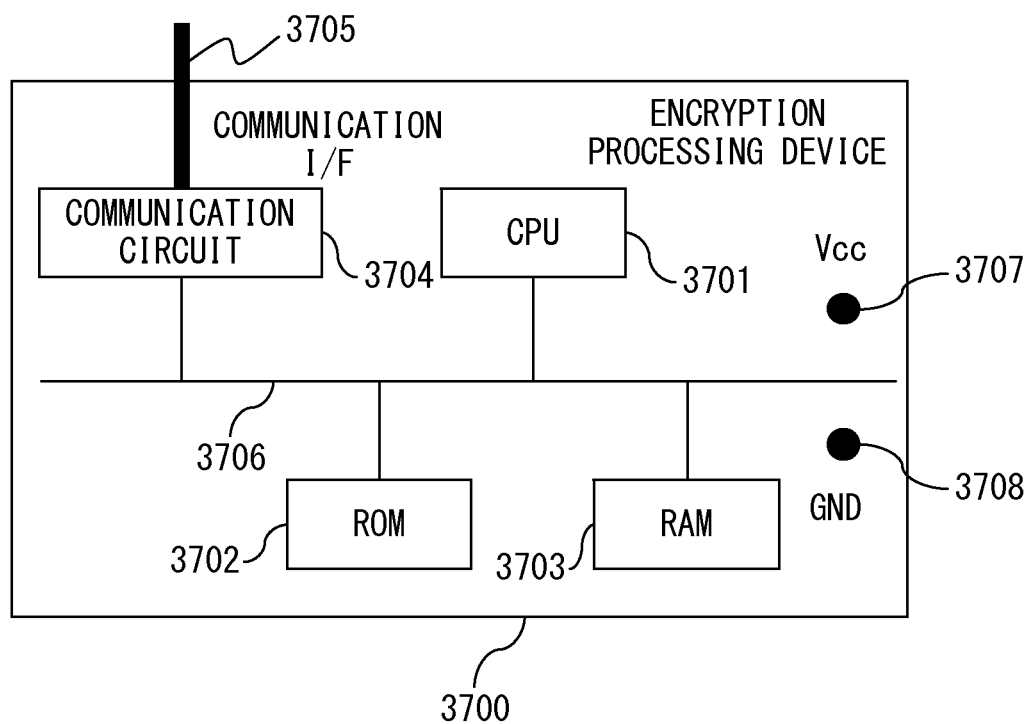
FIG. 37 illustrates an example of a first hardware configuration of encryption processing devices according to first to third embodiments.

FIG. 37 illustrates an example of a first hardware configuration of the encryption processing device according to the first to the sixth embodiments.

The encryption processing device 3700 of FIG. 37 includes a central processing unit (CPU) 3701, a read only memory (ROM) 3702, a random access memory (RAM) 3703, a communication circuit 3704, and a communication interface (I/F) 3705. The communication circuit 3704 communicates with another device via the communication I/F 3705.

The CPU 3701, the ROM 3702, the RAM 3703, and the communication circuit 3704 are interconnected by a bus 3706. Moreover, the encryption processing device 3700 has a power supply terminal 3707 and a ground terminal 3708. To the components within the encryption processing device 3700, a power supply voltage is applied via wires not illustrated and the power supply terminal 3707. The components within the encryption processing device 3700 are connected also to the ground terminal 3708 via wires not illustrated.

The CPU 3701 loads a program prestored in the ROM 3702 into the RAM 3703, and executes various types of processes by executing the program while using the RAM 3703 as a working area. For example, the CPU 3701 executes control processes represented by flowcharts of FIGS. 42 to 51.

Note that a nonvolatile storage device of another type such as a flash memory or the like may be used as a replacement for the ROM 3702. If a rewritable storage device such as a flash memory or the like is used as a replacement for the ROM 3702, a program may be downloaded into the encryption processing device 3700 via the communication I/F 3705 and installed in the encryption processing device 3700.

Additionally, the encryption processing device 3700 can communicate with another device via the communication I/F 3705. For example, the encryption processing device 3700 may transmit information such as a public key of the local device to another device via the communication I/F 3705, or may receive information such as a public key or the like of another device via the communication I/F 3705.

The communication I/F 3705 may be of an arbitrary type according to a type of the encryption processing device 3700. For example, the encryption processing device 3700 may be a smart card, an LSI chip embedded in an accessory such as a printer cartridge or the like, or an LSI chip embedded in a home appliance. For example, if the encryption processing device 3700 is a contact-type smart card, the communication I/F 3705 may include a communication terminal. Alternatively, if the encryption processing device 3700 is a non-contact type smart card, the communication I/F 3705 may include an antenna.

The communication circuit 3704 executes an appropriate process according to a type of the communication I/F 3705 and a communication protocol. For example, the communication circuit 3704 may execute processes such as digital-to-analog conversion, analog-to-digital conversion, modulation, demodulation, encryption, decryption, and the like.

An attacker who conducts a PA attack inputs, to the encryption processing device 3700, base data in a modular exponentiation computation, data of a point on an elliptic curve in a scalar multiplication of a point via the communication I/F 3705. Then, power consumed when the encryption processing device 3700 executes a process for the input data is measured, so that a private key of the encryption processing device 3700 is estimated. For example, the attacker measures the consumed power by connecting a resistor to the power supply terminal 3707.

FIG. 38 illustrates an example of a second hardware configuration of the encryption processing devices according to the first to the third embodiments. The encryption processing device 3710 of FIG. 38 includes an ECC hardware circuit 3711 as a replacement for the CPU 3701 and the ROM 3702.

The encryption processing device 3710 also includes a RAM 3703, a communication circuit 3704 and a communication I/F 3705, which are similar to those of the encryption processing device 3700 illustrated in FIG. 37. In the encryption processing device 3710, the ECC hardware circuit 3711, the RAM 3703, and the communication circuit 3704 are interconnected by a bus 3706. Moreover, the encryption processing device 3710 also includes a power supply terminal 3707 and a ground terminal 3708, which are similar to those of the encryption processing device 3700 illustrated in FIG. 37.

In the encryption processing device 3710, the ECC hardware circuit 3711 executes the control processes represented by the flowcharts illustrated in FIGS. 42 to 51 as a replacement for the CPU 3701 that reads and executes the program from the ROM 3702. The ECC hardware circuit 3711 may be, for example, an application specific integrated circuit (ASIC), or at least part of the ECC hardware circuit 3711 may be implemented with a field programmable gate array (FPGA). Also the ECC hardware circuit 3711 is connected to the power supply terminal 3707 and the ground terminal 3708 with wires not illustrated.

Depending on an embodiment, the encryption processing device may include the CPU 3701 as a general-purpose processor, the ROM 3702 of FIG. 37 for storing the program executed by the CPU 3701, and the ECC hardware circuit 3711 of FIG. 38 as a coprocessor. The CPU 3701 may execute some of the control processes represented by the flowcharts of FIGS. 42 to 51, and the ECC hardware circuit 3711 may execute the rest of the control processes. Also in this case, the encryption processing device includes the RAM 3703, the communication circuit 3704 and the communication I/F 3705 similarly to the configurations of FIGS. 37 and 38.

Figure 39:
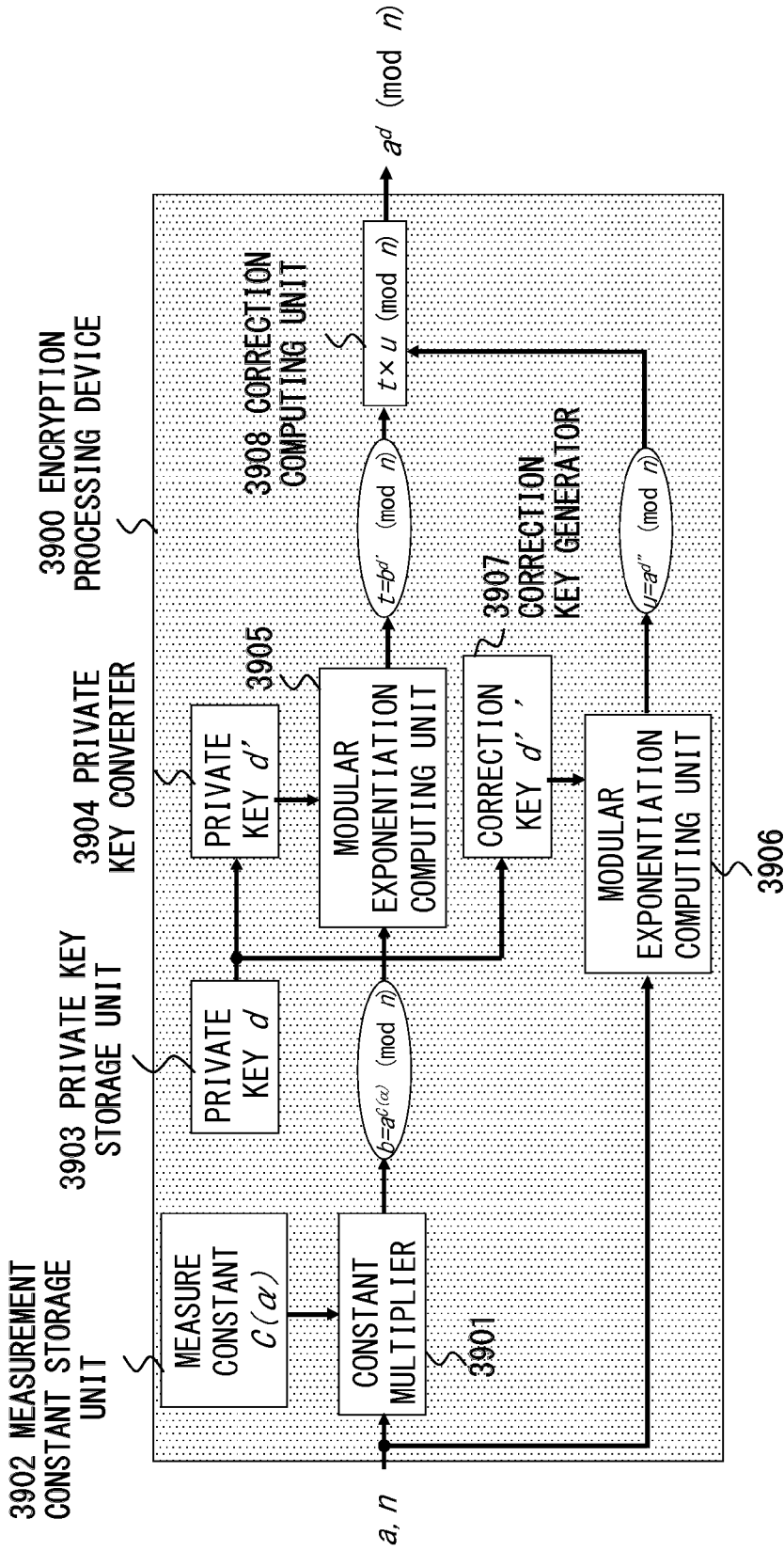
FIG. 39 illustrates a configuration of functions common to the encryption processing devices according to the first to the third embodiments.

FIG. 39 illustrates a configuration of functions common to the encryption processing devices according to the first to third embodiments. The encryption processing device 3900 illustrated in FIG. 39 can be implemented with the hardware illustrated in FIG. 37 or 38.

In the configuration of the functions, which takes a measure against special PAs, in the first to the third embodiments illustrated in FIG. 39, a computation is performed with the use of, as a new base, a result obtained by multiplying a base in a modular exponentiation computation by a constant.

In FIG. 39, a base a and a modulus n are input to a constant multiplier 3901, which reads a measure constant $C(\alpha)$ from a measure constant storage unit 3902. Then, the constant multiplier 3901 initially calculates a new base $b=a^{C(\alpha)} \pmod n$ or $b=a^{r'} \pmod n$ by multiplying the base a by $C(\alpha)$ or $r'(=C(\alpha)\times$ random number r) in order to perform a modular exponentiation computation ($a^d \pmod n$). However, the measure constant $C(\alpha)$ stored in the measure constant storage unit 3902 is a constant set according to an intensity of an attack of an assumed special PA. Specifically, this constant is given as a product of all values of a prime number $\alpha$ for generating a selected message pair $P^\alpha = Q^\alpha \pmod n$. For example, if an attack of $\alpha=3$ is assumed and prevented, $C(\alpha)=3$. For example, if an attack of $\alpha=3$ and $\alpha=5$ is assumed and prevented, $C(\alpha)=3\times5=15$. For example, an attack of $\alpha=3$ and $\alpha=7$ is assumed and prevented, $C(\alpha)=3\times7=21$. For example, if an attack of $\alpha=3$, $\alpha=5$ and $\alpha=7$ is assumed and prevented, $C(\alpha)=3\times5\times7=105$.

By assuming many types of an attack and setting $C(\alpha)$, security can be improved. However, since an overhead of calculation processing time is proportional to a bit length of $C(\alpha)$, $C(\alpha)$ is set depending on a tradeoff between security and the processing time. As represented by Table 4 of FIG. 32, the ratio of leaked key bits decreases with an increase in a. Therefore, it is appropriate that $C(\alpha)$ is set to the product of all prime numbers equal to or smaller than 7.

In FIG. 39, a private key converter 3904 converts a private key d stored in a private key storage unit 3903 into a private key d'. The private key d' is computed as a quotient obtained by dividing the private key d by the measure constant $C(\alpha)$ or $r'(=C(\alpha)\times$ random number).

A correction key generator 3907 generates a correction key d" from the private key d stored in the private key storage unit 3903. The correction key d" is computed as a remainder obtained by dividing the private key d by the measurement constant $C(\alpha)$ or $r'(=C(\alpha)\times$ random number r).

A modular exponentiation computing unit 3905 performs a modular exponentiation computation $u=a^{d''} \pmod n$ for the private key d' output by the private key converter 3904 with the use of the new base b generated by the constant multiplier 3901, and the modulus n. This computation is performed, for example, with the A&D-always method illustrated in FIG. 12.

A modular exponentiation computing unit 3906 performs a modular exponentiation computation $u=a^{d''} \pmod n$ for the correction key d" output by the correction key generator 3907 with the use of the input base a and modulus n, and outputs a correction value u.

Computation results t and u output by the modular exponentiation computing units 3905 and 3906 are input to a correction computing unit 3908, which performs a correction computation of a multiplication $t \times u \pmod n$, and outputs a result equivalent to a final result of the modular exponentiation computation $a^d \pmod n$.

Here, the private key converter 3904 and the correction key generator 3907 calculate and output the private key d' and the correction key d", which satisfy an expression (6.1).

$$d = c(\alpha) \times d' + d'' \qquad (6.1)$$

With this relational expression, the modular exponentiation computation value $a^d \pmod n$ of the encryption process can be represented as an expression (6.2).

$$\begin{aligned} v &= a^d \pmod n \\ &= a^{(c(\alpha)d' + d'')} \pmod n \\ &= (a^{c(\alpha)})^{d'} \times a^{d''} \pmod n \end{aligned}$$

By deciding the measure constant $C(\alpha)$ based on the expression (6.2) so that the expression (6.1) is satisfied, it is proved that the modular exponentiation computation value $a^d \pmod n$ of the encryption process can be surely output with the configuration of FIG. 39.

Additionally, the private key converter 3904 and the correction key generator 3907 can be also configured to calculate and output the private key d' and the correction key d", which satisfy an expression (6.3), by introducing the random number r to the measure constant $C(\alpha)$.

$$d = (c(\alpha) \times r) \times d' + d'' \quad (6.3)$$
$$= r'd' + d''$$

With this relational expression, the modular exponentiation computation value $a^d \pmod n$ of the encryption process can be represented as an expression (6.4).

$$\begin{aligned} v &= a^d \pmod n \quad (6.4) \\ &= a^{(r'd'+d'')} \pmod n \\ &= \left(a^{r'}\right)^{d'} \times a^{d''} \pmod n \\ &= b^{d'} \times a^{d''} \pmod n \\ &= t \times u \pmod n \end{aligned}$$

With the expression (6.4), the measure constant $C(\alpha)$ is decided so that the expression (6.3) is satisfied, and the value r' is used as a replacement for the measure constant $C(\alpha)$ in the constant multiplier 3901, the private key converter 3904 and the correction key generator 3907, which are illustrated in FIG. 39. This proves that the modular exponentiation computation value $a^d \pmod n$ of the encryption process can be surely output.

With the measures according to the first to the third embodiments based on the configuration of FIG. 39, the following process is executed. Namely, in the modular exponentiation computation for the encryption process, an input value a is not used as a base, and a value $b=a^{C(\alpha)} \pmod n$ or $b=a^{r'} \pmod n$, which is obtained by multiplying the input value a by the measure constant $C(\alpha)$ or $r'(=C(\alpha)\times$random number r) set according to the above described procedure, is used as a new base. The new base b when each of selected messages P and Q is input is as follows.

$$P^{C(\alpha)} \pmod n \quad (6.5)$$

$$Q^{C(\alpha)} \pmod n \quad (6.6)$$

For the assumed $\alpha$, the expressions (6.5) and (6.) always become equal. This is because the equation $P^\alpha = Q^\alpha \pmod n$ is satisfied and $C(\alpha)$ is a common factor of all values of the assumed $\alpha$. Since the expressions (6.5) and (6.6) are results obtained by multiplying both sides of $P^\alpha = Q^\alpha \pmod n$ by an integer, these expressions become equal.

Figure 40:
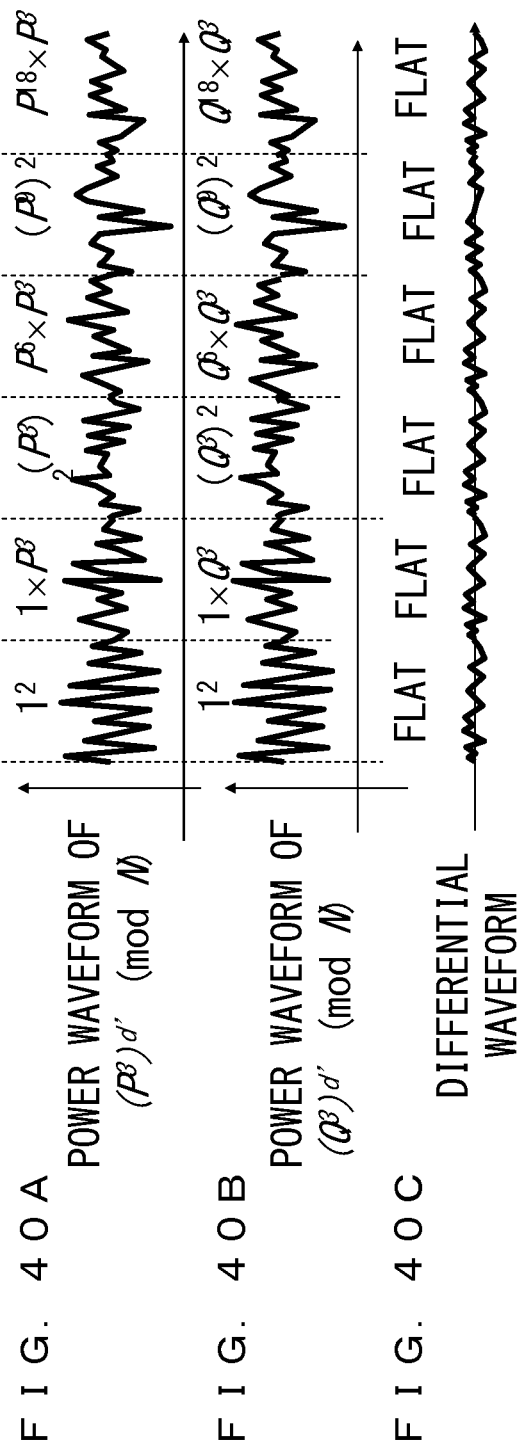
FIGS. 40A, 40B, and 40C illustrate a power differential waveform generated in the first to sixth embodiments.
Figure 41:
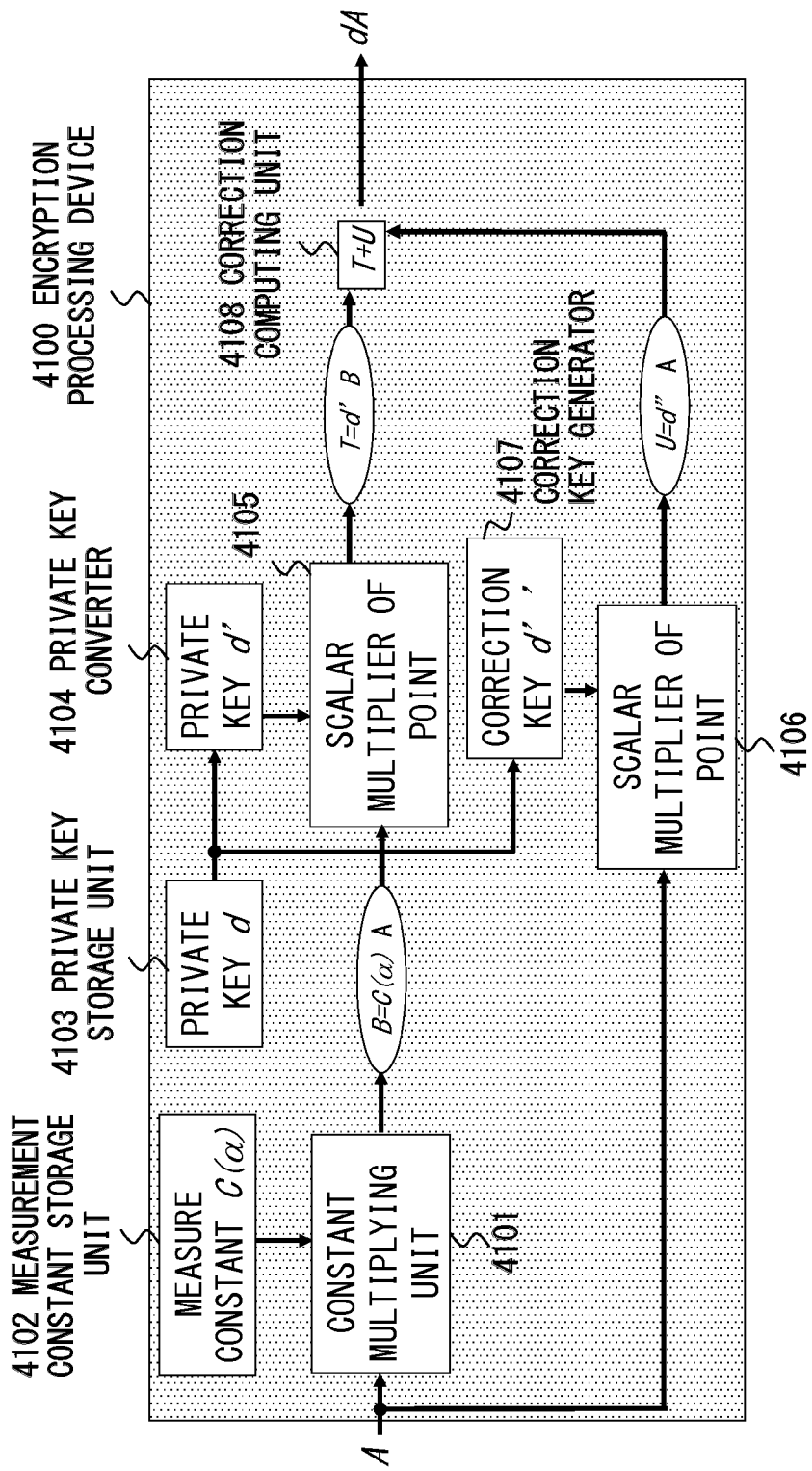
FIG. 41 illustrates a configuration of functions common to encryption processing devices according to fourth to sixth embodiments.

Even if a power difference between modular exponentiation computations where bases are the same is generated, it is difficult for an attacker to obtain significant information. This is because the bases are the same for both P and Q as illustrated in FIG. 41 (FIGS. 40A and 40B), and a differential waveform always becomes flat even if a difference between powers is generated (FIG. 40C). Therefore, it is difficult for the attacker to obtain significant information for decrypting key bits.

With the modular exponentiation computation performed by the modular exponentiation computing unit 3906, the input base a is used unchanged. Therefore, this encryption processing device is vulnerable to special PAs. However, since a bit length of the correction key d" is made much shorter than that of the private key d, influences of a special PA attack can be minimized. The bit length of d" relative to d varies depending on an embodiment. Details will be described in the first to the third embodiments.

FIG. 41 illustrates a configuration of functions common to encryption processing devices according to fourth to sixth embodiments. The encryption processing device 4100 illustrated in FIG. 41 can be implemented with the hardware configuration illustrated in FIG. 37 or 38.

In the configuration of the functions, which takes a measure against special PAs, in the fourth to the sixth embodiments according to the present invention illustrated in FIG. 41, a computation is performed by using a result obtained by multiplying a point on an elliptic curve in a scalar multiplication of a point by a constant as a point on a new elliptic curve.

The configuration of FIG. 41 can be basically implemented by replacing the modular exponentiation $a^d \pmod n$ and the multiplication $t \times u \pmod n$, which are illustrated in FIG. 39, respectively with a scalar multiplication of a point dA and an addition of a point T+U. This is evident from the associations illustrated in FIG. 1.

In FIG. 41, a point A on an elliptic curve is input to a constant multiplying unit 4101, which reads a measure constant $C(\alpha)$ from a measure constant storage unit 4102. Then, the constant multiplying unit 4101 initially calculates a point $B=C(\alpha)A$ or $B=r'A$ on a new elliptic curve by multiplying the point A by $C(\alpha)$ or $r'(=C(\alpha)\times$random number r) in order to calculate the scalar multiplication of a point dA. However, the measure constant $C(\alpha)$ stored in the measure constant storage unit 4102 is selected based on criteria similar to those in the case of FIG. 39.

In FIG. 41, a private key converter 4104 converts a private key d stored in a private key storage unit 4103 into a private key d'. The private key d' is computed as a quotient obtained by dividing the private key d by the measure constant $C(\alpha)$ or $r'(=C(\alpha)\times$random number r).

A correction key generator 4107 generates a correction key d" from the private key d stored in the private key storage unit 4103. The correction key d" is computed as a remainder obtained by dividing the private key d by the measure constant $C(\alpha)$ or the $r'(=C(\alpha)\times$random number r).

A scalar multiplier of a point 4105 performs a scalar multiplication of a point T=d'B for the private key d' output by the private key converter 4104 with the use of the new point B generated by the constant multiplying unit 4101. This calculation is performed, for example, with the A&D-always method illustrated in FIG. 15.

A scalar multiplier of a point 4106 performs a scalar multiplication of a point U=d"A for the correction key d" output by the correction key generator 4107 with the use of the input point A, and outputs a correction value u.

Computation results t and u output by the scalar multipliers of a point 4105 and 4106 are input to a correction computing unit 4108, which performs a correction computation for an addition T+U, and outputs a result equivalent to a final result dA of the scalar multiplication of a point.

Here, the private key converter 4104 and the correction key generator 4107 calculate and output the private key d' and the correction key d", which satisfy the expression (6.1) in the case of FIG. 39. With this relational expression, the value dA of the scalar multiplication of a point in the encryption process can be represented as an expression (6.7).

$$\begin{aligned} v &= dA = (c(\alpha) \times d' + d'')A \quad (6.7) \\ &= d'c(\alpha)A + d''A \\ &= d'B + d''A \\ &= T + U \end{aligned}$$

With the expression (6.7), the measure constant $C(\alpha)$ is decided so that the expression (6.1) is satisfied. As a result, it is proved that the value dA of the scalar multiplication of a point in the encryption process can be surely output with the configuration of FIG. 41.

Additionally, the private key converter 4104 and the correction key generator 4107 can be also configured to calculate and output the private key d' and the correction key d", which satisfy the expression (6.3) in the case of FIG. 39, by introducing the random number r to the measure constant $C(\alpha)$. With this relational expression, the value dA of the scalar multiplication of a point in the encryption process can be represented as an expression (6.8).

$$\begin{aligned} v = dA &= ((c(\alpha) \times r) \times d' + d'')A \\ &= d'(c(\alpha) \times r)A + d''A \\ &= d'B + d''A \\ &= T + U \end{aligned} \quad (6.8)$$

With the expression (6.8), the measure constant $C(\alpha)$ is decided so that the expression (6.3) is satisfied, and the value r' is used as a replacement for the measure constant $C(\alpha)$ in the constant multiplying unit 4101, the private key converter 4104 and the correction key generator 4107, which are illustrated in FIG. 41. As a result, the value dA of the scalar multiplication of a point in the encryption process can be surely output.

With the measures according to the fourth to the sixth embodiments based on the configuration of FIG. 41, the following process is executed. Namely, in the scalar multiplication of a point for the encryption process, an input value A is not used as a point on an elliptic curve, and a value $B=C(\alpha)A$ or B=r'A, which is obtained by multiplying the point A by the measure constant $C(\alpha)$ or r' ($=C(\alpha) \times$ random number r) set according to the above described procedure, is used as a point on a new elliptic curve. The new point B when each of the selected messages P and Q is input is as follows.

$$C(\alpha)P \quad (6.9)$$

$$C(\alpha)Q \quad (6.10)$$

For an assumed $\alpha$, the expressions (6.9) and (6.10) always become equal. This is because the equation $\alpha P = \alpha Q$ is satisfied and $C(\alpha)$ is a common factor for all values of the assumed a. The expressions (6.9) and (6.10) are results obtained by multiplying both of sides of $\alpha P = \alpha Q$ by an integer, so that these expressions become equal.

As a result, it is difficult for an attacker to obtain significant information even if he or she generates a power difference between modular exponentiation computations where bases are the same, according to a principle similar to that in the case of FIG. 39. This is because the bases are the same for both P and Q, and a differential waveform always becomes flat even if their difference is generated, so that it is difficult for the attacker to obtain significant information for decrypting key bits.

Figure 29:
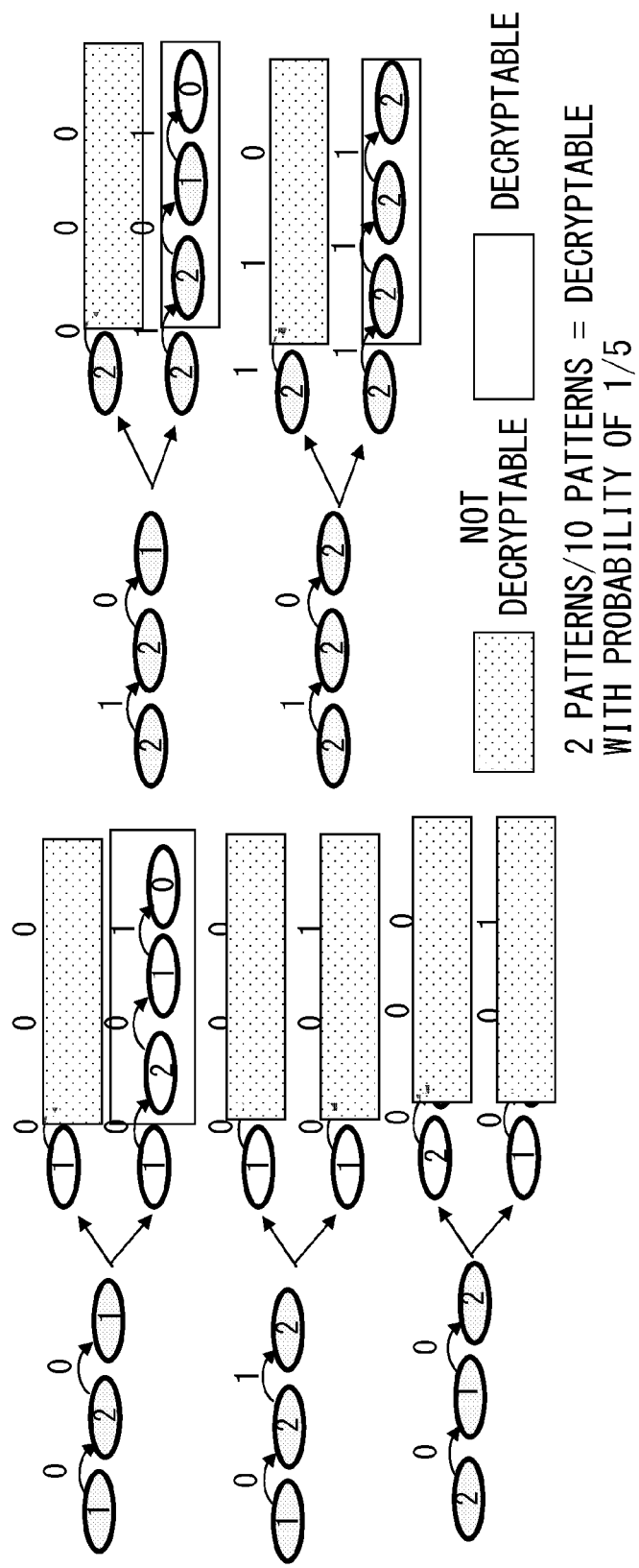
FIG. 29 is an explanatory diagram for analyzing a probability that low-order bit follow decryption is successfully made.
Figure 30:
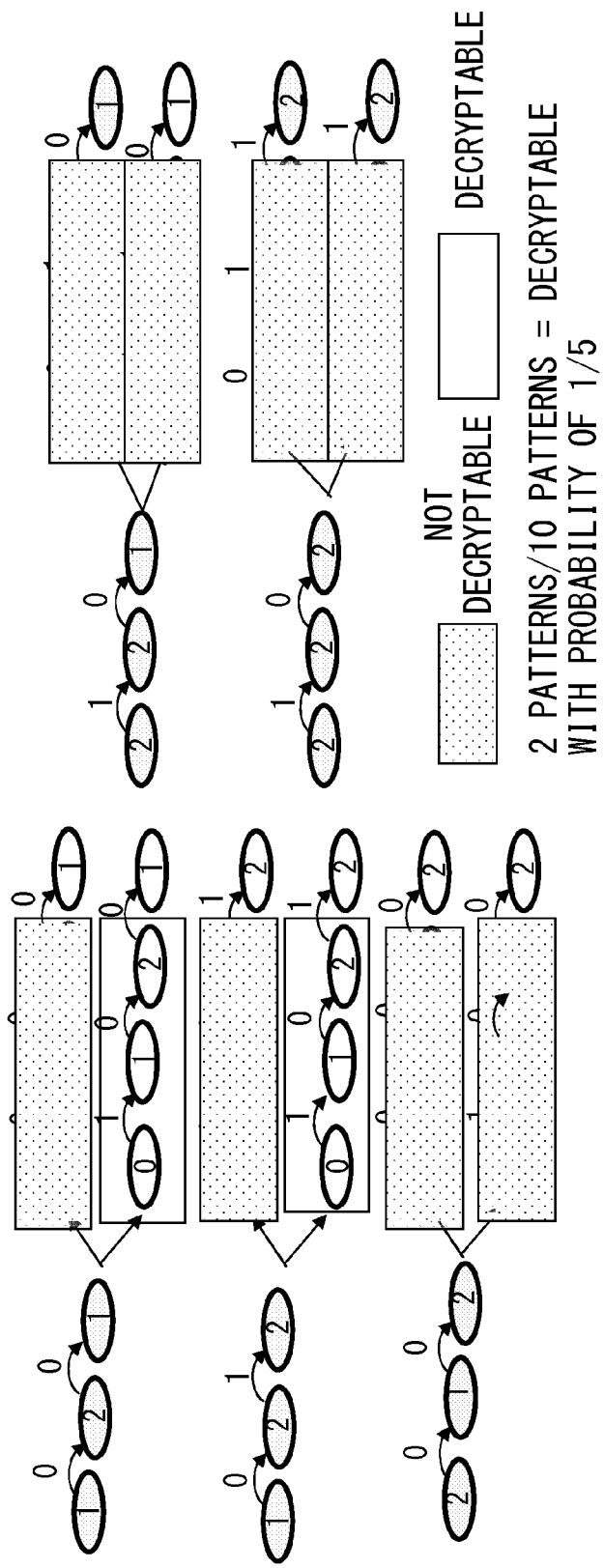
FIG. 30 is an explanatory diagram for analyzing a probability that high-order bit follow decryption is successfully made.

Similarly to the case of FIG. 29, the input point A on the elliptic curve is used unchanged in the scalar multiplication of a point performed by the scalar multiplier of a point 4106. Therefore, this encryption processing device is vulnerable to special PAs. However, since the bit length of the correction key d" is made much shorter than that of the private key d, influences of an attack using a special PA can be minimized.

The bit length of d" relative to d varies depending on an embodiment. Details will be described in the fourth to the sixth embodiments.

In FIGS. 39 and 41, the constant multiplier 3901, the constant multiplying unit 4101, the private key converters 3904 and 4104, the modular exponentiation computing units 3905 and 3906, the scalar multipliers of a point 4105 and 4106, the correction key generators 3907 and 4107, and the correction computing units 3908 and 4108 can be implemented as the following configurations. Namely, these components may be processes executed by the CPU 3701 of FIG. 37, those executed by the ECC hardware circuit 3711 of FIG. 38, or those executed by a combination of the CPU 3701 and the ECC hardware circuit 3711. In this case, a program for executing these processes can be stored and executed in the ROM 3702 or the RAM 3703, which is illustrated in FIG. 37 or 38. Moreover, the measure constant storage units 3902 and 4102, and the private key storage units 3903 and 4103 can be stored, for example, in the ROM 3702 or the RAM 3703, which is illustrated in FIG. 37 or 38.

In FIG. 39 or 41, the base a, the modulus n, and the point A may be given from a device other than the encryption processing device 3900 or 4100 to the encryption processing device. For example, the base a and the point A may be a public key of an external device. The public key of the external device is sometimes notified, for example, from the external device to the encryption processing device 3900 or 4100 in order for a DH key agreement, or sometimes notified from the external device to the encryption processing device 3900 or 4100 in order for authentication attempted with a DSA.

If the base a, the modulus n, and the point A are given from a device other than the encryption processing device 3900 or 4100 to the encryption processing device, they are obtained by the communication I/F 3705 and the communication circuit 3704.

The correction computing unit 3908 of FIG. 39 or the correction computing unit 4108 of FIG. 41 may transmit a computation result to another device, may execute a process for authentication attempted with a DSA, or may execute a process for a DH key agreement. Depending on circumstances, the computation result may be externally output by using the communication circuit 3704 and the communication I/F 3705. This is, for example, a case where the encryption processing device 3900 or 4100 is included in an accessory (such as a printer cartridge or the like) authenticated by a host (such as a printer or the like).

Figure 42:
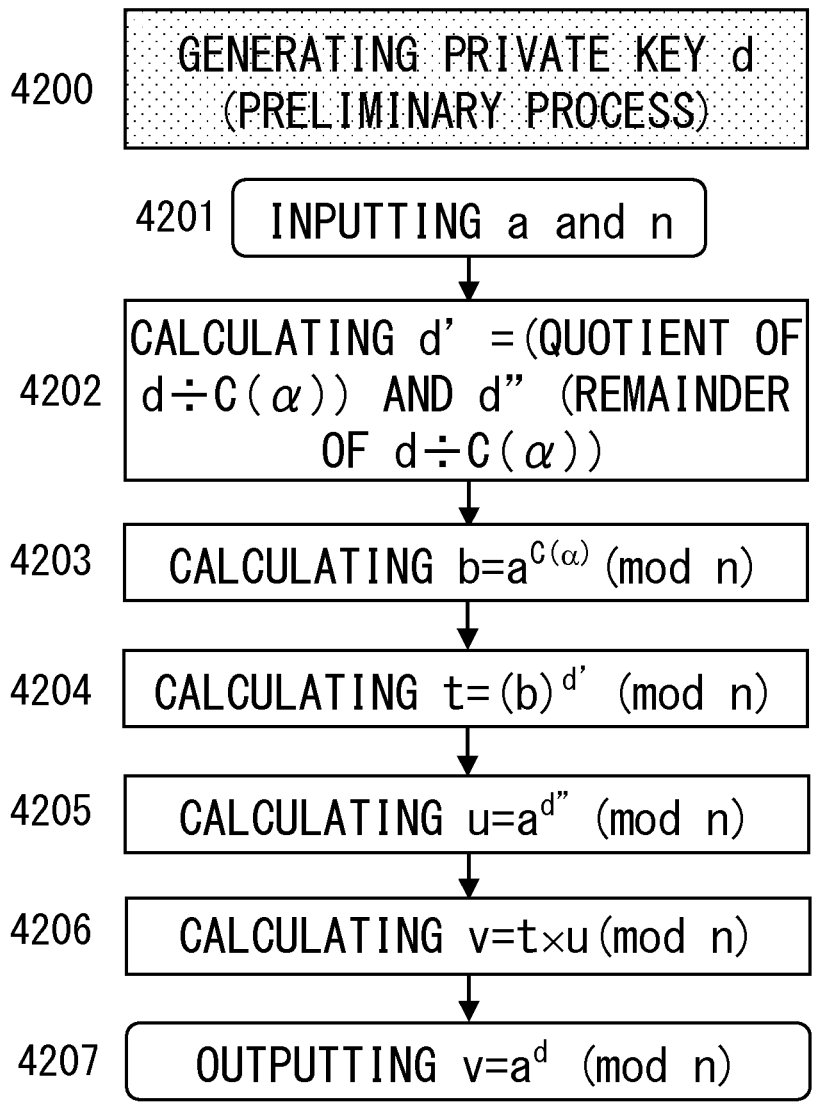
FIG. 42 is a flowchart illustrating a control process of the first embodiment.

A first embodiment that refers to a specific process of the encryption processing device 3900 illustrated in FIG. 39 is described next. FIG. 42 is a flowchart illustrating a control process of the first embodiment. The process of this flowchart is described below.

A quotient and a remainder are calculated by dividing a private key d generated preliminarily (step 4200) by $C(\alpha)$, and respectively given to d' and d" (step 4202). This is a process based on the expressions (6.1) and (6.2), and corresponds to the functions of the private key converter 4104 and the correction key generator 3907.

A result $a^{C(\alpha)} \pmod{n}$ obtained by multiplying the base a by $C(\alpha)$ is given to b (step 4203). This corresponds to the function of the constant multiplier 3901.

A modular exponentiation computation using b and d' as a base and an exponent is performed, and a result is given to t as $t = b^{d'} \pmod{n}$ (step 4202). This corresponds to the function of the modular exponentiation computing unit 3905.

By performing the modular exponentiation computation using a and d" as a base and an exponent, a correction value $u=a^{d''}\pmod{n}$ is generated (step 4205). This corresponds to the function of the modular exponentiation computing unit 3906.

$v=t\times u\pmod{n}$ is calculated based on t and the correction value u (step 4206). This corresponds to the function of the correction computing unit 3908.

Lastly, v is output as a calculation result $a^d\pmod{n}$ (step 4207).

In step 4205, the modular exponentiation computation using the base a unchanged is performed, and this process is vulnerable to special PAs. However, an exponent used in this modular exponentiation is $d''=d\pmod{C(\alpha)}$, and a bit length of this exponent is equal to a bit length $(\log_2 C(\alpha))$ of $C(\alpha)$. If $C(\alpha)=3\times 5\times 7=105$ is used, a bit length exposed to a special PA attack is only $\log_2 105=7$ bits, and can be reduced to be short enough to be able to ignore the influences of the special PA compared with the bit length (1024 bits or more) of the entire private key.

FIG. 43 is a flowchart illustrating details (No. 1) of the modular exponentiation computation process executed in steps 4203, 4204, and 4205 of FIG. 42. The process of this flowchart is based on the algorithm of the modular exponentiation computation process using the A&D-always method illustrated in FIG. 12.

In step 4300, the input values illustrated in FIG. 12 are input.

step 4301 corresponds to line 1201 of FIG. 12.

steps 4302, 4306, and 4307 correspond to the loop process of the for statement in 1202 of FIG. 12.

step 4303 corresponds to line 1203 of FIG. 12, and performs squaring.

step 4304 corresponds to line 1204 of FIG. 12, and performs a multiplication.

step 4305 corresponds to line 1205 of FIG. 12.

steps 4308 and 4309 correspond to line 1207 of FIG. 12.

In this flowchart, a computation pattern of squaring (4303) and a multiplication (4304) is always made regular regardless of the value of an exponent d.

Figure 44:
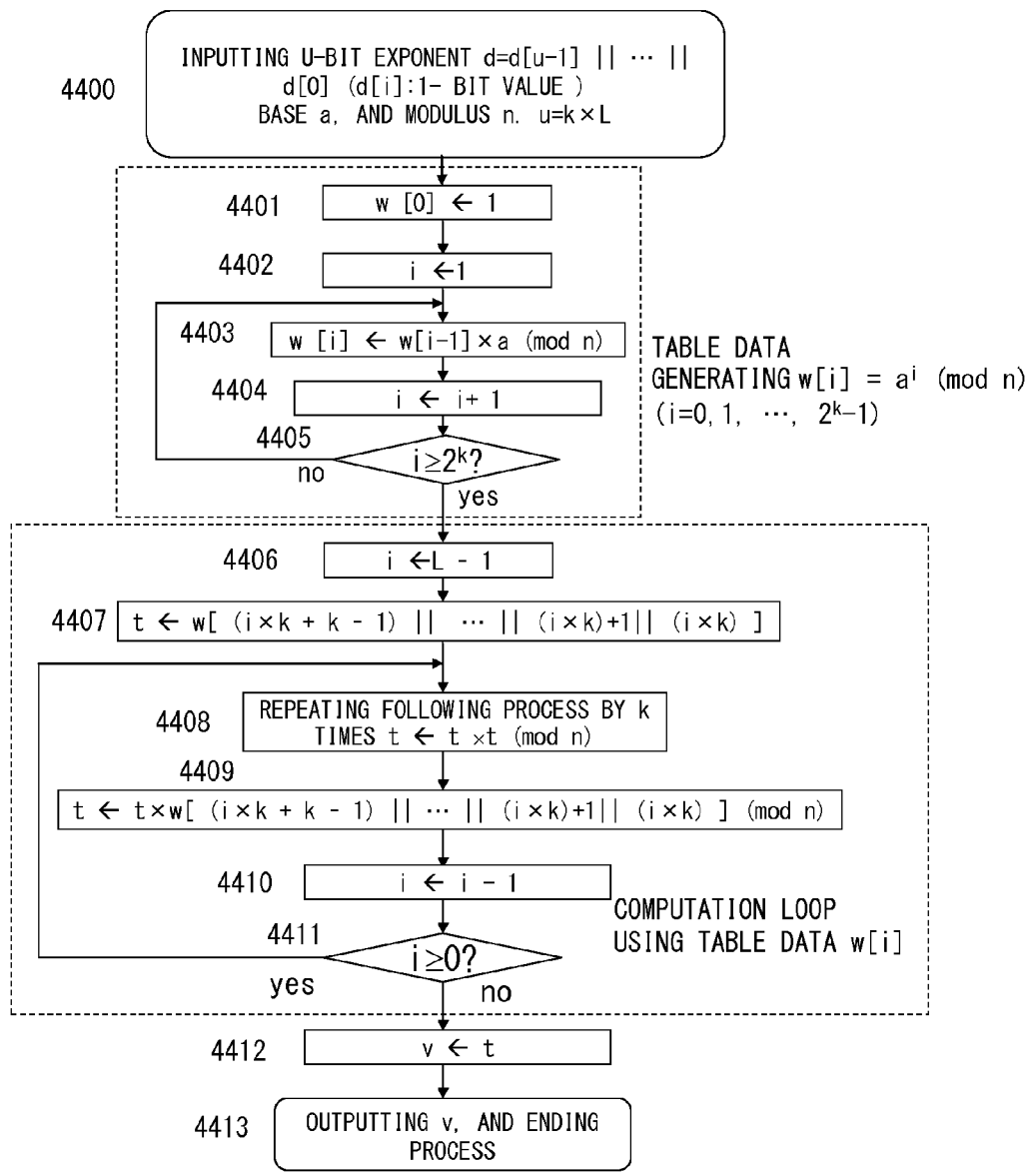
FIG. 44 is a flowchart illustrating details (No. 2) of a modular exponentiation computation process in the first to the third embodiments.

FIG. 44 is a flowchart illustrating details (No. 2) of the modular exponentiation computation process executed in steps 4203, 4204, and 4205 of FIG. 42. In the flowchart of FIG. 43, the modular exponentiation computation is performed while incrementing the exponent d by 1 bit. In contrast, in the flowchart of FIG. 44, a k-bit table represented by $w[i]=ai\pmod{n}$ (i=0, 1, ..., $2^k-1$) is calculated with a loop control process insteps 4404 and 4405 after an initialization process insteps 4401 and 4402 (step 4403).

Then, after an initialization process in steps 4406 and 4407, the modular exponentiation computation is performed while incrementing the exponent d by k bits with a loop control process in steps 4410 and 4411. Similarly to the flowchart of FIG. 43, a computation pattern of squaring (step 4408) and a multiplication (step 4409) is always made regular regardless of the value of the exponent d.

Figure 45:
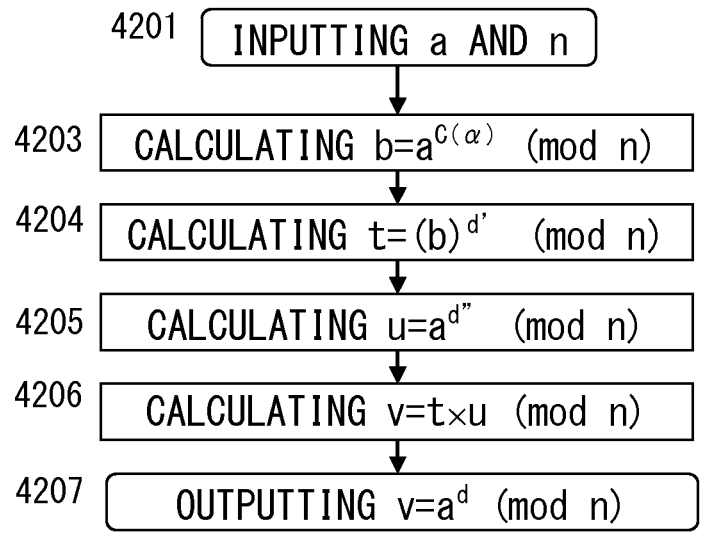
FIG. 45 is a flowchart illustrating a control process of the second embodiment.

The second embodiment that refers to a specific process of the encryption processing device 3900 illustrated in FIG. 39 is described next. FIG. 45 is a flowchart illustrating a control process of the second embodiment. The process of this flowchart is described below.

In FIG. 45, the same processes as those in the first embodiment of FIG. 42 are denoted with the same numbers.

The control process of the second embodiment is different from that of the first embodiment in that a process for calculating a quotient and a remainder by dividing d by $C(\alpha)$ is executed when a private key d is generated in a preliminary process, and the quotient and the remainder are respectively given to d' and d'' (step 4500). This is a process based on the expressions (6.1) and (6.2), and corresponds to the functions of the private key converter 3904 and the correction key generator 3907, which are illustrated in FIG. 39. This process is executed as a preliminary process, thereby eliminating the need for executing a division process each time the modular exponentiation computation is performed.

Processes in steps 4201 and 4203 to 4207 of FIG. 45 are the same as those in the first embodiment of FIG. 42.

In step 4205, the number of bits vulnerable to a special PA is only 7 bits or so similarly to the case of the first embodiment.

The third embodiment that refers to a specific process of the encryption processing device 3900 illustrated in FIG. 39 is described next. FIG. 46 is a flowchart illustrating a control process of the third embodiment. The process of this flowchart is described below.

In FIG. 46, the same processes as those of the first embodiment illustrated in FIG. 42 are denoted with the same numbers.

The control process of the third embodiment is different from that of the first embodiment in that a random number r is added to the measure constant $C(\alpha)$.

Initially, a private key d is generated preliminarily (step 4200), and abase a and a modulus n are input (step 4201).

Then, a 20-bit random number r is generated (step 4601).

Next, $r'=C(\alpha)\times r$ is computed based on the expression (6.3) (step 4602).

Then, a quotient and a remainder of the private key d generated preliminarily are calculated by dividing the private key d by r', and respectively given to d' and d'' (step 4603). This is a process based on the expressions (6.3) and (6.4), and corresponds to the functions of the private key converter 4104 and the correction key generator 3907.

A result $a^{r'}\pmod{n}$ obtained by multiplying the base a by r' is given to b (step 4604). This corresponds to the function of the constant multiplier 3901.

Thereafter, similarly to the case of FIG. 42, processes in steps 4204, 4205, 4206, and 4207 are sequentially executed, and a final value $v=a^d\pmod{n}$ of the modular exponentiation computation is output according to the control process executed based on the expression (6.4).

In step 4205, the modular exponentiation computation using the base a unchanged is performed. This process is vulnerable to special PAs. Its bit length is longer than that in the first or the second embodiment by a bit length of the random number r, and results in (bit length of $C(\alpha)$)+ $20(=\log_2 C(\alpha)+20)$. If $C(\alpha)=3\times 5\times 7=105$, a bit length exposed to a special PA attack is only $20+\log_2 105=27$ bits, and can be made short enough to be able to ignore the influences of the special PA attack compared with the bit length (1024 bits or more) of the entire private key.

Compared with the first or the second embodiment, a bit length exposed to a special PA attack increases. However, since all exponents of the modular exponentiation computation in steps 4204, 4205, and 4206 are randomized, the third embodiment has an advantage that safety from DPAs is high.

The process itself in step 4603 in the third embodiment is similar to that represented by the expressions (4.4) and (4.5) of the above described conventional method 2. However, the third embodiment has a characteristic such that a process $r'=r\times C(\alpha)$ in step 4602 for multiplying the random number r generated in step 4601 by $C(\alpha)$ is executed, whereas the conventional method 2 does not execute a process corresponding to that of the third embodiment. A difference in this characteristic causes a difference in effects. Namely, in the third embodiment, the base b is given as a value obtained by multiplying a by r' to r', which is an integral multiple of $C(\alpha)$, in the third embodiment, so that a process safe also from special PAs can be implemented. In contrast, with the conventional method 2, the generated random number r is used unchanged, so that the base b is given as a value obtained by multiplying a by r. This r is a random number, and is not always a multiple of C(α). Therefore, a special PA is successfully conducted with a significantly high probability of (Φ(C(α))/C(α)). Φ(x) is called Euler's function, and is calculated by a product of values obtained by subtracting 1 from all prime numbers into which x is factorized. For example, Φ(3)=3−1=2, Φ(3×5)=(3−1)×(5−1)=2×4=8, and Φ(3×5×7)= (3−1)×(5−1)×(7−1)=2×4×6=48.

The third embodiment has a characteristic of having high tamper-resistance to special PAs.

Figure 47:
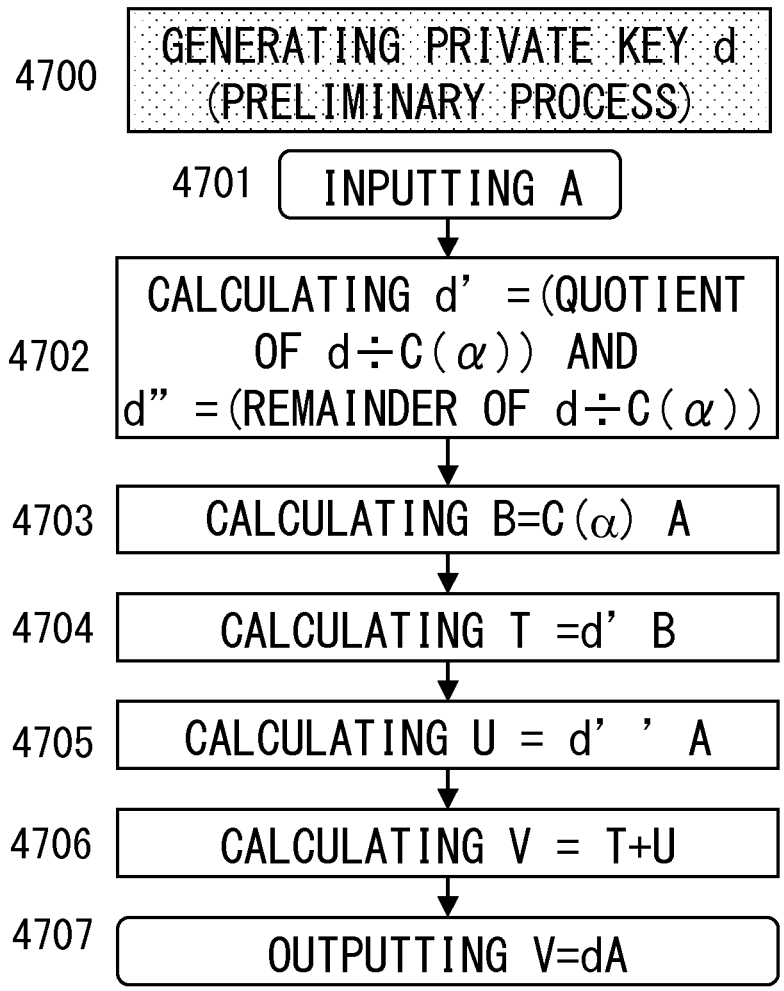
FIG. 47 is a flowchart illustrating a control process of the fourth embodiment.

The fourth embodiment that refers to a specific process of the encryption processing device 4100 illustrated in FIG. 41 is described next. FIG. 47 is a flowchart illustrating a control process of the fourth embodiment. The process of this flowchart is described below.

A quotient and a remainder are calculated by dividing the private key d generated preliminarily (step 4700) by C(α), and respectively given to d' and d" (step 4702). This is a process based on the expressions (6.1) and (6.7), and corresponds to the functions of the private key converter 4104 and the correction key generator 4107.

A result C(α)A obtained by multiplying a point A by C(α) is given to B (step 4703). This corresponds to the function of the constant multiplying unit 4101.

A scalar multiplication of a point for multiplying B by d' is performed, and T=d'B is given to T (step 4704). This corresponds to the function of the scalar multiplier 4105 of a point.

A correction value U=d"A is generated by performing the scalar multiplication of a point for multiplying the point A by d" (step 4705). This corresponds to the function of the scalar multiplier of a point 4106.

V=T+U is calculated from T and the correction value U (step 4706). This corresponds to the function of the correction computing unit 4108.

Lastly, V is output as a calculation result dA (step 4707).

In step 4705, a scalar multiplication of a point using the point A unchanged is performed. This process is vulnerable to special PAs. However, an exponent used in this modular exponentiation is d"=d(mod C(α)), and a bit length of this exponent is equal to the bit length ($\log_2 C(\alpha)$) of C(α). If C(α)=3×5×7=105 is used, a bit length exposed to a special PA attack is only $\log_2 105$=7 bits, and can be made small enough to be able to ignore the influences of the special PA attack compared with the bit length (1024 bits or more) of the entire private key.

FIG. 48 is a flowchart illustrating details (No. 1) of the process of the scalar multiplication of a point executed in steps 4703, 4704, and 4705 of FIG. 47. The process of this flowchart is based on the algorithm of the scalar multiplication of a point using the A&D-always method illustrated in FIG. 15.

In step 4800, the input values illustrated in FIG. 15 are input.

step 4801 corresponds to line 1501 of FIG. 15.
    steps 4802, 4806, and 4807 correspond to the loop process of the for statement in line 1502 of FIG. 15.
    step 4803 corresponds to line 1503 of FIG. 15, and performs doubling.
    step 4804 corresponds to line 1504 of FIG. 15, and performs an addition.
    step 4805 corresponds to line 1505 of FIG. 15.
    steps 4808 and 4809 correspond to line 1507 of FIG. 15.

In this flowchart, a computation pattern of doubling (4803) and an addition (4804) is always made regular regardless of the scalar value d.

FIG. 49 is a flowchart illustrating details (No. 2) of the scalar multiplication process of a point executed in steps 4703, 4704 and 4705 of FIG. 47. In the flowchart of FIG. 48, the scalar multiplication of a point is performed while incrementing the exponent d by 1 bit. In contrast, in the flowchart of FIG. 49, a k-bit table represented by w[i]=iA(mod n) (i=0, 1, . . . , $2^k$−1) is calculated with a loop control process in steps 4094 and 4095 after an initialization process in steps 4901 and 4902 (step 4903).

Then, the scalar multiplication of a point is performed while incrementing the exponent d by k bits with a loop control process in steps 4910 and 4911 after an initialization process in steps 4906 and 4907. Similarly to the flowchart of FIG. 48, a computation pattern of doubling (step 4908) and an addition (step 4909) are always made regular regardless of the value of the exponent d.

Figure 50:
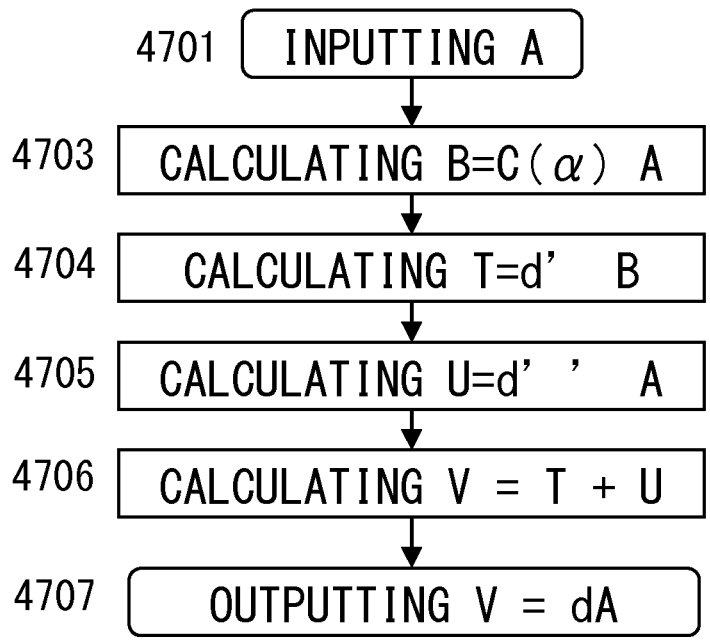
FIG. 50 is a flowchart illustrating a control process of the fifth embodiment.

The fifth embodiment that refers to a specific process of the encryption processing device 4100 illustrated in FIG. 41 is described below. FIG. 50 is a flowchart illustrating a control process of the fifth embodiment. The process of this flowchart is described below.

In FIG. 50, the same processes as those in the fourth embodiment of FIG. 47 are denoted with the same numbers.

The control process of the fifth embodiment is different from that of the fourth embodiment in that a process for calculating a quotient and a remainder by dividing a private key d by c(α) is executed at a point when the private key d is generated in a preliminary process, and the quotient and the remainder are respectively given to d' and d" (step 5000). This is a process based on the expressions (6.1) and (6.7), and corresponds to the functions of the private key converter 4104 and the correction key generator 4107 of FIG. 41. This process is executed as a preliminary process, thereby eliminating the need for executing a division process each time the scalar multiplication of a point is performed.

Processes in steps 4701 and 4703 to 4707 of FIG. 5 are the same as those of the fourth embodiment illustrated in FIG. 47.

In step 4705, the number of bits vulnerable to a special PA is only 7 bits or so similarly to the case of the fourth embodiment.

Figure 51:
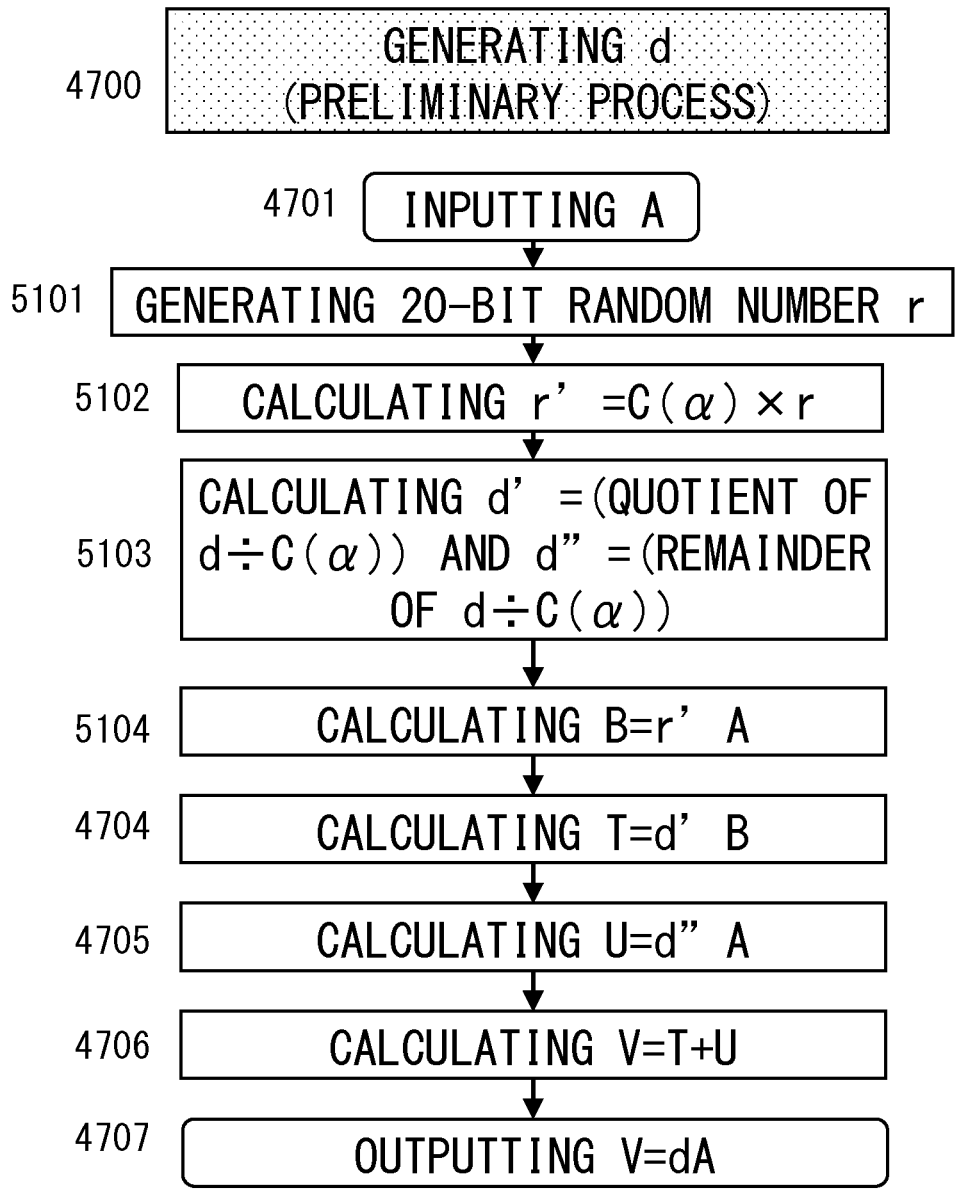
FIG. 51 is a flowchart illustrating a control process of the sixth embodiment.

The sixth embodiment that refers to a specific process of the encryption processing device 4100 illustrated in FIG. 41 is described below. FIG. 51 is a flowchart illustrating a control process of the sixth embodiment. The process of this flowchart is described below.

In FIG. 51, the same processes of the fourth embodiment illustrated in FIG. 47 are denoted with the same numbers.

The control process of the sixth embodiment is different from that of the fourth embodiment in that a random number r is added to the measure constant C(α).

Initially, a private key d is generated preliminarily (step 4700), and a point A is input (step 4701).

Then, a 20-bit random number r is generated (step 5101).

Next, r'=c(α)×r is computed based on the expression (6.3) (step 5102).

Then, a quotient and a remainder are calculated by dividing the private key d generated preliminarily by r', and respectively given to d' and d" (step 5103). This is a process based on the expressions (6.3) and (6.8), and corresponds to the functions of the private key converter 4104 and the correction key generator 4107.

A result r'A obtained by multiplying the point A by r' is given to B (step 5104). This corresponds to the function of the constant multiplying unit 4101.

Thereafter, similarly to the case of FIG. 47, processes in steps 4704, 4705, 4706, and 4707 are sequentially executed, and a final value dA of the scalar multiplication is output according to the control process executed based on the expression (6.8).

In step 4705, the scalar multiplication of a point using the point A unchanged is performed. This process is vulnerable to special PAs. Its bit length is longer by the bit length of the random number r than that of the first or the second embodiment, and (bit length of $C(\alpha)$)+20(=$\log_2 C(\alpha)$+20). If $C(\alpha)$=3×5×7=105 is used, a bit length exposed to a special PA attack is only 20+$\log_2$105=27 bits. Compared with the bit length (1024 bits or more) of the entire private key, the bit length can be made short enough to be able to ignore the influences of the special PA attack.

Compared with the first or the second embodiment, the sixth embodiment has an advantage that safety from DPAs is high since all exponents of the scalar multiplication process of a point in steps 4704, 4705 and 4706 are randomized although a bit length exposed to a special PA attack becomes long.

Similarly to the third embodiment, the process itself in step 5103 of the sixth embodiment is similar to the process represented by the expressions (4.4) and (4.5) of the above described conventional method 2. The sixth embodiment has a characteristic such that the process r'=r×$C(\alpha)$, in step 5102, for multiplying the random number r generated in step 5101 by $C(\alpha)$ is executed, whereas the conventional method 2 does not execute a process corresponding this process of the sixth embodiment. A difference in this characteristic causes a difference in effects. Namely, the point B is given to r', which is an integral multiple of $C(\alpha)$, as a value obtained by multiplying A by r', whereby a process also safe from special PAs can be implemented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encryption processing device, comprising:
a constant multiplier, to which a first base a and a modulus n are input, configured to perform a modular exponentiation computation for the modulus n by using a specified constant as an exponent for the first base a, and to output a computation result as a second base b;
a private key converter, to which a first private key d is input, configured to compute a second private key d' as a quotient obtained by dividing the first private key d by the specified constant;
a correction key generator configured to generate a correction key d" as a remainder obtained by dividing the first private key d by the specified constant;
a first modular exponentiation computing unit configured to perform a modular exponentiation computation for the modulus n by using the second private key d' as an exponent for the second base b, and to output a computation result;
a second modular exponentiation computing unit configured to perform a modular exponentiation computation for the modulus n by using the correction key d" as an exponent for the first base b, and to output a computation result as a correction value; and
a correction computing unit, to which the computation result output by the first modular exponentiation computing unit and the correction value output by the second modular exponentiation computing unit are input, configured to perform a correction computation, which is a multiplication process based on the modulus n, and to output a computation result of the correction computation as an encryption process result obtained when the modular exponentiation computation for the modulus n is executed by using the first private key d as an exponent for the first base a.

2. An encryption processing device, comprising:
a constant multiplier, to which a point A on a first elliptic curve is input, configured to perform a scalar multiplication of a point by using a specified constant as a scalar value for the point A on the first elliptic curve, and to output a computation result as a point B on a second elliptic curve;
a private key converter, to which a first private key d is input, configured to compute a second private key d' as a quotient obtained by dividing the first private key d by the specified constant;
a correction key generator configured to generate a correction key d" as a remainder obtained by dividing the first private key d by the specified constant;
a first scalar multiplier of a point configured to perform a scalar multiplication of a point by using the second private key d' as a scalar value for the point B on the second elliptic curve, and to output a computation result;
a second scalar multiplier of a point configured to perform a scalar multiplication of a point by using the correction key d" as a scalar value for the point A on the first elliptic curve, and to output a computation result as a correction value; and
a correction computing unit, to which the computation result output by the first scalar multiplier of a point and the correction value output by the second scalar multiplier of a point are input, configured to perform a correction computation, which is a process for adding a point on an elliptic curve, and to output a computation result of the correction computation as an encryption process result obtained when the scalar multiplication of a point is performed by using the first private key d as a scalar value for the point A on the first elliptic curve.

3. The encryption processing device according to claim 1, wherein
the specified constant has a value using one or more prime numbers as a common factor.

4. The encryption processing device according to claim 3, wherein
the specified constant has a value using a specified random number as a common factor.

5. The encryption processing device according to claim 1, wherein
the private key converter computes the second private key d' and the correction key generator generates the correction key d", preliminary to an encryption process.

6. An encryption processing method used by a computer, the encryption processing method comprising:
inputting a first base a and a modulus n, performing a modular exponentiation computation for the modulus n by using a specified constant as an exponent for the first base a, and outputting a computation result as a second base b;

inputting a first private key d, and computing a second private key d' as a quotient obtained by dividing the first private key d by the specified constant;

generating a correction key d" as a remainder obtained by dividing the first private key d by the specified constant;

performing a first modular exponentiation computation for the modulus n by using the second private key d' as an exponent for the second base b, and outputting a computation result;

performing a second modular exponentiation computation for the modulus n by using the correction key d" as an exponent for the first base b, and outputting a computation result as a correction value; and inputting the computation result of the first modular exponentiation, and the correction value, which is the computation result of the second modular exponentiation computation, performing a correction computation, which is a multiplication process based on the modulus n, and outputting a computation result of the correction computation as an encryption process result obtained when the modular exponentiation computation for the modulus n is performed by using the first private key d as an exponent for the first base a.

7. An encryption processing method used by a computer, the encryption processing method comprising:

inputting a point A on a first elliptic curve, performing a scalar multiplication of a point by using a specified constant as a scalar value for the point A on the first elliptic curve, and outputting a computation result as a point B on a second elliptic curve;

inputting a first private key d, and computing a second private key d' as a quotient obtained by dividing the first private key d by the specified constant;

generating a correction key d" as a remainder obtained by dividing the first private key d by the specified constant;

performing a first scalar multiplication of a point by using the second private key d' as a scalar value for the point B on the second elliptic curve, and outputting a computation result;

performing a second scalar multiplication of a point by using the correction key d" as a scalar value for the point A on the first elliptic curve, and outputting a computation result as a correction value; and inputting the computation result of the first scalar multiplication of a point, and the correction value, which is a computation result of the second scalar multiplier of a point, performing a correction computation, which is a process for adding a point on an elliptic curve, and outputting a computation result of the correction computation as an encryption process result obtained when the scalar multiplication of a point is performed by using the first private key d as a scalar value for the point A on the first elliptic curve.

8. The encryption processing method according to claim 6, wherein
the specified constant has a value using one or more prime numbers as a common factor.

9. The encryption processing method according to claim 8, wherein
the specified constant has a value using a specified random number as a common factor.

10. The encryption processing method according to claim 6, wherein
the second private key d' is computed and the correction key d" is generated, preliminary to an encryption process.

* * * * *